(12) United States Patent
Mathieu

(10) Patent No.: US 12,494,914 B2
(45) Date of Patent: Dec. 9, 2025

(54) SYSTEM AND METHOD FOR COMPLEX CONFIRMATION OF BIOMETRIC INFORMATION WITHOUT STORED BIOMETRIC DATA

(71) Applicant: Global Bionic Optics Limited, Ebor (AU)

(72) Inventor: Gilles Mathieu, Peng Chau (HK)

(73) Assignee: Global Bionic Optics Limited, Ebor (AU)

( * ) Notice: Subject to any disclaimer, the term of this patent is extended or adjusted under 35 U.S.C. 154(b) by 143 days.

(21) Appl. No.: 18/126,079

(22) Filed: Mar. 24, 2023

(65) Prior Publication Data

US 2023/0246839 A1 Aug. 3, 2023

Related U.S. Application Data

(63) Continuation-in-part of application No. 18/108,328, filed on Feb. 10, 2023, now Pat. No. 12,200,133.
(Continued)

(51) Int. Cl.
*H04L 9/32* (2006.01)
*G06F 21/30* (2013.01)
(Continued)

(52) U.S. Cl.
CPC ............ *H04L 9/3231* (2013.01); *G06F 21/30* (2013.01); *G06F 21/32* (2013.01); *G06V 40/169* (2022.01);
(Continued)

(58) Field of Classification Search
CPC .......... G06F 21/30; G06F 21/31; G06F 21/32; G06V 40/10; G06V 40/16; G06V 40/168;
(Continued)

(56) References Cited

U.S. PATENT DOCUMENTS

| 5,561,718 A | 10/1996 | Trew et al. |
| 6,038,315 A | 3/2000 | Strait et al. |

(Continued)

FOREIGN PATENT DOCUMENTS

| CN | 101340283 A | 1/2009 |
| CN | 112699386 A | 4/2021 |

(Continued)

OTHER PUBLICATIONS

Dodis, Yevgeniy et al., Fuzzy Extractors, Boston University, Apr. 9, 2008 (Year: 2008).*
(Continued)

*Primary Examiner* — D'Arcy Winston Straub
(74) *Attorney, Agent, or Firm* — Van Hoven PC; Joshua Van Hoven

(57) ABSTRACT

A biometric capture is performed to capture multiple regions of a biometric modality of interest, such as regions of a user's face. A complex representation of the user's biometric data is generated, such that each data point within the complex representation is based on biometric information from multiple of the captured regions. Information that later allows reconstruction of the complex representation from another capture of the user's biometric information is stored in a public code that does not include any of the underlying biometric data from the user or information that can be used to derive the underlying biometric data.

21 Claims, 43 Drawing Sheets

Related U.S. Application Data which is a continuation of application No. 16/775,144, filed on Jan. 28, 2020, now Pat. No. 11,750,390.

(60) Provisional application No. 62/848,463, filed on May 15, 2019, provisional application No. 62/799,537, filed on Jan. 31, 2019.

(51) Int. Cl.

| | | |
|---|---|---|
| *G06F 21/32* | (2013.01) | |
| *G06V 40/12* | (2022.01) | |
| *G06V 40/16* | (2022.01) | |
| *G06V 40/18* | (2022.01) | |
| *G06V 40/50* | (2022.01) | |
| *G06V 40/70* | (2022.01) | |
| *H04L 9/06* | (2006.01) | |
| *H04L 9/08* | (2006.01) | |
| *H04L 9/40* | (2022.01) | |
| *H04W 12/06* | (2021.01) | |

(52) U.S. Cl.
CPC ............ *G06V 40/53* (2022.01); *H04L 9/0643* (2013.01); *H04L 9/0866* (2013.01); *H04L 9/3236* (2013.01); *H04L 63/08* (2013.01); *H04W 12/06* (2013.01); *G06V 40/1365* (2022.01); *G06V 40/197* (2022.01); *G06V 40/70* (2022.01); *H04L 2209/04* (2013.01)

(58) Field of Classification Search
CPC ...... G06V 40/169; G06V 40/50; G06V 40/53; G06V 40/18; G06V 40/197; G06V 40/12; G06V 40/1365; G06V 40/70; H04L 9/06; H04L 9/0643; H04L 9/32; H04L 9/3226; H04L 9/3231; H04L 9/3236; H04L 9/08; H04L 9/0861; H04L 9/0866; H04L 63/08; H04L 2209/04; H04W 12/06

See application file for complete search history.

(56) References Cited

U.S. PATENT DOCUMENTS

| | | | |
|---|---|---|---|
| 6,310,966 B1 | 10/2001 | Dulude et al. | |
| 7,233,686 B2 | 6/2007 | Hamid | |
| 9,524,420 B2 | 12/2016 | Suh et al. | |
| 9,691,132 B2 | 6/2017 | Kim et al. | |
| 9,935,948 B2 | 4/2018 | Schultz et al. | |
| 10,826,686 B1 | 11/2020 | Cho et al. | |
| 11,336,857 B2 | 5/2022 | Okura et al. | |
| 11,424,929 B2 | 8/2022 | Taylor | |
| 11,488,022 B2 | 11/2022 | Mallya et al. | |
| 11,562,548 B2 | 1/2023 | Assouline et al. | |
| 11,837,239 B2 | 12/2023 | Mallya et al. | |
| 11,960,585 B2 | 4/2024 | Grover et al. | |
| 2003/0169910 A1* | 9/2003 | Reisman ............ G06V 40/1365 | |
| | | | 382/124 |
| 2003/0217294 A1 | 11/2003 | Kyle | |
| 2007/0226515 A1* | 9/2007 | Maletsky ................ G06F 21/32 | |
| | | | 713/186 |
| 2007/0266427 A1* | 11/2007 | Kevenaar .............. H04L 9/3278 | |
| | | | 726/5 |
| 2008/0209227 A1* | 8/2008 | Venkatesan ........... H04L 9/3236 | |
| | | | 713/186 |
| 2008/0222496 A1* | 9/2008 | Tuyls .................... H04L 9/3231 | |
| | | | 714/E11.032 |
| 2009/0138725 A1 | 5/2009 | Madhvanath et al. | |
| 2009/0310830 A1 | 12/2009 | Bolle et al. | |
| 2010/0027784 A1* | 2/2010 | Tuyls ..................... G06F 21/32 | |
| | | | 713/186 |
| 2015/0095654 A1 | 4/2015 | Li et al. | |
| 2017/0085562 A1 | 3/2017 | Schultz et al. | |
| 2017/0141920 A1* | 5/2017 | Herder, III ............... H04L 9/30 | |
| 2018/0365479 A1* | 12/2018 | Lee .................... G06V 40/1335 | |
| 2019/0215164 A1* | 7/2019 | Hamann ............... H04L 9/0894 | |
| 2021/0279515 A1 | 9/2021 | Zhang et al. | |
| 2021/0357761 A1 | 11/2021 | Mallya et al. | |
| 2022/0029799 A1 | 1/2022 | Subudhi et al. | |
| 2022/0172416 A1 | 6/2022 | Kuta et al. | |
| 2023/0009298 A1 | 1/2023 | Mallya et al. | |
| 2023/0169157 A1 | 6/2023 | Grover et al. | |
| 2023/0246839 A1 | 8/2023 | Mathieu | |
| 2024/0045996 A1 | 2/2024 | O'Bryan et al. | |

FOREIGN PATENT DOCUMENTS

| | | |
|---|---|---|
| CN | 113298534 A | 8/2021 |
| CN | 114144110 A | 3/2022 |
| EP | 1385117 A2 | 1/2004 |
| EP | 1524620 A1 | 4/2005 |
| KR | 20110095638 A | 8/2011 |
| KR | 1020190029706 A | 3/2019 |
| KR | 1020190041084 A | 4/2019 |
| WO | 1998/050875 A2 | 11/1998 |
| WO | 1999/034554 A2 | 7/1999 |
| WO | 2006008485 A1 | 1/2006 |
| WO | 2019/018049 A1 | 1/2019 |

OTHER PUBLICATIONS

International Search Report and Written Opinion of the International Searching Authority in relation to International Application No. PCT/IB2020/000070, dated Jun. 24, 2020, 8 pages.

International Search Report and Written Opinion of the International Searching Authority in relation to International No. PCT/IB2024/052739, dated Jul. 11, 2024, 7 pages.

Arakala et al., "Fuzzy Extractors for Minutiae-Based Fingerprint Authentication," SAT 18th International Conference, 760-769 (2007).

International Search Report and Written Opinion from PCT/IB2020/000079 dated Jun. 24, 2020.

Ratha et al., "Generating Cancelable Fingerprint Templates," IEEE Transactions on Pattern Analysis and Machine Intelligence, 29(4):561-572 (2007).

Uludag et al., "Securing Fingerprint Template: Fuzzy Vault with Helper Data," IEEE Computer Vision and Pattern Recognition Workshop, pp. 163-170 (2006).

Office action of CN Application CN202080005739.5 dated Nov. 13, 2023 (9 Pages).

International search report from European Patent Application No. EP20748661.4 dated Sep. 21, 2022 (9 Pages).

International search report from European Patent Application No. EP23214425.3 dated May 27, 2024 (6 pages).

* cited by examiner

SYSTEM AND METHOD FOR COMPLEX CONFIRMATION OF BIOMETRIC INFORMATION WITHOUT STORED BIOMETRIC DATA

CROSS REFERENCE TO RELATED APPLICATIONS

This application is a continuation-in-part of U.S. patent application Ser. No. 18/108,328, entitled "System and Method for Producing a Unique Stable Biometric Code for a Biometric Hash" and filed on Feb. 10, 2023, which is a continuation of U.S. patent application Ser. No. 16/775,144, entitled "System and Method for Producing a Unique Stable Biometric Code for a Biometric Hash" and filed on Jan. 28, 2020, which claims priority to U.S. Provisional Patent Application No. 62/799,537, entitled "System and Method for Producing a Unique Stable Biometric Code for a Biometric Hash" and filed on Jan. 31, 2019, and to U.S. Provisional Patent Application No. 62/848,463, entitled "System and Method for Producing a Unique Stable Biometric Code for a Fingerprint Hash" and filed on May 15, 2019, all of which are incorporated by reference herein in their entirety.

BACKGROUND OF THE INVENTION

Biometric information may be used for numerous applications such as identification, verification, and authentication of users. Although it will be understood that identification, verification, and authentication refer to different operations in the context of biometric, security, and cryptographic fields, unless identified otherwise in the present disclosure any reference to one such operation (e.g., verification) should be understood to include other such operations (e.g., authentication or identification). Biometric information of a user (e.g., iris, facial, fingerprint, etc.) may initially be acquired during a registration stage. At a later time, a candidate can provide information to be compared against the registration information. In many applications, it is necessary for the later acquisition of biometric information to be performed under non-ideal conditions, for example, as a result on lighting, equipment specs, etc. For example, while registration equipment may provide ideal conditions for capturing of biometric information (e.g., equipment, lighting, and fixtures to locate the biometric feature at a desirable location relative to the equipment), the equipment used to capture the comparison biometric data may not capture the same quality of an image, for example, on a mobile device or other remote system. Accordingly, biometric systems may not require an exact match during the comparison stage, but instead may rely upon techniques such as a Hamming distance between the registration information (e.g., a registration code) and the comparison information (e.g., a comparison code). If the differences between the registration information and the comparison information are small enough, a biometric match may be identified. Using a Hamming distance, Euclidian distance or any biometric distance metrics further limits security by not being able to reproduce a strictly individual binary code that is stable and repeatable as required for cryptography applications. Moreover, although the biometric data of the user may be encrypted, it still must be stored for comparison, which makes this critical personal information vulnerable to hacking.

SUMMARY OF THE INVENTION

In an embodiment of the present disclosure, a method for generating a secure biometric code from facial data of a user comprises capturing samples from a plurality of regions of a face of the user and combining a first portion of the samples from a first region of the plurality of regions with a second portion of the samples from a second region of the plurality of regions. The method may further comprise generating a complex representation of the combined samples, wherein each data point within the complex representation is based on at least the first portion of samples and the second portion of samples. The method may further comprise acquiring a public code that is based on previously acquired facial data of the user, wherein the public code does not include any previously acquired samples of facial data of the user and wherein none of the previously acquired samples of the of the facial data of the user can be determined based on the public code. The method may further comprise modifying, based on calibration data of the public code, the complex representation of the combined samples to correspond to one or more features of the previously acquired samples of facial data. The method may further comprise binarizing the modified complex representation to generate a binary code and determining, based on a bitwise comparison of the binary code with a private code previously determined from the previously acquired samples of facial data of the user, whether the user is authentic.

In an embodiment of the present disclosure, a biometric processing system, comprises a sensor configured to capture facial data from a user, a memory comprising instructions stored thereon, and a processor coupled to the sensor and the memory. The processor may be configured to execute the instructions to capture samples from a plurality of regions of a face of the user, combine a first portion of the samples from a first region of the plurality of regions with a second portion of the samples from a second region of the plurality of regions, and generate a complex representation of the combined samples, wherein each data point within the complex representation is based on at least the first portion of samples and the second portion of samples. The processor may also be configured to execute the instructions to acquire a public code that is based on previously acquired facial data of the user, wherein the public code does not include any previously acquired samples of facial data of the user and wherein none of the previously acquired samples of the of the facial data of the user can be determined based on the public code. The processor may also be configured to execute the instructions to modify, based on calibration data of the public code, the complex representation of the combined samples to correspond to one or more features of the previously acquired samples of facial data, binarize the modified complex representation to generate a binary code, and determine, based on a bitwise comparison of the binary code with a private code previously determined from the previously acquired samples of facial data of the user, whether the user is authentic.

In an embodiment of the present disclosure, a non-transitory computer-readable medium has instructions stored thereon, that when executed by a processor of a biometric processing system cause the processor to perform operations comprising capturing samples from a plurality of regions of a face of the user and combining a first portion of the samples from a first region of the plurality of regions with a second portion of the samples from a second region of the plurality of regions. The instructions may also cause the processor to perform operations of generating a complex representation of the combined samples, wherein each data point within the complex representation is based on at least the first portion of samples and the second portion of samples, and acquiring a public code that is based on previously acquired facial data of the user, wherein the public code does not include any previously acquired samples of facial data of the user and wherein none of the previously acquired samples of the of the facial data of the user can be determined based on the public code. The instructions may also cause the processor to perform operations of modifying, based on calibration data of the public code, the complex representation of the combined samples to correspond to one or more features of the previously acquired samples of facial data, binarizing the modified complex representation to generate a binary code, and determining, based on a bitwise comparison of the binary code with a private code previously determined from the previously acquired samples of facial data of the user, whether the user is authentic.

BRIEF DESCRIPTION OF THE FIGURES

The above and other features of the present disclosure, its nature and various advantages will be more apparent upon consideration of the following detailed description, taken in conjunction with the accompanying drawings in which:

FIG. 1 shows codes produced by a portion of a biometric data in accordance with some embodiments of the present disclosure;

FIG. 18 shows a process for biometric verification using a masked biometric code in accordance with some embodiments of the present disclosure;

FIG. 19 shows exemplary generation of a validity mask from received biometric data over time in accordance with some embodiments of the present disclosure;

DESCRIPTION

Figure 2:
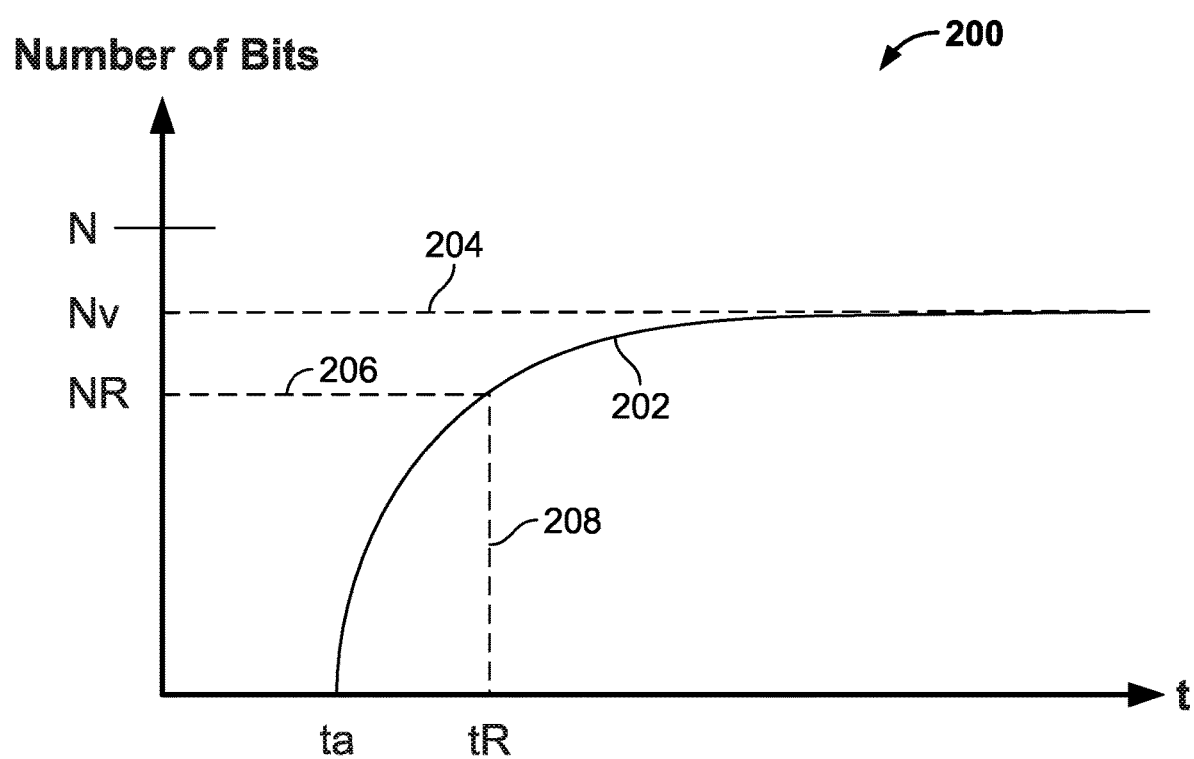
FIG. 2 shows a number of valid and stable biometric code bits over the time taken to generate the biometric code in accordance with some embodiments of the present disclosure.

The present disclosure is directed to identification and authentication systems for biometric and physical data, such as iris, facial, fingerprint, fluid, and gaseous recognition systems, as well as any other data that is subject to measurement error or variability. For example, any set of data that measures a physical entity or a phenomenon (e.g., using techniques such as image sensors, audio sensors, time-of-flight sensors, ultrasonic sensors, physiological sensors, spectrometry, spectroscopy, etc.) may output fuzzy data having a variability that makes bitwise analysis (e.g., for cryptographic applications) extremely difficult, due to a variation in one bit of measured data compromising an entire encrypted output or hash function. As described herein, a set of captured data points may be analyzed to determine which of the data points are suitable for use in a validity mask (e.g., feature vectors may comprise data points to be used in a validity mask). That validity mask may then be utilized with the captured biometric data to generate a repeatable registration code (e.g., a hashed biometric code) that is capable of being compared on a bit-wise basis with later-captured comparison data. For example, the validity mask may be utilized by the device capturing the comparison biometric data to generate a repeatable comparison code (e.g., a hash of the captured data modified by the validity mask). The validity mask may be generated such that the repeatable registration code can be compared to the repeatable comparison code on a bit-wise basis (e.g., a comparison of hash functions) while maintaining low false rejection rates (FRR) and false acceptance rates (FAR). Performing such a comparison enables increased security and privacy for biometric information, for example, since both the registration biometric information and the comparison biometric information are encrypted and obscured, and thus do not need to be stored in native format or can be limited to storage in only highly secure locations (e.g., storage of biometric information used for calculating hash functions within a secure enclave of a device).

Exemplary biometric captures systems are described herein for the purpose of illustration and not limitation. For example, one skilled in the art can appreciate that the illustrative embodiments can have application with respect to other biometric systems and to other recognition applications such as iris, facial, or fingerprint recognition systems.

Captured biometric information (e.g., iris, facial, fingerprint, etc.) may be represented by information such as a binary code. For example, the biometric information may be quantified by a "primary" code. The primary code can require a candidate to have an exact match to the enrolled biometric code (i.e., one different bit value prevents a bitwise match). Feature vectors that characterize a captured biometric image may commonly be of low amplitude for all people, and in this way, are easily affected by fluctuations due to noise from the camera or other capture device, illumination variation, focus, boundary detection, etc. Some of the signal amplitudes carried by these featured vectors can be low in reference to the fluctuation range and the produced bit elements are subject to be unstable and change from one biometric scan to another. Therefore, it is difficult to achieve a low False Rejection Rate (FRR) (e.g., many authentic candidates are rejected because the circumstances of the captured image or other biometric data are affected by noise that causes the system to determine the captured image or other data does not match the enrolled image or other data).

Biometric identification systems utilizing primary codes can require high precision and accordingly, more expensive components. Natural changes can occur in the time and may produce changes affecting a few bits of a code collected from biometric data. For example, high-quality data of an iris, facial features, fingerprint, or other biometric or physical characteristic may be required to maintain a repeatable and robust identification. High-quality data may be produced by more expensive components and a controlled environment (e.g., the distance, pointing direction and/or orientation of the eye/face/fingerprint/etc., and illumination and other controls must be identical for each authentication trial). These operational constraints make primary codes difficult to be used in common-use cases where controlled environments cannot be achieved (e.g., mobile phone user identification).

Embodiments of the present disclosure describe systems of generating a robust quantified representation of captured biometric data for use in biometric verification systems. A masked biometric code is one such representation that addresses the limitations of primary biometric codes. A masked biometric code provides flexibility with the environment capturing the biometric images and accordingly, allows for the use of lower-cost components and provides more tolerance on natural variability in the time.

The masked biometric code is repeatable with a low False Acceptance Rate due to the use of a validity mask. This stability in performance may allow for a combined use of biometric verification with a linked field of application (e.g., jointly authenticating a digital signature using biometric identification).

Prior to creating the electronic SRI, the raw image may be enhanced to improve the captured modulation transfer function (MTF) (e.g., for images captured by a system having EDOF optics). In some embodiments, the raw images may be processed in variety of image processing paths, including image enhancement, normalization, equalization, or any combination thereof.

FIG. 1 shows codes 100 produced by a portion of biometric data in accordance with some embodiments of the present disclosure. In some embodiments, the code is a binary representation of a portion of a biometric image, facial image, fingerprint capture, or other biometric or physical data. When a bit of the code cannot be determined with a minimum error probability, the code bit may be represented by a third symbol (e.g., an asterisk). As can be seen from FIG. 1, in some instances a significant portion of the bits cannot be determined with the minimum error probability. For example, captured codes 102 and 104 may represent two different biometric data captures from a first individual, captured codes 112 and 114 may represent two different biometric data captures from a second individual, and captured code 122 and 124 may represent two different biometric data captures from a third individual. With respect to bits where both biometric captures exceed the minimum error probability, the captured bits for the same individual (i.e., codes 102 and 104, codes 112 and 114, and codes 122 and 124) are identical, which is consistent with a biometric match. In instances where one or both of the captured bits cannot be determined with the minimum error probability, it is not possible to use this portion of the code for a bitwise determination of a biometric match.

FIG. 2 shows a number of valid and stable biometric code bits over the time 200 taken to generate the biometric code in accordance with some embodiments of the present disclosure. For example, at a time $t_a$ (e.g., after a suitable number of frames such as 8 frames) a first portion of the bits may begin to be identified as valid, as illustrated by curve 202. At a later time, $t_R$ 208 (e.g., after the processing of additional frames of biometric data), the system may determine a number of valid bits NR 206 that are suitable for processing of biometric codes. In some embodiments, the system continues to generate biometric code bits and will generate $N_V$ 204 bits, wherein $N_V$ is a limit of convergence for the number of valid bits during the biometric image capture process.

The maximum number of valid bits may vary by biometric parameter and image quality (e.g., resolution). In some instances, the number of valid bits, $N_V$, may be at least 85% of the total number of biometric code bits, N. For biometric sources comprising many contrasting or unique features, the number of valid bits may be at least 95% of the total number of biometric code bits. The increased number of differentiating biometric features reflects a high biometric entropy. On the other hand, a biometric source with a sparse number of differentiating features can provide a smaller percentage of valid bits (e.g., 75% of the biometric code bits are valid by meeting a certain confidence threshold). In this instance, a biometric source that has few differentiating features reflects a low biometric entropy.

Biometric entropy is a quantity linked to the possible number of differentiating patterns that can be associated with biometric sources of similar patterns. This quantity is determined with the assumption that a group of biometric sources patterned similarly can be represented by one binary code. The biometric entropy considers an existing partial dependency of bits between each other even hidden by a cryptographic salt. A numerical entropy, $E_N$, can be obtained by the following equation:

$$E_N = 2^{N_V}$$

where $N_V$ is the number of measured valid bits and the base of 2 is due to the nature of a binary code.

To extract the common biometric image patterns into a binary code, the 2D electronic SRI is modified by linear transformations. For example, the electronic SRI representations can be projected on a base of normalized and orthogonal vectors. The orthogonalization guarantees internal independence of each compound of the code. Moreover, the base of projection may be needed to filter out or reject effects of dependencies between pixel gray levels. For example, the sampled collection of information must collect independent features.

To measure dependencies between pixel gray levels, the system may take an auto-correlation on the polar angle and radial coordinates of the biometric patterns that comprise the captured image. A rich biometric pattern may have a sharp and narrow auto-correlation function, indicating that the features of the biometric sources are very different from one another. Using independent vectors with bitwise independency is important to prevent a security breach that can be caused by bitwise dependency (e.g., some bits can be determined from others). These vectors may also be referred to as "feature vectors."

Feature vectors have properties designed for biometric identification. A feature vector is orthogonal from other feature vectors to maximize the independency of each bit inside a code. For example, the third element in the vector is not a modulo 2 of the sum of the first and second elements. If the third element did depend on the first and second elements, an imposter knowing this would be able to determine a user's private biometric code. In this way, the internal entropy of the code is maximized and the feature vectors are more secure. The feature vectors may be optionally normalized if the amplitude of the feature vector possesses variations that may cause an improper characterization of the biometric source (e.g., boundary variations, which will be described in other parts herein). Feature vectors may be selected such that they represent sections of the biometric source that are exposed to the camera or other capture device most often and are not corrupted by interfering objects (e.g., eyelashes for iris, hair for facial, and debris for fingerprint, etc.).

Figure 3A:
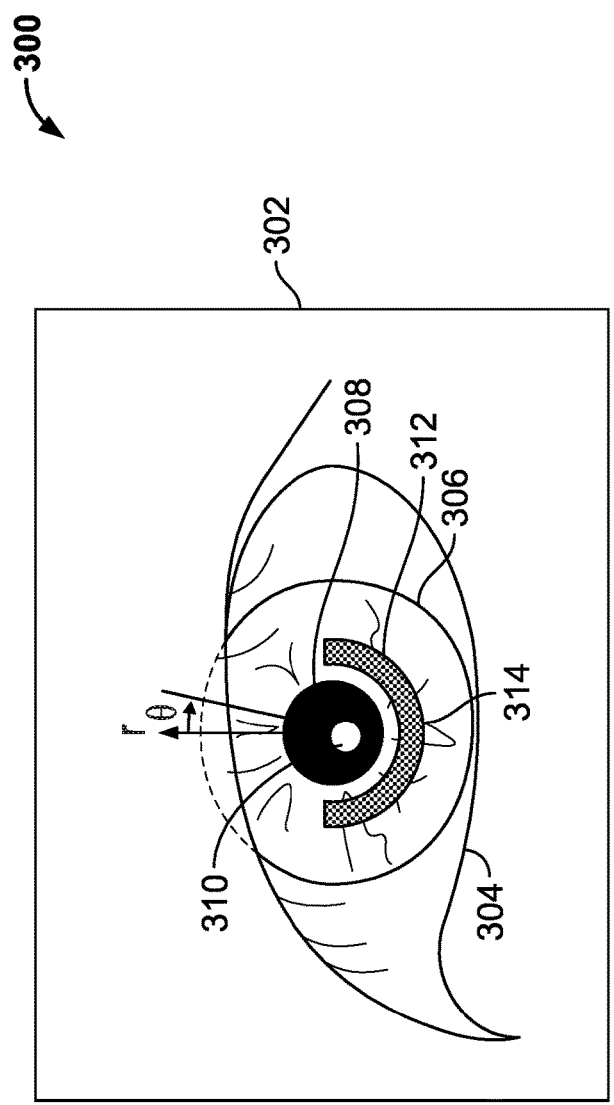
FIGS. 3A-3C show a stable iris annulus 1D signal obtained from a 2D iris image in accordance with some embodiments of the present disclosure.
Figure 3C:
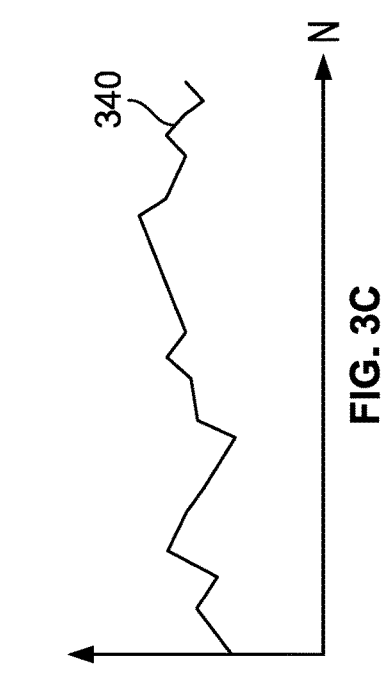
Figure 3B:
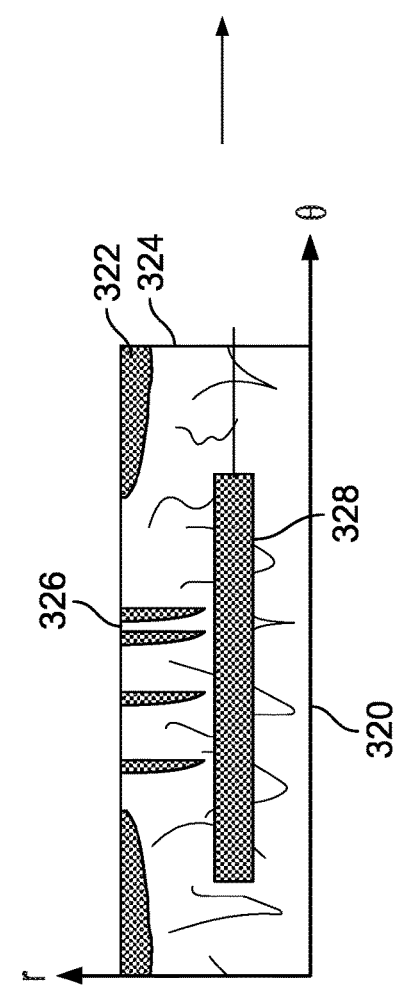

FIGS. 3A-3C show a stable iris annulus 1D signal obtained from a 2D iris image 300 in accordance with some embodiments of the present disclosure. Feature vectors may be obtained by taking the Fast Fourier Transform (FFT) of a one-dimensional representation 340 of a stable iris annulus. The stable iris annulus can be a section of a ring of an iris containing iris patterns without any obstruction from interfering eye features such as eyelashes. In an embodiment of the present disclosure, an exemplary two-dimensional image of an iris is depicted in FIG. 3A. In FIG. 3A, a raw image 302 captures an image of a portion of a user's face, including an eye 304. Within the eye, an external iris boundary 306 may be identified as well as an external boundary of a pupil 308 and a specular reflection on the cornea 310. These features may be used to identify an iris including features 314 to capture for iris recognition. A stable iris annulus 312 corresponds to a portion of the iris that should not change between image captures and that is unlikely to be obstructed by objects such as eyelashes or the like.

The stable iris annulus 312 may be represented through polar coordinates as depicted in FIG. 3B. A normalized iris image 324 may include a depiction 320 of the iris in polar coordinates, including an iris pattern 328, obstructions such as eyelashes 326, and cropped regions 322. Data in the form of a stable iris annulus 1D signal 340 may be captured from the stable iris annulus region of the polar coordinate image, as depicted in FIG. 3C.

For improved stability, the stable iris annulus 312 can be multiplied by a smoothing function to remove boundary variation effects. The Fast Fourier Transform of the stable iris annulus 1D signal can be obtained by the equation $$X_k = \sum_{n=0}^{N-1} x_n \cdot e^{-i2kn}$$

where $X_k$ is a collection of N complex values and k is a discrete frequency (e.g., k=0, 1, 2, ..., N−1). Each discrete frequency provides a complex amplitude. Frequency 0 is the average value. In some embodiments, frequencies 1 and 2 are subject to an illumination gradient. As referred to herein, the discrete frequencies can be considered as wavenumbers with units of cycles per unit distance or radians per unit distance. In some embodiments, frequencies 4 to 12 may carry most of the iris features present in an iris image.

The feature vectors, following FFT properties, are orthogonal. The natural structure of an iris pattern may make each phase value in the range 0 to $2\pi$, inclusive, picked from a uniform statistical distribution. Iris patterns following these discrete frequencies are not necessarily in phase with one another. For example, an iris pattern of frequency 4 can be out of phase with an iris pattern of frequency 5, and the phase shift can be a value from 0 to $2\pi$, inclusive, with an equal probability of being any such value.

The feature vectors may be in binary. In some embodiments, binarization of feature vectors may be done with the encoding of positive and negative amplitudes into 1's and 0's, respectively. For example, a single feature vector can be represented by a complex amplitude that can be further represented by two independent and orthogonal vectors with real amplitudes. A complex single vector can be separated into a sum of two real components (e.g., using Euler's method). The signs of the amplitudes of the two real components may indicate the values of the feature vector bit. In this way, there is an equal probability of encoding the bit to a 0 or a 1.

For increased stability or measurement accuracy when determining feature vectors, the stable iris annulus can be modified by a smoothing function to avoid boundary variation effects. Particularly when using FFT, it may be useful if the boundaries of the discrete signal do not differ by too large a magnitude such that the system does not incorrectly determine a high-frequency response at the boundaries of the discrete signal. A smoothing function can be multiplied with the stable iris annulus signal prior to taking the FFT (e.g., by multiplication of the iris annulus signal with a Hamming window). In this way, the ends of the iris annulus signal can be similar values that do not cause false high-frequency responses when an FFT is taken.

For poor iris patterns, in an exemplary worst-case scenario, 24 valid bits may be collected. For example, in a proof-of-concept experiment, the system was able to collect 24 valid bits of 32 total bits for 2% of the sampled population (e.g., 2% of the population may have poor iris patterns). The 24 valid bits representing a poor iris pattern may result in a low biometric entropy of only 64,000.

An exemplary biometric entropy carried by the masked code with 24 valid bits and measured for average iris quality for two eyes is approximately 250,000. The entropy of fully independent 24 valid bits is 16,777,216 (e.g., $2^{24}$). There may be dependencies introduced to the system if the iris annulus signals are partially correlated. For example, the proof of concept also used at least two concentric annuli at different diameters on the iris, which led to partial correlations between the annulus due to a nonzero radial correlation on natural iris features. In this example, there is partial dependency between bits associated with the same frequencies at different annulus radii. The entropy is reduced to approximately 250,000 because of the partially correlated pairs of bits. This calculation is approximative due to the nature of the true correlation value changing from person to person.

The FAR can be reduced by increasing the number of bits in the validity mask. In some embodiments for proof of concept, the scan of the iris is limited to the most frequently exposed region of the iris.

The validity mask associated with an iris code may be subject to change on a few bits each time a respective user registers. In some instances, the repeated registration of the same person makes the biometric identity more secure by these validity mask bits changes. The registration is automatically revocable by a new registration as it will produce a different minor validity mask and so consequently a different compact code (CC), as described herein.

Figure 4:
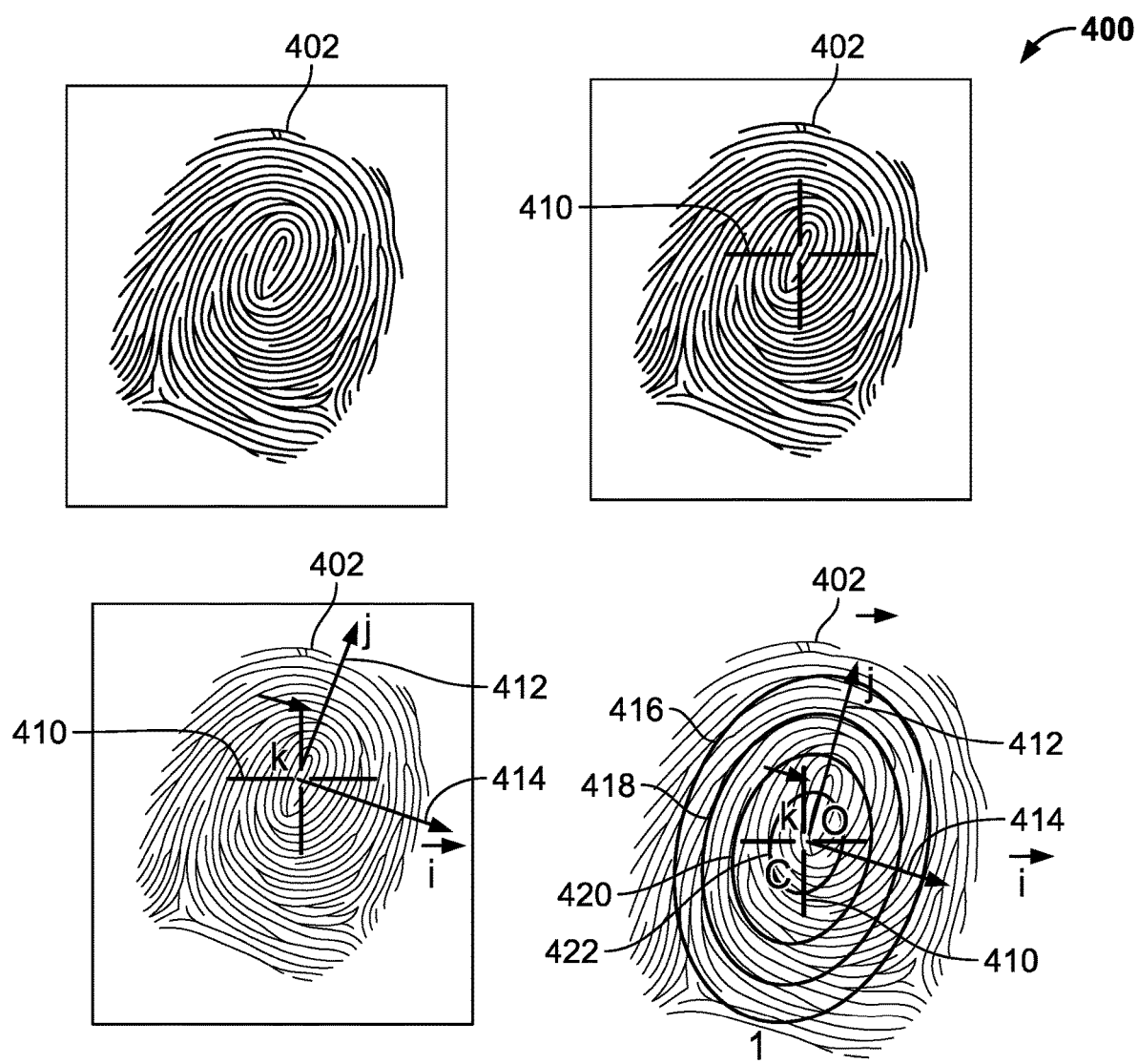
FIG. 4 depicts an exemplary captured fingerprint image in accordance with some embodiments of the present disclosure.

FIG. 4 depicts an exemplary captured fingerprint image 402 in accordance with some embodiments of the present disclosure. Fingerprint capture 400, both in the registration and authentication and/or identification steps of the process, may require accurate and consistent capture of a particular portion (i.e., a "region of interest") of the fingerprint, to facilitate analysis of the same fingerprint features and generation of the same biometric code can be extracted at each new scan of a same finger.

In some embodiments of the present disclosure, fingerprint capture may be performed in accordance with a threshold or quality test procedure. However the fingerprint data is obtained (e.g., by optical sensing, capacitive sensing, ultrasonic sensing, thermal sensing), data relating to the location, width, depth, and other features of a fingerprint are captured. However, any such form of sensing may encounter some errors, whether from the sensor itself or external conditions such as obstructions, environmental conditions, the presence of moisture, etc. Accordingly, in some embodiments, captured fingerprint data may be used only when a quality score threshold is met. In some embodiments, the captured fingerprint data may be enhanced for further analysis, such as by post-processing or filtering. For example, a non-linear filter may extract the ridges of a fingerprint with enhanced contrast, resulting in a filtered fingerprint image that is closer to standardized fingerprint patterns. Filtering may also reduce impacts of variations of pressure, moisture, environmental conditions, and in some embodiments, may modify these conditions based on current or recent measurements or analysis of such conditions. In some embodiments, as described herein, a fingerprint image can be analyzed over numerous samples over a period of time, allowing for further sharpening and filtering.

Once a fingerprint image is captured, in some embodiments of the present disclosure, reference point 410 (e.g., for identifying an ROI) may be identified. Although the location of interest may be identified in a variety of manners, in some embodiments the location of interest may correspond to known or typical fingerprint features that generally correspond to a central area of the fingerprint (e.g., corresponding to locations where particular ridge patterns are typically located). The selection of ROI position should reflect the most frequent central zone exposed to the sensor to make the user experience smooth and natural.

In some embodiments, a reference orientation (e.g., axes 412 and 414) may be identified. Although a variety of different techniques of fingerprint orientation can be used, one exemplary property of a fingerprint orientation search is to acquire a repeatable orientation reference axis having low sensitivity to variations of collected data due to the particular manner that the fingerprint is being scanned (e.g., device used for capture, moisture, finger pressure, environmental conditions, etc.). In some embodiments, it may be desirable to ensure a repeatability of the reference orientation, such as a variation of an arbitrary finger axis of ±5°. For example, techniques such as angular histogram of gradients, moments, and the like are well known in the art and may be used to identify the reference orientation. An exemplary formal mathematical expression comprises a coordinate system O($\vec{i}, \vec{j}, \vec{k}$), where $\vec{i}$ and $\vec{j}$ are set by the stable reference orientation measurement, and $\vec{k}$ is orthogonal to the fingerprint plate.

One or more regions of interest may be identified from the captured fingerprint data for extraction of biometric features. Although a variety of shapes and areas may be utilized for a region of interest (e.g., square, oval, other shapes, a predetermined number of ridges from a reference point, etc.), in an exemplary embodiment an ROI may have a circular shape and may have a of 2 mm diameter to 10 mm diameter. A larger ROI results in a higher biometric entropy for the captured data, but adversely creates a greater probability that the entire ROI will not be collected for a particular fingerprint scan. In some embodiments, the ROI may be selected and/or dynamically modified based on capture conditions, capture hardware, required security levels, and the like, for example, based on requirement that provide an appropriate compromise between FAR and FRR.

Figure 5:
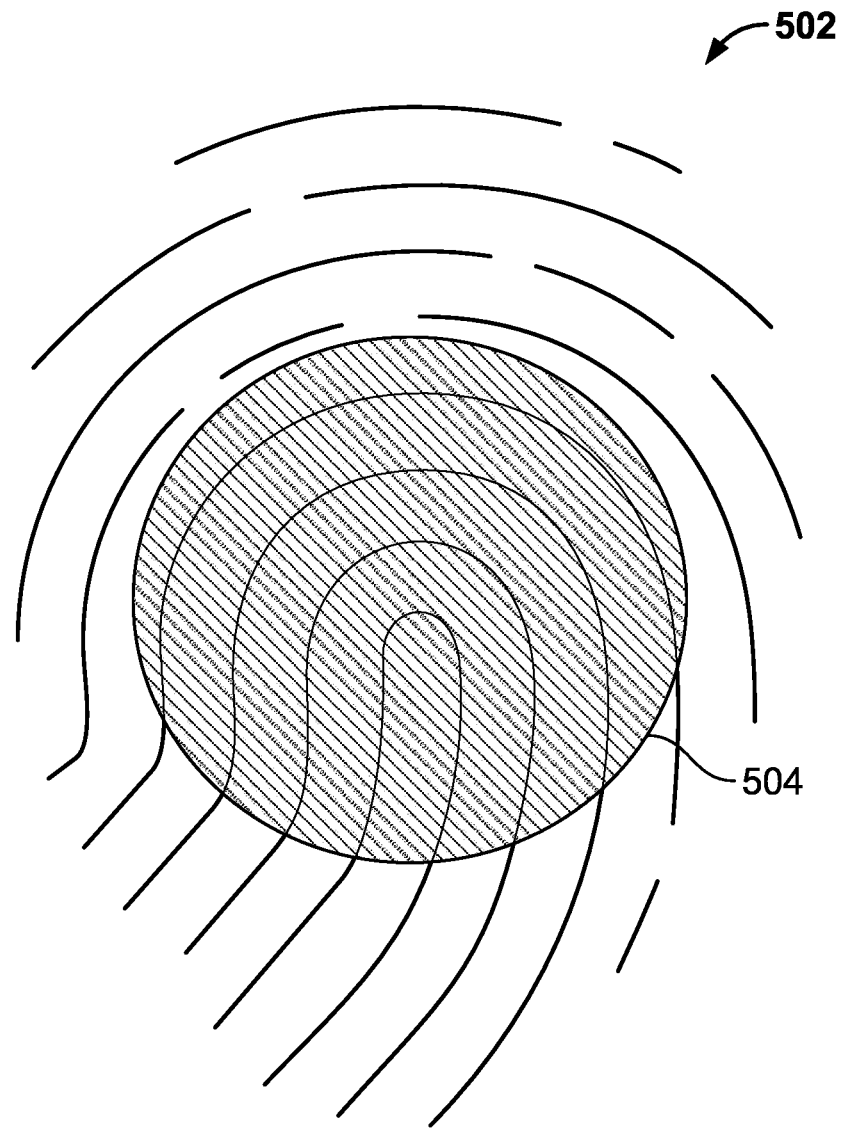
FIG. 5 depicts an exemplary region of interest (ROI) of a captured fingerprint in accordance with some embodiments of the present disclosure.

FIG. 5 depicts an exemplary ROI 504 of a captured fingerprint 502 in accordance with some embodiments of the present disclosure. An ROI location, shape, and orientation can be selected in a variety of manners. In an embodiment, an ROI can be arbitrarily set in the middle of a captured image, without regard to an actual "middle" location of the fingerprint. For example, if the same region can be consistently captured in registration and authentication/identification, the particular fingerprint region may not be required to be the actual center or include specific minutia or features. In some embodiments, an initial position may be close to the center of the fingerprint region the user will expose during normal use of a fingerprint scan on the sensor (e.g., even when scanning in haste, most users capture at least a portion of the center of the fingerprint). Whatever region of the fingerprint is used for the captured ROI, a good user experience requires having the full ROI disk overlapping the captured region of the finger. Cropping of the ROI disk will not allow generation of a stable biometric code, as fingerprint features used to generate the code will be missing or incomplete due to a cropped region contributing negatively to the amplitude of a sub-set of feature vectors calculated from the features within the ROI. If portions of the expected biometric features are missing or fail to provide an amplitude in the range value allocated to produce a constant binarization value as described herein, a bit error will occur that leads automatically to a false rejection event, even in the case of a genuine fingerprint provided by the user.

Figure 6:
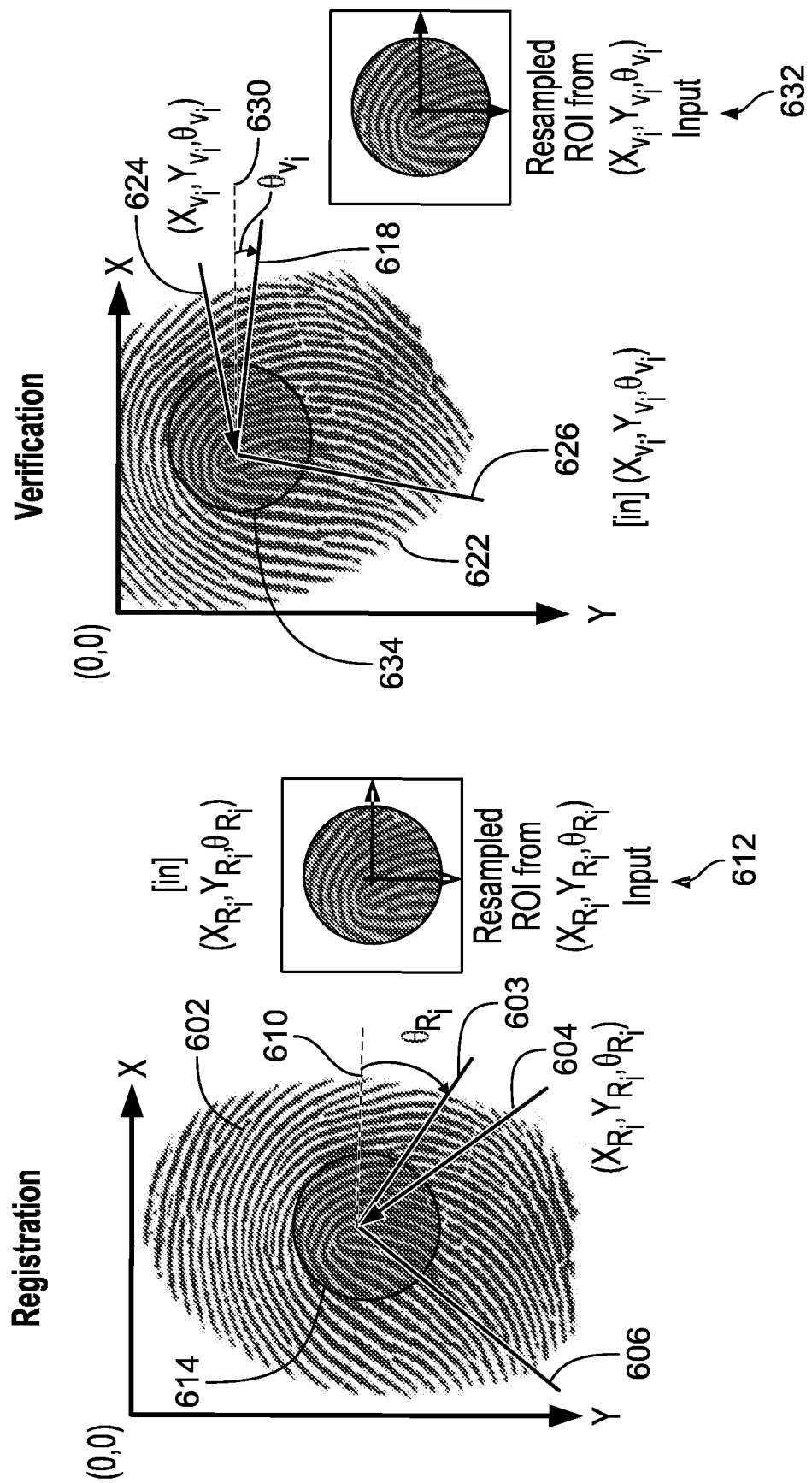
FIG. 6 depicts an exemplary ROI orientation, registration, and verification in accordance with some embodiments of the present disclosure.

FIG. 6 depicts an exemplary ROI orientation and identification and registration and authentication/identification in accordance with some embodiments of the present disclosure. In order to extract the same features from the fingerprint at both the registration phase and verification phase, the selected ROI from the registration step should be relocated in the fingerprint capture of the verification step.

In the exemplary embodiment of FIG. 6, a first fingerprint capture 602 from a registration stage is depicted with respect to x-and-y axes corresponding to the capture region. A circular ROI 614 is located near the center of captured fingerprint 602. The ROI is oriented along axes 606 and 608, which provide a frame of reference and orientation for the ROI 614 as depicted in resampled ROI 612. An axis 610 is located at the center of the ROI 614 and extends parallel to the x-axis of the capture region. An angle $\theta_{Ri}$ represents the angle between the axis 610 and axis 608 of the ROI 614. Together with the diameter of the ROI 614, the x-axis and y-axis coordinates (e.g., $X_{Ri}$ and $Y_{Ri}$) of the center point of ROI 614 and the angle $\theta_{Ri}$ define the location and orientation 604 used to establish resampled ROI 612 for generation of biometric codes for comparison to verification biometric codes.

A second fingerprint capture 622 from a verification stage is depicted with respect to x-and-y axes corresponding to the capture region. In the embodiment depicted in FIG. 6, the second fingerprint capture 622 is of the same fingerprint as the registration fingerprint capture 602, but is located at a different area of the capture device and at a different orientation. A circular ROI 634 is located near the center of captured fingerprint 622. The ROI is oriented along axes 626 and 628, which provide a frame of reference and orientation for the ROI 634 as depicted in resampled ROI 632. An axis 630 is located at the center of the ROI 634 and extends parallel to the x-axis of the capture region. An angle $\theta_{Vi}$ represents the angle between the axis 630 and axis 628 of the ROI 634. Together with the diameter of the ROI 634, the x-axis and y-axis coordinates (e.g., $X_{Vi}$ and $Y_{Vi}$) of the center point of ROI 634 and the angle $\theta_{Vi}$ define the location and orientation 624 used to establish resampled ROI 632 for generation of biometric codes for comparison to registration biometric codes.

In the case of a genuine finger, the relocation will have to meet a certain level of accuracy. When a relocation error is introduced, the extraction of feature can be truncated and shifted. Depending of the error amplitude, beyond a certain threshold of relocation error, some bits of the biometric code may be calculated incorrectly and a false rejection may occur.

In case of an imposter fingerprint, the relocation will not work or will find some unpredictable region having few criteria of similarity. If the relocation algorithm returns an error message, there may be no need to try to issue a code, as this is a threshold true rejection event. If the relocation algorithm returns a position and orientation of the ROI, the internal fingerprint pattern will differ and will issue a different code. In this case, the code will not be the same and a true rejection will occur as well.

Figure 7:
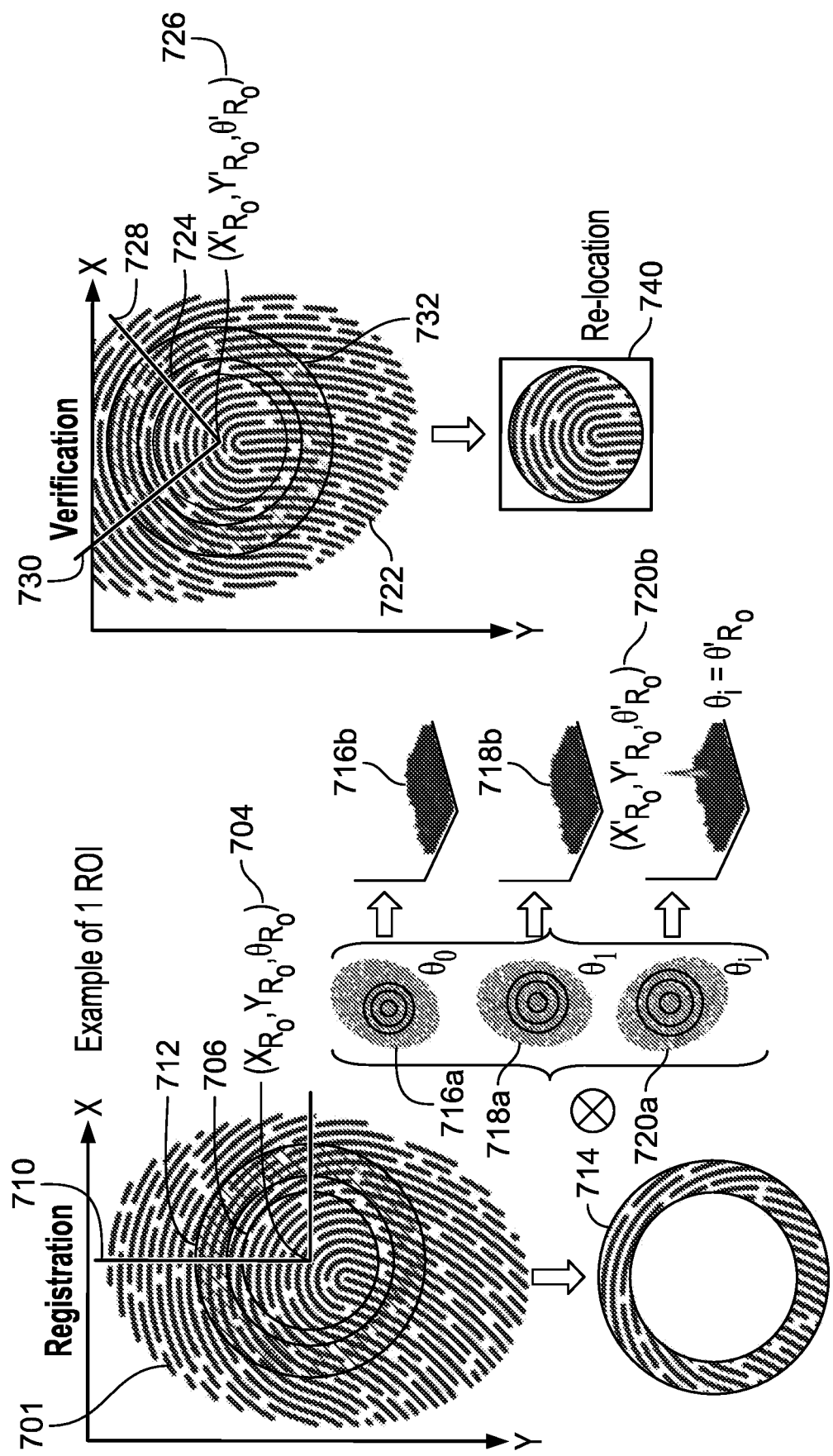
FIG. 7 depicts the operation of exemplary fingerprint ROI relocation operations in accordance with some embodiments of the present disclosure.

FIG. 7 depicts the operation of exemplary fingerprint ROI relocation operations in accordance with some embodiments of the present disclosure. There are a number of different approaches available to handle the problem of relocation. Some exemplary fingerprint algorithms, especially used in mobile phone unlock applications, may perform relocation based on stitch scans of different regions of a same finger by registering images of the finger while it is moving between different locations of a screen. Identification of a common overlap allows the system to find regions that stitch together and to build a complete template. Such stitching algorithms can provide coordinates for relocation from an arbitrary origin point.

In some embodiments, such as the embodiment depicted in FIG. 7, correlations of portions of captured fingerprint data may be used for relocation. In an embodiment, an origin or reference of a location 704 (e.g., defined by $X_{RO}$, $Y_{RO}$, $\theta_{RO}$) may be considered the location of one central image of the fingerprint 702 acquired during the registration phase, with the orientation of the ROI 706 corresponding to axes 708 and 710. In an embodiment of the present disclosure, an annular relocation region 712 of the captured fingerprint 702 data is selected that encircles the ROI 706 but that has in inner diameter that is only slightly larger than the outer diameter of the ROI 706. In this manner, use of the relocation region may be closely tied to features adjacent to the ROI 706 and thus unlikely to produce errors due to issues such as finger placement location, pressure, distortion, and the like. A separation gap may be retained between the relocation region 712 and the ROI 706 for feature vectors extraction to produce the biometric stable code. In order to facilitate relocation during the verification process, the collected and pre-processed data used for relocation may be included in the biometric public code structure passed to the authentication process. This data may then be used to compute and find the relocation coordinates in the identification/authentication data collected during verification. In accordance with the present disclosure, the relocation data may be provided in a manner such that none of the underlying biometric information relating to the relocation region is transferred in the biometric public code. For example, the structure of ridges and locations cannot be guessed from the region used for relocating, so it will not be possible for a hacker having access to the biometric public code to guess any bit of the stable code for the ROI or otherwise extract biometric information from the relocation data.

An exemplary relocation region 714 is analyzed and quantized in a manner to permit comparison to similar regions 732 (e.g., having the same inner and outer diameter relative to the center point 726) of fingerprint data 722 acquired for verification. As is depicted in FIG. 7, a candidate fingerprint used during verification may not be applied at the same location and orientation (e.g., based on axes 728 and 730) as the fingerprint data 702 acquired during registration. Because of the relative location and size of the relocation regions 712 and 732, it may not be possible to determine the detailed structure of ridges and other features in the ROI regions 706 and 724. A correlation of quantized data for respective relocation regions 712 may be performed according to correlation techniques known in the art, and as is depicted in FIG. 7. For example, orientation 716*a* of the relocation region 714 may result in a low correlation as depicted at 716*b*, when correlated with a relocation region 732 oriented as depicted in FIG. 7 (e.g., the relocation regions are oriented approximately 90 degrees apart). As another example, orientation 718*a* of the relocation region 714 may result in a low correlation as depicted at 718*b*, when correlated with a relocation region 732 oriented as depicted in FIG. 7 (e.g., the relocation regions are oriented approximately 45 degrees apart). In another example, orientation 720*a* of the relocation region 716 may result in a correlation peak as depicted at 720*b*, when correlated with a relocation region 732 oriented as depicted in FIG. 7 (e.g., the relocation regions are oriented overlapping). In some embodiments, better processing efficiency may be obtained by performing the FFT of the correlation template with the captured verification image. Rotation management may be handled by a loop of correlation by rotating the template by a small rotational angle step. The maximum of all collected peaks of correlation will determine both the angle of rotation and the (x,y) translation to define the coordinates 726 ($X'_{R_0}$, $Y'_{R_0}$, $\theta'_{R_0}$) of the verification fingerprint data 722. The resulting and properly oriented ROI may be used as a resampled ROI 740 to generate feature vectors and biometric codes for comparison to registration data, as described herein.

Returning to FIG. 4, the bottom right fingerprint image demonstrates one exemplary embodiment for identifying feature vectors from fingerprint information once a fingerprint location and orientation (e.g., during registration and/or verification) are identified. In the exemplary embodiment of FIG. 4, it is not necessary to identify a particular region of interest, as feature vectors are determined based on ridge directions at respective locations of ellipses having major and minor axes associated with orientation axes 412 and 414. The proper center location 410 and the orientation axes 412 and 414 may be determined in a variety of suitable manners as described herein or as is known in the art.

In some embodiments, mapping of ridge directions may be performed by collecting a two dimensional meshing with normalized vectors. There are multiple possible algorithms to extract the ridges-direction, such as, in one exemplary embodiment, utilizing the normalized orthogonal direction to the ridges. In the exemplary embodiment of FIG. 4, a set of signals may be collected from vectors on ridges based on their orientation to a set of ellipses, such as ellipses 416, 418, 420, and 422. As described herein, each of the ellipses is centered on a fixed coordinate point in the coordinate system. In some embodiments, the configuration of the ellipses (e.g., size, orientation, eccentricity) may set (e.g., dynamically based on captured images) in a manner that approximates a fit to the ridge structures, resulting in a lower sampling rate and reduced computational load.

Figure 8:
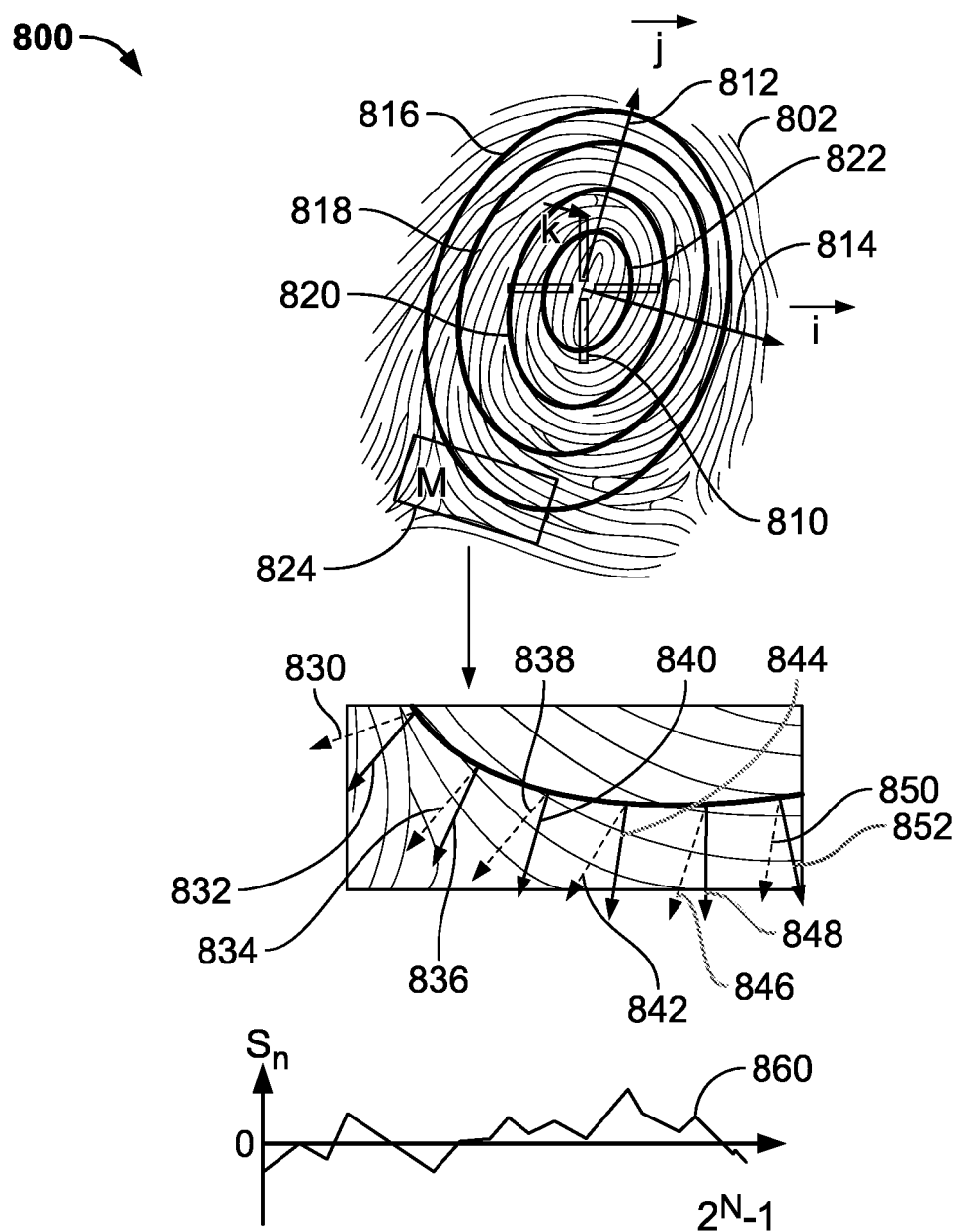
FIG. 8 depicts exemplary fingerprint ridge vector identification and processing in accordance with some embodiments of the present disclosure.

FIG. 8 depicts exemplary fingerprint ridge vector identification and processing 800 in accordance with some embodiments of the present disclosure. Consistent with FIG. 4, a fingerprint capture 802 includes a center point 810 and orientation axes 812 and 814. Ellipses 816, 818, 820, and 822 are situated relative to ridges of the fingerprint 802. In some embodiments, as depicted by expansion box 824, ridge locations may be identified relative to portions of the ellipses.

As depicted for expansion box 824, the ellipses intersect with ridges at particular locations and with particular angles of intersection. Each ellipse will produce a resampled collection of $2^N$ orientation vectors (e.g., a value such as N=7 is adequate to collect 128 orientation vectors $\vec{U_n}$ for each ellipse). The particular sorting or resampling on each ellipse can be either clockwise or counterclockwise by convention. In some embodiments, each orientation vector may be normalized such that for each vector $\vec{U_n}$ a normal direction vector of the ellipse (e.g., vectors 830, 834, 838, 842, 846, and 850). The fingerprint layout vector $\vec{V_n}$ is also acquired (e.g., vectors 832, 836, 840, 844, 848, and 852), with the vector $\vec{V_n}$ normalized also. In an embodiment, the vectors $\vec{V_n}$ and $\vec{U_n}$ may be oriented external to the ellipse. For each ellipse, a sample value may be calculated as follows:

$$s_n = (\vec{U_n} \wedge \vec{V_n}) \cdot \vec{h}$$

$$n = \{0, 1, 2, \ldots, 2^N - 1\}$$

$$\text{with} \ldots \vec{U_n} = \begin{matrix} u_{nx} \\ u_{ny} \\ 0 \end{matrix} \quad \vec{V_n} = \begin{matrix} v_{nx} \\ v_{ny} \\ 0 \end{matrix} \quad \vec{h} = \begin{matrix} 0 \\ 0 \\ 1 \end{matrix}$$

$$\Rightarrow s_n = u_{nx} \cdot v_{ny} - u_{ny} \cdot v_{nx}$$

Sampling coordinates on ellipses may be determined as follows:

$$M \begin{vmatrix} C_x + a \cdot \cos\left(\frac{2\pi n}{2^N}\right) \\ C_y + b \cdot \sin\left(\frac{2\pi n}{2^N}\right) \\ 0 \end{vmatrix}$$

where:
(Cx, Cy, 0) are the coordinates of the current sampling point on the ellipse; and:
a and b are the 2 half-axis lengths of the ellipse.

Sample results 860 may depict exemplary sample results determined according to this methodology. Once sample results are determined, in an embodiment of the present disclosure, the discrete FFT (Fast Fourier Transform) for the collections Sn may be calculated as follows:

$$\begin{array}{c} Sn \\ \downarrow FFT \end{array}$$

$$S_k = \sum_{n=0}^{2^N-1} s_n \cdot e^{-i2kn}$$

$S_k$ collection of $N$ complex values $s_n$ collection of sampled real signal values $K$ discrete frequency $(k = 0, 1, 2, \ldots, 2^N - 1)$ where:
Each discrete frequency provides a complex amplitude;
Frequency 0 is the average value;
Frequencies 1, 2 (low) are subject to very common features and associated bits will have some undesirable correlation, such that associated feature vectors may discarded; and
Frequencies 3 to 12 are carrying the relevant fingerprint features present in the collected signals, such that associated feature vectors may be retained.

According to FFT properties, the FFT feature vectors are orthogonal. Frequencies beyond 12 may provide less stability as a result of having higher sensitivity to noise, finger pressure, errors of measurement on reference point position, and direction. In some embodiments, the retained feature vectors are independent inside a common collecting ellipse. This result may be a feature resulting from the nature of individual fingers and the orthogonality of the Fourier base. The respective gaps between ellipses may be selected to optimize gap distance and correlation between ellipse vector results. In some embodiments, using around 4 or 5 ellipses provides a good compromise to provide independent bits with high entropy.

Once the values are calculated for the fingerprint data (e.g., by FFT of vectors of intersection between ellipses fingerprint ridges and/or other methods as described herein, a validity mask may be calculated for the data. For each ellipse and each frequency, the resulting output has a complex amplitude. The real part and the imaginary part may be separated as amplitudes of separated feature vectors. In a registration phase, a threshold of an absolute value of amplitude may be applied to determine the associated bit code and can be retained or discarded. If the threshold is exceeded, the bit can be considered as valid and usable for a biometric code as described herein. By arbitrary convention the validity bit may be 1 when the amplitude meets the threshold criteria and 0 when it does not.

In some embodiments, an accumulation frame by frame of feature vector amplitudes can be optionally included to improve the stability of the measurement. As described herein, the registration process may continue until the minimum number of required valid bits is hit and the minor validity mask may be set. When a validity bit is set at 1, the code bit value will be set by the sign of amplitude of the corresponding feature vector (e.g., 1 for positive, 0 for negative).

During a verification phase of such fingerprint data, the process or collecting valid bits continues until all the validity mask bits at 1 from the registration will reach a 1 for the verification phase, as described herein for other biometric modalities. At the conclusion of the process, as described herein, a compact code for authentication/identification is issued that matches the code that was issued during the registration step when the same finger is presented to the sensor. Similarly, as described herein, a repeatable code generated from the compact code, such as a hash of the compact code, will produce a repeatable code (e.g., biometric hash) that matches the repeatable code (e.g., biometric hash) from registration.

Figure 9:
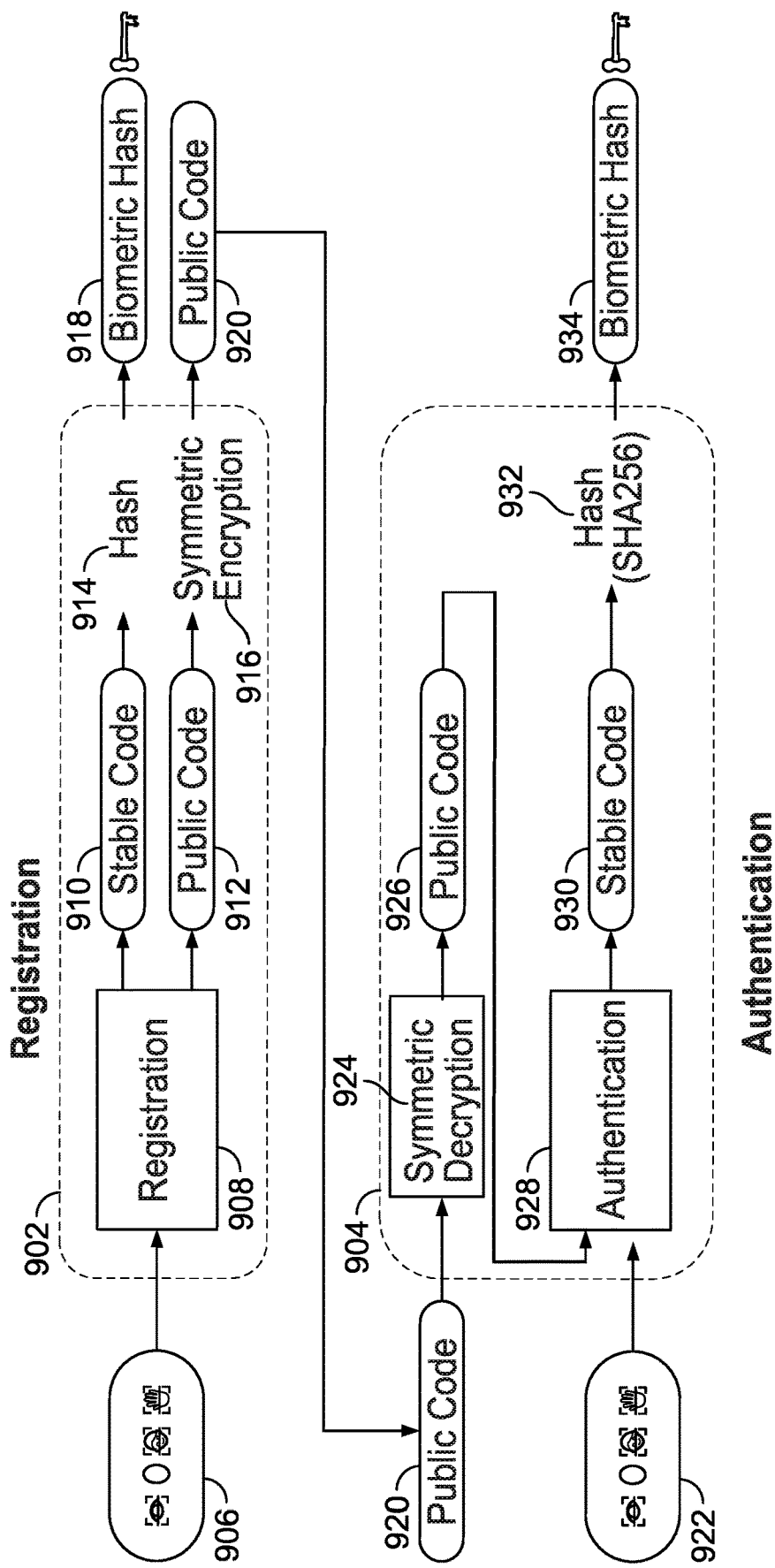
FIG. 9 depicts an exemplary embodiment of biometric registration and authentication in accordance with some embodiments of the present disclosure.

FIG. 9 depicts an exemplary embodiment of biometric registration and authentication in accordance with some embodiments of the present disclosure. For the exemplary embodiment of FIG. 9, the process will be described in the context of a fingerprint type biometric data, although it will be understood that the disclosure of FIG. 9 may suitably be applied to other biometric applications (e.g., iris, facial, etc.) and confirmation of other measurements of physical and chemical properties. In the exemplary embodiment of FIG. 9, a registration device 902 and an authentication device 904 (each of the devices 902 and 904 including a local biometric capture device and supporting hardware and software, whether as an integrated device or multiple devices in communication with each other) are used at different times to first acquire the biometric data of a user and then authenticate the user at a later time based on a later acquisition of the same biometric data.

A biometric capture device 906 such as a fingerprint capture system (e.g., optical sensing, capacitive sensing, ultrasonic sensing, thermal sensing) may capture biometric data of a user. In some embodiments, multiple samples of the biometric feature may be examined from a single use, or the user may additionally be asked to provide multiple readings (e.g., multiple cycles of pressing a fingerprint on a reader) in order to acquire additional samples for analysis and comparison.

A registration portion 908 of the registration device 902 (e.g., portions of one or more computing devices executing computer-readable instructions to perform the operations described herein) may perform operations as described herein in order to generate biometric codes, keys, and related data (e.g., relocation information) for performing biometric registration and authentication as described herein. In an exemplary embodiment of fingerprint registration, an ROI or set of ROIs (e.g., in some embodiments multiple ROIs may be used to allow for additional variability in finger placement) may be selected and projected onto a feature vector base, and feature vectors may be selected (e.g., based on acceptability for consistent binarization and low likelihood of bit inversion). Relocation data may be encoded and selected feature vectors processed with a validity mask.

Although the registration portion 908 of the registration device 902 may generate a variety of biometric codes, keys, and related data, in an exemplary embodiment of the present disclosure the registration portion 908 may generate a stable code 910 and public code 912. In some embodiments, a public code 912 does not contain any biometric information, such that the information carried by the public code 912 does not allow a third party to identify a person by guessing any bit value of the stable code 910. This separation between the public code 912 and the stable code (i.e., which includes biometric information, which is later obscured such as by hashing before being released for use) facilitates a system in which actual underlying biometric data never needs to be transmitted or stored. In some embodiments of the present disclosure, the public code 912 is generated at the registration stage only (e.g., at registration device 902), while in some embodiments, a public code may be a modification of earlier public code. If a modification of a prior public code is used to generate a public code 912, any such modification will impact the associated stable code 910.

The public code 912 may function to facilitate the stable code 910 generation algorithm to get the proper feature vectors listed and sorted that will enable stable bit extraction when the biometric scan comes from a genuine person.

The public code 912 may include information used to select the feature vectors that are in turn used to rebuild the stable code 910. The particular manner of operation of the public code 912 may vary based on the particular biometric modality. The public code contains guiding information telling a device during another biometric capture where the stable or repeatable features are located that are to be used for binarization and how all this information is sorted. The public code answers to the question of "where is the information?" However, in answering that question the public code does not contain any information allowing any third party to guess any bits of the stable code in the absence of the actual underlying biometric information. In an exemplary embodiment of a biometric scan, the public code can include a validity mask, which delineates which bits derived from biometric information should be considered valid and which bits should be discarded. The calibration of extraction of feature vectors may be automatically controlled by use of natural boundaries and easy locating points such as the internal and external biometric boundaries, or detection of a common axis between the two eyes. In an exemplary embodiment of a fingerprint, more complex information may be required in the public code, because a fingerprint may have a limited number of natural boundaries or common and repeatable patterns. Thus, the position and orientation of a region used to extract a stable code 910 for a fingerprint (e.g., relocation data) may be additional necessary information that must be passed in the public code 912 to enable stable feature extraction during authentication.

Although a public code 912 may include a variety of data types and structures, an exemplary public code 912 for captured biometric data (e.g., fingerprint data) may include a variety of information that, while not identifying any aspect of the underlying biometric data, assists in the generation of biometric stable codes during authentication that may be compared bitwise (e.g., after generation of a repeatable code such as by hashing) with the biometric stable code 910. For example, in an embodiment, the public code may include data for relocation of a fingerprint captured during authentication as well as calibration data for generation of a stable code. Exemplary relocation data may include information for identifying particular features for relocation, such as a table of pixel data containing features of interest and a table of selected coordinates of feature vectors in a feature vector space. Exemplary data for calibration may include information such as a table of reference phases (e.g., 1 value per selected feature vector) and optional information such as salt bits, obfuscating code, and data representing a validity mask.

Relocation data may be processed and stored in a variety of ways, depending on factors such as the particular relocation method used, available bits of the public code 912, and the like. One exemplary way to produce relocation data is to produce a kernel of correlation data extracted from the registration scan data with an annular mask encircling the ROI. The relocation process will attempt a sequence of correlations with the correlation kernel rotated at different angles by small steps (e.g., every 2 degrees) as compared to the acquired authentication data. The maximum of all correlation peaks will correspond to the location for translation (e.g., on the x-and-y axes of the acquired data) and the angle of rotation ($\theta$) around the ROI center point after translation. Once the relocation is performed at an authentication phase, the ROI data may be resampled at the translated and rotated coordinates so the matrix of data including the feature vectors projection is ready for further processing.

While correlation is one method producing good relocation results in terms of accuracy (low error rate) in some embodiments, in other embodiments techniques such as fingerprint stitching may be used to identify relocation data.

In an embodiment of the present disclosure, a stable code 910 may be a binary code or a sequence of characters issued from the binarization of the projection of the biometric scan. A table of selected coordinates of feature vectors in feature vector space may be a list of coordinates in the feature vector space. These coordinates may be selected at the registration phase as coordinates that correspond to stable feature vectors. As depicted and described with respect to FIG. 10 herein, particular coordinates may be selected to provide independent bits for use in generating the stable code 910. As described herein, a number of rules may be enforced with respect to the statistical properties of the fingerprint patterns and texture in the space of feature vectors.

The sequence and selection of used feature vectors for the stable code 910 is guided by the public code 912. The size of the stable code 910 may be directly dependent of the number of independent feature vectors identified as strong during registration. For example, for a fingerprint acquired at 500 dpi and ROI diameter 4 mm, an exemplary number of stable bits may be 64. A high level of internal independency of bits is enabled based on an orthogonal base of feature vectors. The high level of external independency of bits is enabled by not constraining the ROI to a particular position within the fingerprint (e.g., core, delta point, or other similar position) and using highly discriminant feature vectors.

Figure 10:
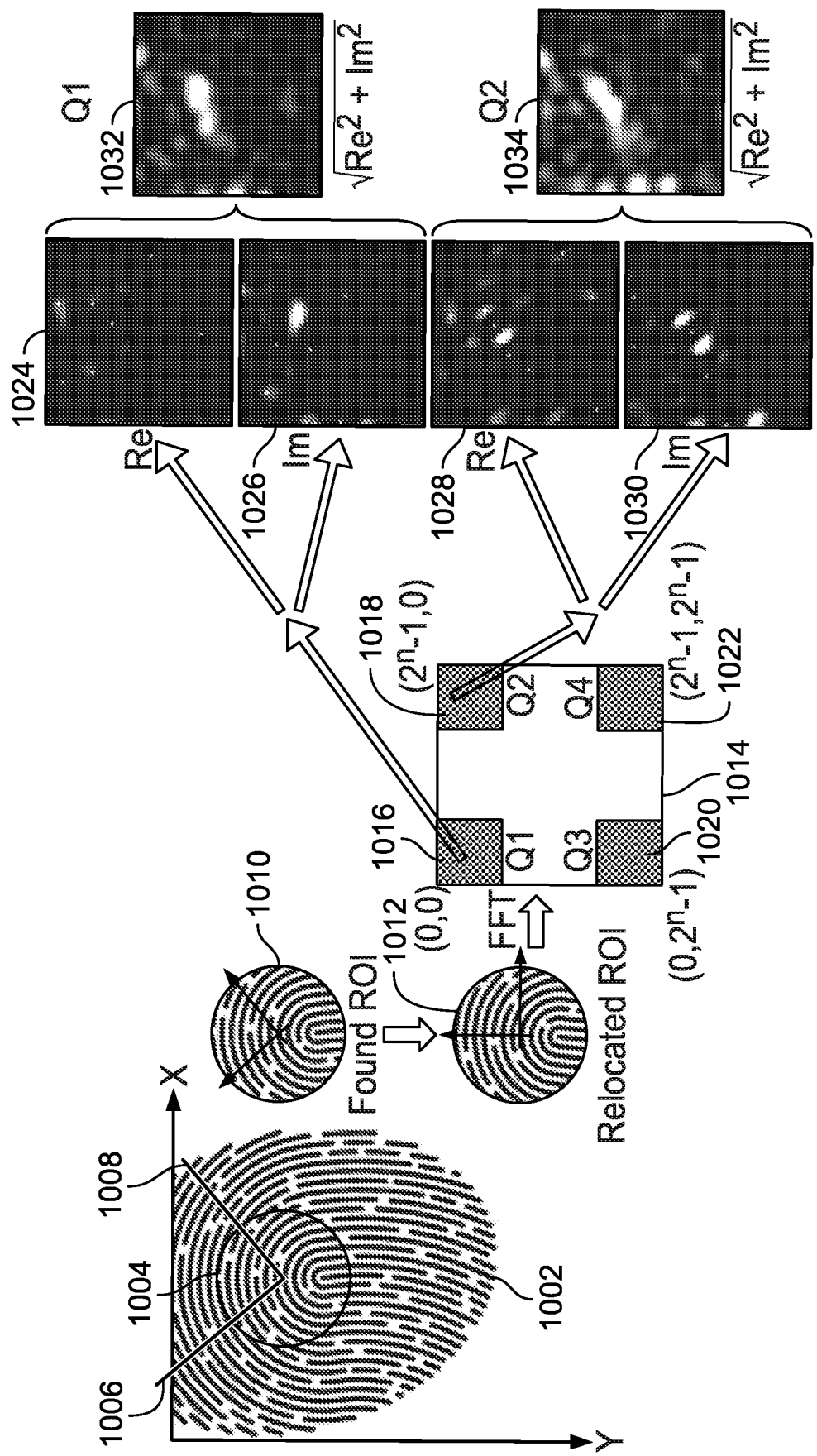
FIG. 10 depicts exemplary extraction of feature vectors for use in developing a stable code in accordance with some embodiments of the present disclosure.

FIG. 10 depicts exemplary extraction of feature vectors for use in developing a stable code 910 in accordance with some embodiments of the present disclosure. An efficient space to search for extracting stable feature vectors is present in the Fourier space of the ROI. An FFT operates on a complex matrix of the discrete Fourier Transform. A two-dimensional FFT is operated on matrix size $2^n \times 2^n$, with n being a positive integer value. In some embodiments, a value of n=6 or may be utilized for fingerprint scans (e.g., corresponding to a resolution of 500 dpi) to cover the ROI without underdamping the image and to cover the range of spatial frequency where stable features are found. An exemplary advantage of using the Fourier space includes having control of the spatial frequency bandwidth to collect stable features. Another exemplary advantage of using the Fourier space may be that each vector is a function of all collected pixel data in the ROI, such that there is not a strong dependence of a local area that could be corrupted by scratches or points of moisture or other types of fingerprint data corruption. Another exemplary advantage of using the Fourier space that the frequency selection may automatically reject very low frequencies that are more related to variation of pressure or moisture of the finger than actual biometric features. It may also reject high frequencies that collect more noise and instability triggered by residual errors of relocation.

As depicted in FIG. 10, a fingerprint 1002 may be associated with an ROI 1004, that in turn is centered at the intersection of axes 1006 and 1008 and oriented with respect to these axes. In some embodiments, an identified ROI 1010 may be relocated, and the relocated ROI 1012 may be analyzed based on a two-dimensional map 1014 of an FFT of the relocated ROI 1012. Although a variety of locations may be selected for analysis, in the embodiment of FIG. 10, four respective quadrants 1016, 1018, 1020, and 1022 are selected in the low and medium spatial frequencies on the two dimensional map 1014 of the FFT.

In the embodiment depicted in FIG. 10, the generation of two feature vectors 1032 and 1034 from respective quadrants 1016 and 1018 are depicted. In the exemplary embodiment of FIG. 10, quadrants 1020 and 1022 may be symmetrically redundant because the input matrix is a real matrix. The result is an even complex function where the real part and imaginary part are represented in two separate matrices, as represented by real and imaginary data 1024 and 1026 (real and imaginary data with respect to quadrant 1016 and feature vector 1032), and real and imaginary data 1028 and 1030 (real and imaginary data with respect to quadrant 1018 and feature vector 1034). In the exemplary images of FIG. 10, lighter areas may correspond to negative values, while grey areas may correspond to positive values.

Figure 11:
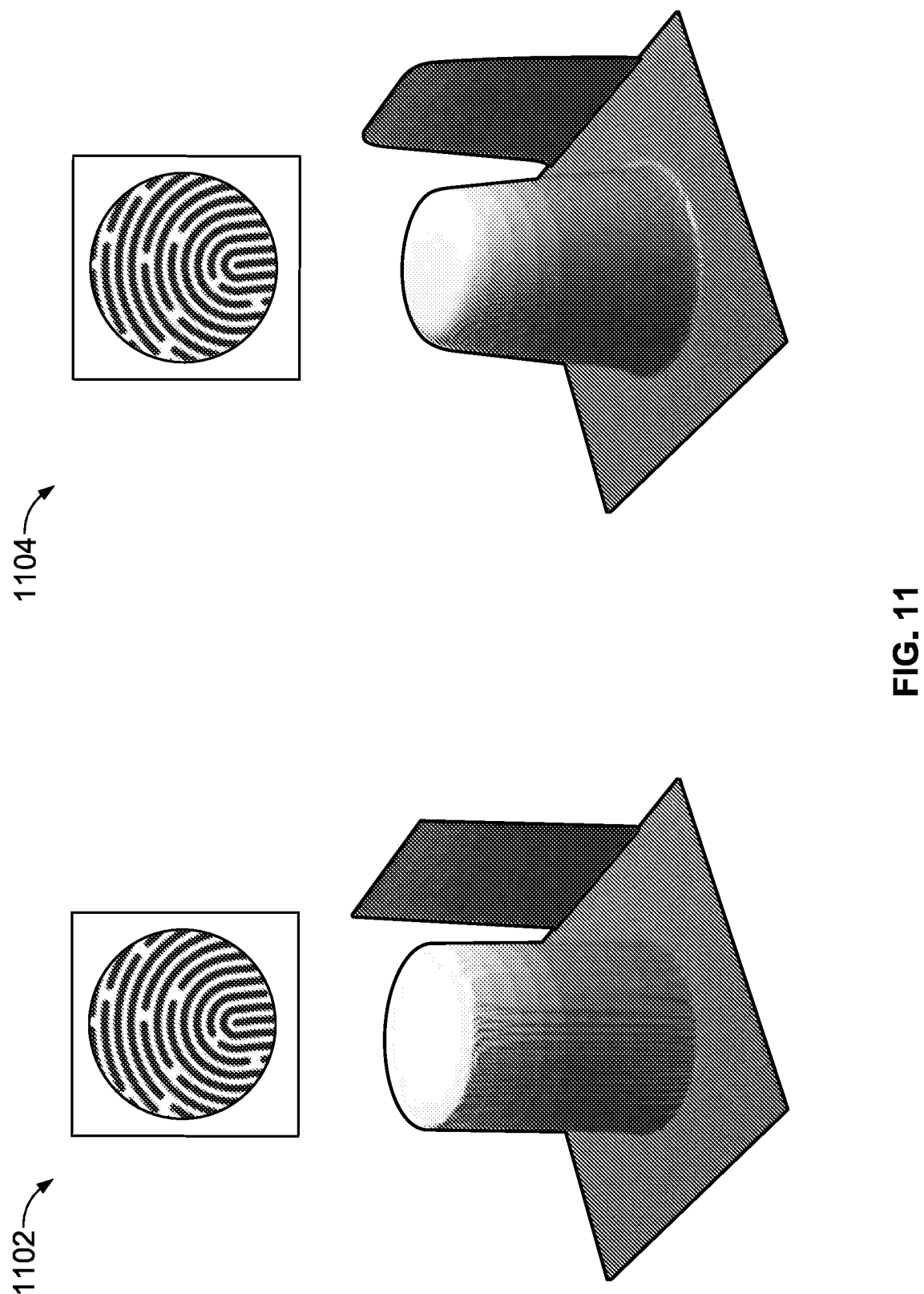
FIG. 11 depicts an exemplary supporting mask of a region of interest in accordance with some embodiments of the present disclosure.

FIG. 11 depicts an exemplary supporting mask of a region of interest in accordance with some embodiments of the present disclosure. FIG. 11 depicts an exemplary ROI before masking (1102) and after masking (1104). In some embodiments of the present disclosure, a supporting mask of the ROI may be a disk or an ellipse with low eccentricity. This cropping mask may provide a level of performance independent of the finger orientation, and in some embodiments, may be apodized by a rotational symmetrical revolute smoothing function as shown at 1104. In an embodiment, a function having a "hat" shape can be used, including a hyper-gaussian function such as the following:

$$A'(x, y) = \langle A \rangle + (A(x, y) - \langle A \rangle) \cdot e^{-\left(\frac{(x-x_c)^2+(y-y_c)^2}{2\sigma^2}\right)^n}$$

The apodization may provide better numerical stability on amplitudes of feature vector projection $\langle A'(x, y)|FV_i\rangle$ in response to small uncontrolled errors of relocation, for example, by smoothing the weight ponderation of pixels at or near the border regions of the ROI. A relocation error in translation may produce a phase shift. For example, if the feature vector base is on the Fourier Transform of the ROI, the relocation error of translation T(dx, dy) on the complex amplitude produces $T_{(dx,dy)}$ (FV(u,v)), where:

$$T_{(dx,dy)}FV(u,v) = e^{-2i\pi((u\cdot dx+v\cdot dy)} \cdot FV(u,v)$$

and where (u,v) are spatial frequencies in the Fourier domain

Figure 12:
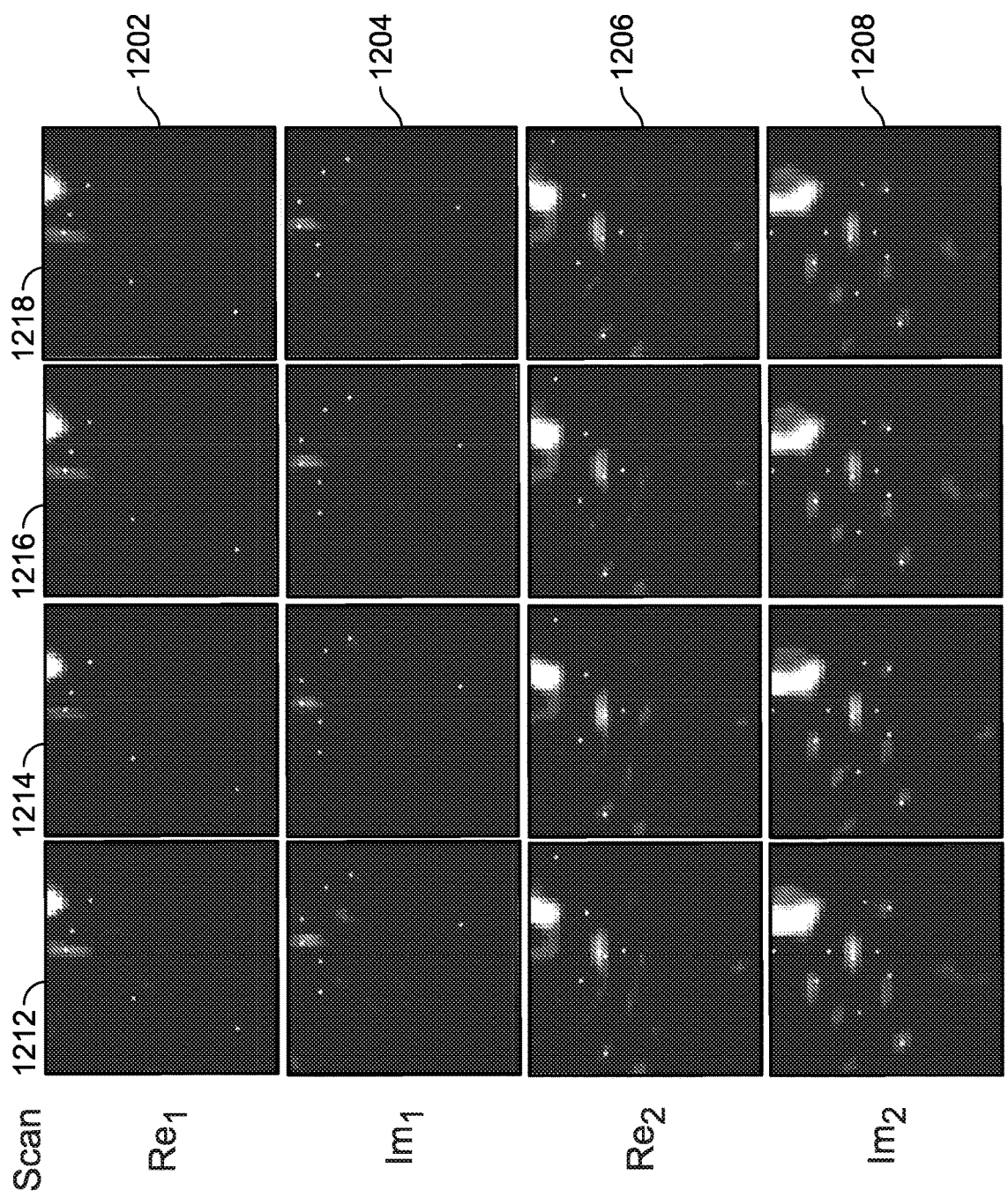
FIG. 12 depicts exemplary feature vector maps extracted from four captures of the same finger at different times in accordance with some embodiments of the present disclosure.

FIG. 12 depicts exemplary feature vector maps extracted from four captures 1212, 1214, 1216, and 1218 of the same finger at different times 1202, 1204, 1206, and 1208 in accordance with some embodiments of the present disclosure. A texture in the Fourier base from fingerprint data processed as described herein may produce peaks and valleys that are consistent from one biometric scan to another. The results may be resilient to error sources such as natural relocation errors, changes in fingerprint pressure, moisture, noise from the sensor, and the like. When processed as described herein, the peaks and valleys of the feature vectors due to fingerprint features such as ridge position may be orders of magnitude more prominent and stable than changes due to finger placement, pressure, moisture, sensor noise, and the like. By selecting individual points in the Fourier domain where the amplitudes are high on peaks and low at the bottom of valleys, it is possible to obtain the large gaps between data representative of "1" or "0," resulting in a high tolerance to variations on the fingerprint scan conditions and local corruptions such as scratches on the skin.

Figure 13:
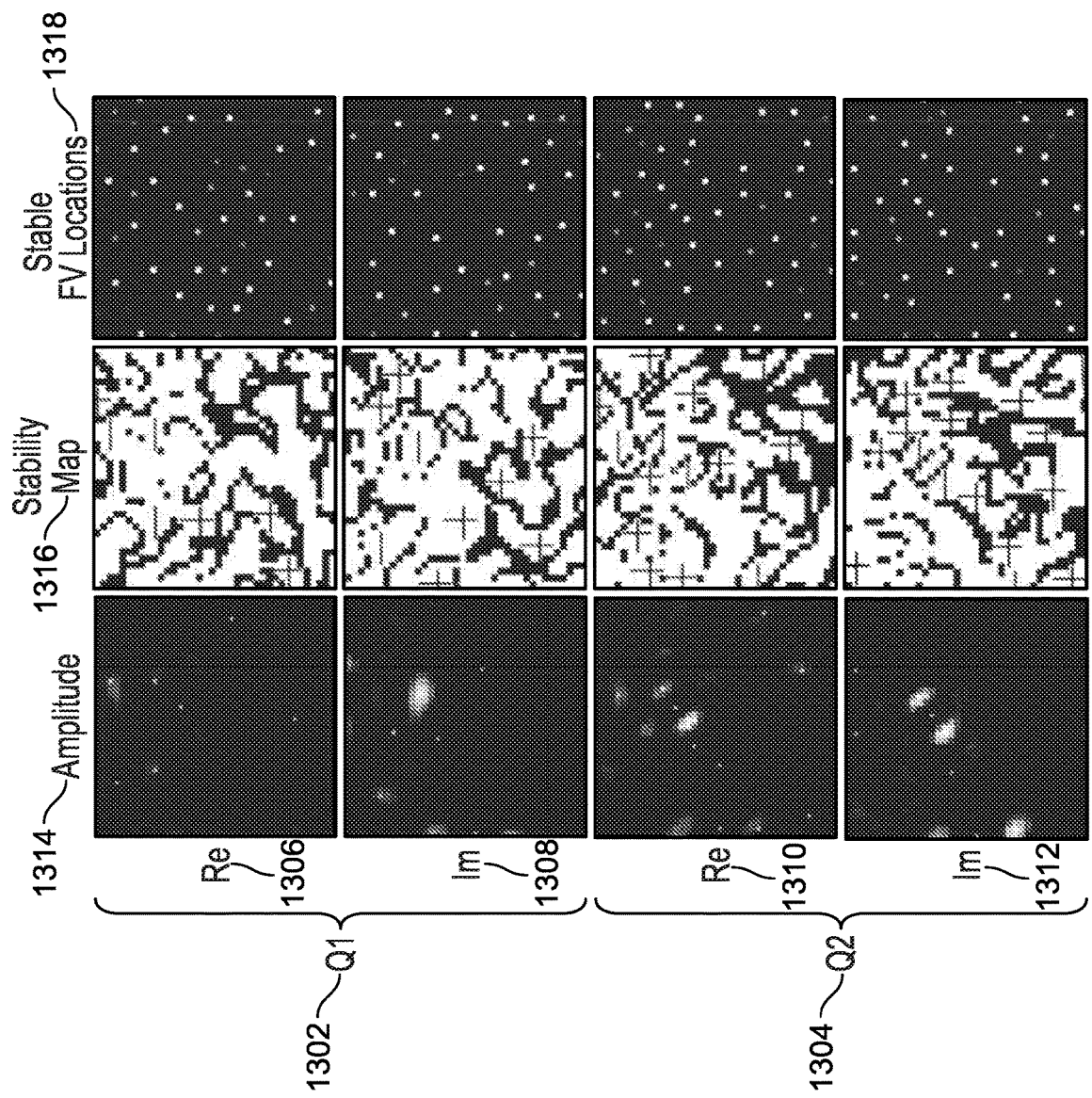
FIG. 13 depicts an exemplary identification of stable feature vector locations from Fourier amplitude maps in accordance with some embodiments of the present disclosure.

FIG. 13 depicts an exemplary identification of stable feature vector locations from Fourier amplitude maps 1314 in accordance with some embodiments of the present disclosure. As depicted in FIG. 13, each of a first quadrant 1302 feature vector and second quadrant 1304 feature vector 1304 includes respective real and imaginary parts (real part 1306 and imaginary part 1308 for first quadrant 1302, and real part 1310 and imaginary part 1312 for second quadrant 1304). From these exemplary Fourier amplitude maps 1314, peaks and valleys in the range of discriminant frequencies may be identified. In an embodiment, an evaluation of volume continence of these peaks and valleys may provide a good estimator of the respective strength of these peaks and valleys. By sorting these volumes, a list of best candidates for selection of feature vectors (e.g., during the registration stage) may be acquired.

Stability maps 1316 may represent the degree to which feature vectors have errors over a number of scans after binarization. For example, the darker zones may represent portions of the feature vectors that experienced errors during the number of scans under test (e.g., at least one error per hundred scans) while light regions may represent feature vectors that did not experience errors, or experienced less than a threshold percentage of errors. Stable feature vector locations 1318 may correspond to locations within the feature vectors that are possibilities for binarization based on exceeding a threshold level of stability. The actual selection of particular locations may be based on a number of factors such as number of bits needed for binarization, respective stability levels, diversity of stable locations, and other similar factors.

Figure 14:
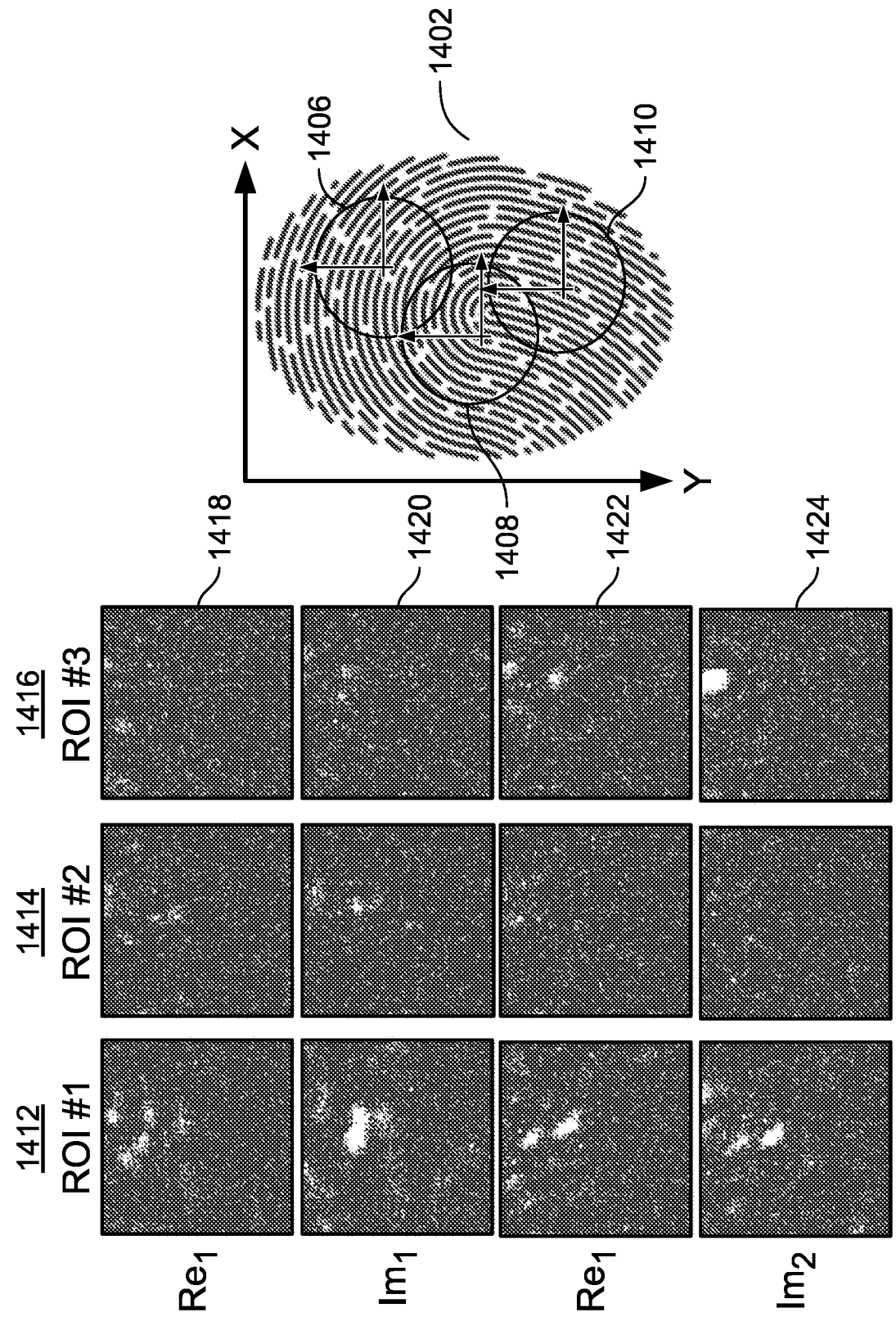
FIG. 14 depicts an exemplary fingerprint capture with multiple ROIs in accordance with some embodiments of the present disclosure.

FIG. 14 depicts an exemplary fingerprint capture with multiple ROIs in accordance with some embodiments of the present disclosure. Each ROI may have a shape and size (e.g., circular with a particular diameter) such that multiple ROIs can be obtained from a single typical fingerprint. Acquiring multiple ROIs at registration and authentication may provide additional tolerance against user or equipment error, or damaged fingerprints that do not provide a complete fingerprint image. In some embodiments, multiple ROIs (e.g., ROIs 1406, 1408, and 1410) of a fingerprint image (e.g., fingerprint image 1402) may allow the establishment of multiple independent feature vectors and associated public codes and stable codes, for example, based on respective ROI feature vectors (e.g., feature vectors 1412, 1414, and 1416) and the respective real and imaginary parts of data quadrants formed therefrom (e.g., real part 1418 and imaginary part 1420 of a first quadrant and real part 1422 and imaginary part 1424 of a second quadrant).

Figure 15:
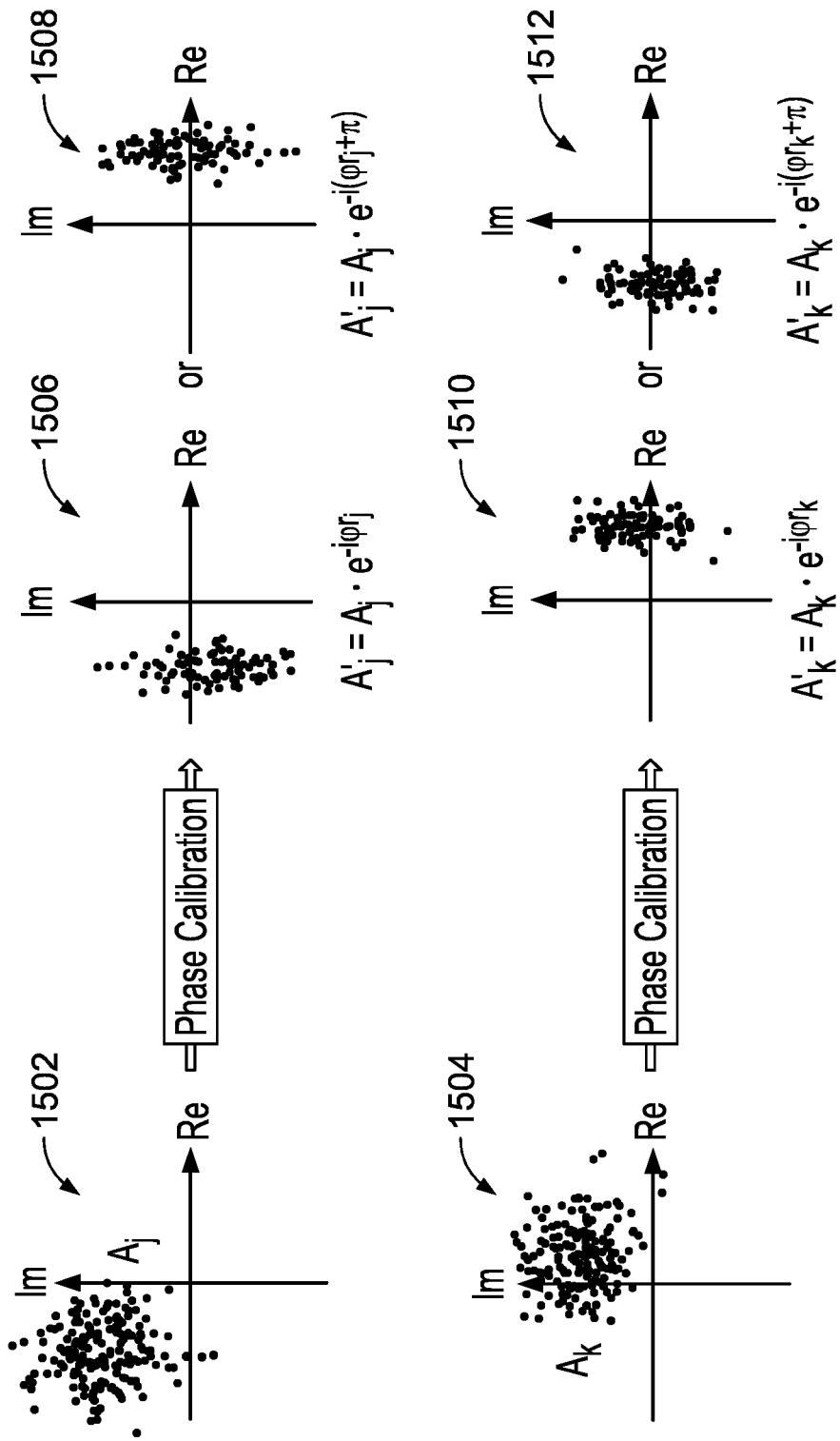
FIG. 15 depicts an exemplary phase calibration for binarization of feature vector data in accordance with some embodiments of the present disclosure.

FIG. 15 depicts an exemplary phase calibration for binarization of feature vector data in accordance with some embodiments of the present disclosure. In some embodiments, in order to maximize the tolerance of the system to relocation error during authentication, a phase reference for binarization of the feature vector data can be set (e.g., centered) based on the measured phase at registration. The phase reference may then be recorded in the public code for each feature vector. In some embodiments, a number of operations may be performed to remove any biometric information from the phase reference information of the public code, such that no discernable biometric data nor any information that can be used to determine underlying biometric data is included in the public code.

Feature vector samples 1502 depict a first set of acquired feature vectors "j" on real (x-axis) and imaginary (y-axis) axes for a first acquired fingerprint of a first user, while feature vector samples 1504 depict a second set of acquired feature vectors "k" on real and imaginary axes for a second acquired fingerprint of second user. Calibrated feature vector samples 1506 and 1508 correspond to "j" feature vector samples 1502 after binarization about the real axis, e.g., such that the resulting feature vector samples 1506 and 1508 are clearly defined by their real components and enabling binarization based on the feature vector sample values on the real axis (e.g., "j" feature vector samples 1506 corresponding to "0," "j" feature vector samples 1508 corresponding to "1," or vice-versa). Calibrated feature vector samples 1510 and 1512 correspond to "k" feature vector samples 1504 after binarization about the real axis, e.g., such that the resulting feature vector samples 1510 and 1512 are clearly defined by their real components and enabling binarization based on the feature vector sample values on the real axis (e.g., "k" feature vector samples 1510 corresponding to "0," "k" feature vector samples 1512 corresponding to "1," or vice-versa). In other embodiments, phase calibration for binarization may be performed in different manners, for example, by calibrating for binarization about the imaginary axis.

For each feature vector associated with each biometric (e.g., fingerprint) data capture, in an embodiment, the measured complex amplitude $A_j$ may be multiplied by $e^{-i\varphi r_j}$ to reduce the probability of error in binarization where $\varphi$ corresponds to the reference phase that is to be recorded with the public code. For exemplary "j" feature vector samples 1502, the result may correspond to $A'_j = A_j \cdot e^{-i\varphi r_j}$. In an embodiment, for each feature vector $FV_j$ of rank "j," the reference phase may be recorded in encrypted form by a random inversion of the phase. An inversion of phase inverts the associated bit code. The original phases before applying the sequence of random inversion of phase reference may not be recorded in the public code, so it will not be possible to guess any bit of the stable code without access to the genuine biometric scan to project the related feature vectors on it. An inversion of the phase inverts the associated bit code, for example, as follows:

$$\varphi r_j = \varphi(FV_j) \cdot e^{i\pi \cdot Bit\_rand(\ )}$$

In an exemplary embodiment, the value for "Bit_rand( )" may be 0 or 1 based on a suitable random value generation (e.g., utilizing pure random base generation with equal distributed probabilities 0.5 and 0.5). A resulting table of $\varphi r_j$ may correspond to a table of reference phases, with one value per selected feature vector. Accordingly, the resulting calibrated feature vector samples (e.g., $A'_j$ for feature vector samples 1506 and 1508 generated from $A_j$ feature vector samples 1502 and $A'_k$ for feature vector samples 1510 and 1512 generated from $A_k$ feature vector samples 1504) may correspond to the following:

$$A'_j = A_j \cdot e^{-i(\varphi r_j + \pi \cdot Bit\_rand(\ ))}$$

A more precise estimation of $\varphi r_j$ may be obtained by performing the registration over multiple biometric (e.g., fingerprint) data captures by averaging the respective amplitudes associated with captured data. In an embodiment, an equivalent relocation error contribution from the registration stage may decrease in accordance with the inverse square root of the number of registration captures.

The function Bit_rand( ) may produce random bit values 0 or 1. From a cryptographic perspective, the random bit generator may provide as close to true random data as possible. Random values created such as by a pseudo-random generator may include deterministic sequences that could result in a security breach. In an embodiment, the underlying random values utilized for the phase calibration may not be recorded in the public code, such that for each phase reference recorded in the public code it is not possible to determine whether the particular bit for the phase reference was inverted or not during the generation phase.

The captured biometric (e.g., fingerprint) data from registration may contain a number of different categories of noise, such as shot noise, that may be largely or entirely uncorrelated with underlying information that is useful for generating the public code and/or primary code. In some embodiments, LSBs (Less Significant Bits) of the captured biometric data (e.g., corresponding to uncorrelated noise) from registration may be used as a source of random bits. Any minimal residual correlation with the original image of registration does not cause a threat for determining the underlying biometric data because the image and associated biometric information will not be stored anywhere after use and will be erased from the memory as soon the registration is completed.

Figure 16:
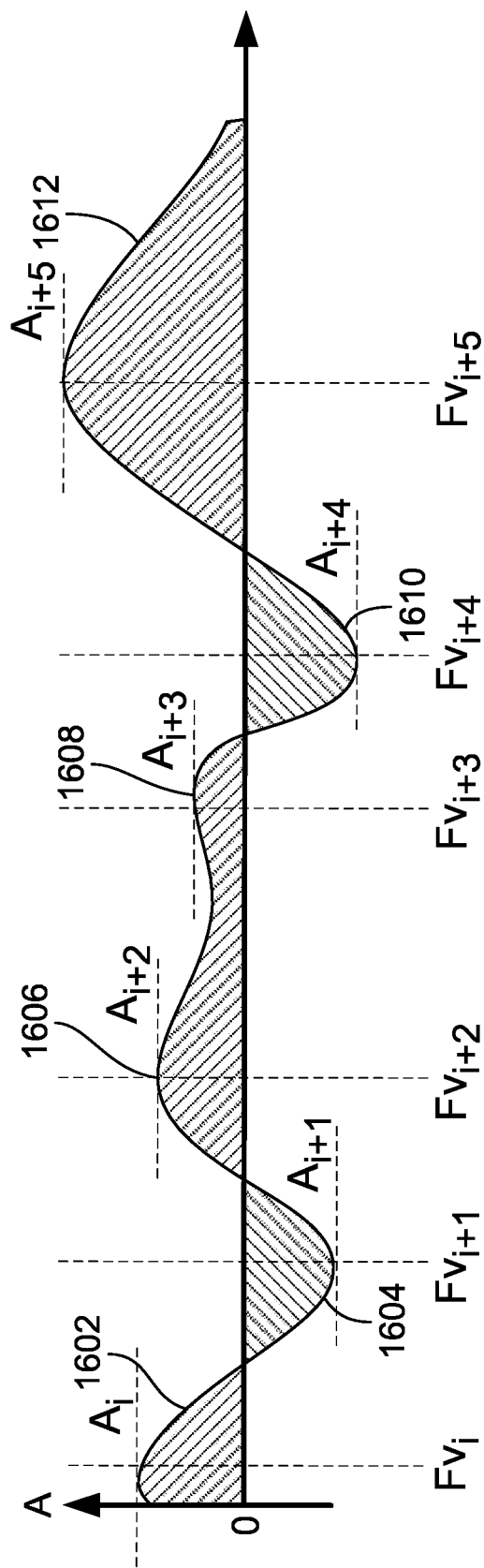
FIG. 16 depicts an exemplary binarization of feature vector amplitudes in accordance with some embodiments of the present disclosure.

FIG. 16 depicts an exemplary binarization of feature vector amplitudes in accordance with some embodiments of the present disclosure. The representation of FIG. 16 simplifies the two dimensional signal into a one dimensional signal for clarity of the representation of feature vectors (x-axis) versus amplitude (y-axis). Although it will be understood that feature vector data may be binarized in a number of ways based on amplitude and changes in amplitude, in the exemplary embodiment of FIG. 16 the feature vectors are identified and binarized based on amplitude zero crossings (e.g., where a zero amplitude crossing occurs at a threshold slope value, the zero crossing exceeds a threshold portion of feature vector data along the x-axis, and/or the maximum amplitude (e.g., at slope equal to zero) for the zero crossing exceeds a threshold).

As depicted in FIG. 16, a set of feature vectors $FV_i$ 1602, $FV_{i+1}$ 1604, $FV_{i+2}$ 1606, $FV_{i+3}$ 1608, $FV_{i+4}$ 1610, and $FV_{i+5}$ 1612 may be identified as having corresponding zero-slope amplitude peaks/valleys $A_i$ (for $FV_i$ 1602), $A_{i+1}$ (for $FV_{i+1}$ 1604), $A_{i+2}$ (for $FV_{i+2}$ 1606), $A_{i+3}$ (for $FV_{i+3}$ 1608), $A_{i+4}$ (for $FV_{i+4}$ 1610), $A_{i+5}$ (for $FV_{i+5}$ 1612). In an exemplary embodiment, a peak (amplitude >0) may correspond to a binary "1" while a valley (amplitude <1) may correspond to a binary value of "0." In another exemplary embodiment, binarization may be based on certain respective feature vector parameters meeting threshold conditions, such as the absolute difference between feature vector amplitudes (e.g., zero-slope peaks and valleys) exceeding a threshold, requiring a zero amplitude crossing between peaks and valleys, absolute value of amplitude at peaks and valleys, other suitable techniques, and combinations thereof. Stricter requirements for feature vector value binarization decrease the number of bits but reduce the probability of bit inversion on verification as a result of natural variations. To maintain cross dependence of bits, a particular feature vector amplitude peak or valley may only be used once for generation of feature vector binary bits.

Returning to FIG. 9, a validity mask of public code 912 may also be generated as a component of the public code 912. In accordance with the present disclosure, the validity mask may not contain any biometric information or any other mention that enables derivation of any bits of the stable code 910. Each bit of the validity mask may be associated with a bit of the generated stable code 910. In an exemplary embodiment of a fingerprint, the set of feature vector coordinates used to generate the stable code 910 may not require the use of a validity mask for registration or authentication, since a valid bit may exist for each feature vector used to generate the code. In some embodiments, however, introducing a validity mask into the public code 912 may provide significant additional flexibility for the creation of pairs of stable code bits. A validity mask applied on the stable code (e.g., by an AND Boolean operator) may facilitate selection of a preferred subset of valid bits and provide more mechanisms for later code revocation. For example, providing a validity mask in addition to the stable code enables revocation of a stable code to be replaced by another without having to scan the finger again. Changing a subset of selected bits of the validity mask of the public code will also change the repeatable biometric hash code that is dependent on the validity mask of public code 912.

The stable code 910 may undergo a hashing operation 914 (e.g., as an example of generating a repeatable code). Because the stable code 910 is the sole source of underlying biometric information (i.e., biometric information cannot be determined from public code 912), the hashing algorithm should be a robust one-way hashing algorithm (e.g., SHA-256). In some embodiments, a salt may be utilized for the hashing operation 914. The biometric code size for the stable code 910 may be directly dependent on the number of independent stable bits that were collected during the registration process. For example, utilizing existing fingerprint capture techniques, it may be possible to collect 30-70 stable bits on an ROI having a diameter of 3 mm to 5 mm. The stable code may be normalized to a suitable number of bits (e.g., $2^N$ bits, where N is an integer) such as by concatenating the stable code into a 64-bit pattern for the hashing operation 914 to generate the biometric hash 918 (e.g., a 256-bit biometric hash generated using SHA256 hashing).

From a security standpoint, a repeatable code such as the biometric hash 918 should be long enough to be resistant to attacks such as a brute force attack. One manner to expand the number of bits in the biometric hash result is to add a number of "salt" bits. In an embodiment, the salt bits may be random bits that are included within the public code 912. Because the salt bits are generated by a random process, they do not contain any biometric information. In some embodiments, it may nonetheless be desirable to obscure the salt bits within the public code 912. For example, the salt bits may be interspersed within the public code 912 according to a number of known obfuscation methods. There are efficient confusing methods to mix the salt bits in a code well known by people in the art. This requires adding few more bits of confusing code, so the confusion remains decryptable during the verification sequence.

Once all of the data for the public code 912 is obtained (e.g., relocation data, calibration data, reference phases, salt bits, obfuscating code, validity mask etc.) and the public code is constructed, the public code may be encrypted by an encryption operation 916 (e.g., symmetric encryption) to create an encrypted public code 920, which can be published for use by authentication devices. Disclosing the encrypted public code 920 does not reveal any of the underlying biometric information, since the only source of biometric information that is retained after the registration process is the biometric hash 918 (i.e., all intermediary biometric data obtained during registration is permanently deleted).

Nonetheless, a motivated hacker might potentially attempt to determine biometric information at authentication using millions of tests with different modifications of a biometric scan, in combination with a collection of all possible modified public codes, in an attempt to reverse-engineer the relationships between bits of the public codes and the underlying feature vector associated with them. In some embodiments, adding or subtracting data to one or more of the feature vectors, followed by multiplication by a high coefficient may invert a bit of the stable code without affecting other bits. This process is very similar to a matrix diagonalization. Such a hacking process would be extremely resource-intensive, but repeating the process in a brute force manner to track the feature vectors of each bit may be theoretically possible. Nonetheless, so long as the original biometric information is not available (e.g., all biometric data is deleted, and accessible only by verification versus biometric hash 918), the security of the present system remains strong. A hacker with knowledge of what feature vectors are used without having the actual underlying biometric data will not be able to determine bits of the underlying stable code 910 used to generate the biometric hash 918.

It is nonetheless desirable to make it very difficult to reverse engineer even the encrypted public code 920. Accordingly, standard symmetric encryption may be utilized to apply strong encryption to the public code 912. In some embodiments, applying "salt" and "pepper" bits with the relocation information makes identification of bits of the validity mask very difficult for a potential hacker. Creating a salted and encrypted public code with a sufficient number of bits (e.g., 96 bits or more) results in an encrypted public code 920 that is not realistically possible to hack. In some embodiments, a simple symmetric encryption 916 of the public code 912 is adequate to confuse the relationship with the underlying base of feature vectors. In such an embodiment, there may be no need to exchange any keys from the secure registration device 902.

The secure authentication device 904 (or a secure enclave of such a device) may include information to decrypt (e.g., using symmetric decryption 924) to obtain the public code 926. Biometric capture 922 (e.g., fingerprint data capture) may be performed and provided to authentication portion 928, which utilizes the information contained in the code to relocate the data from biometric capture 922, reverse salting and obfuscation operations, and apply the validity mask to obtain the stable code 930. The stable code may be processed to generate a repeatable code such as by hashing operation 932, which utilizes the same hashing algorithm as hashing operation 914. If the bits of stable code 930 corresponding to obtained biometric data from biometric capture 922 (e.g., as modified by the relocation data and validity mask) matches the bits of stable code 910, the biometric hash 934 will match biometric hash 918. These respective biometric hashes may be compared bitwise to authenticate the user, without the underlying biometric information from the biometric scans 906 and 922 ever being accessible outside of the secure registration and authentication devices 902 and 904 (or secure enclaves thereof). The biometric data may further be deleted immediately within the secure devices 902 and 904 immediately after being used to generate the stable codes. In this manner, the present disclosure enables a robust bitwise comparison of biometric data without ever compromising underlying biometric data. The biometric data is only accessible for the minimal time that it exists in the secure devices, and only to the extent that a hacker can obtain unobstructed access to the secure devices.

Figure 17:
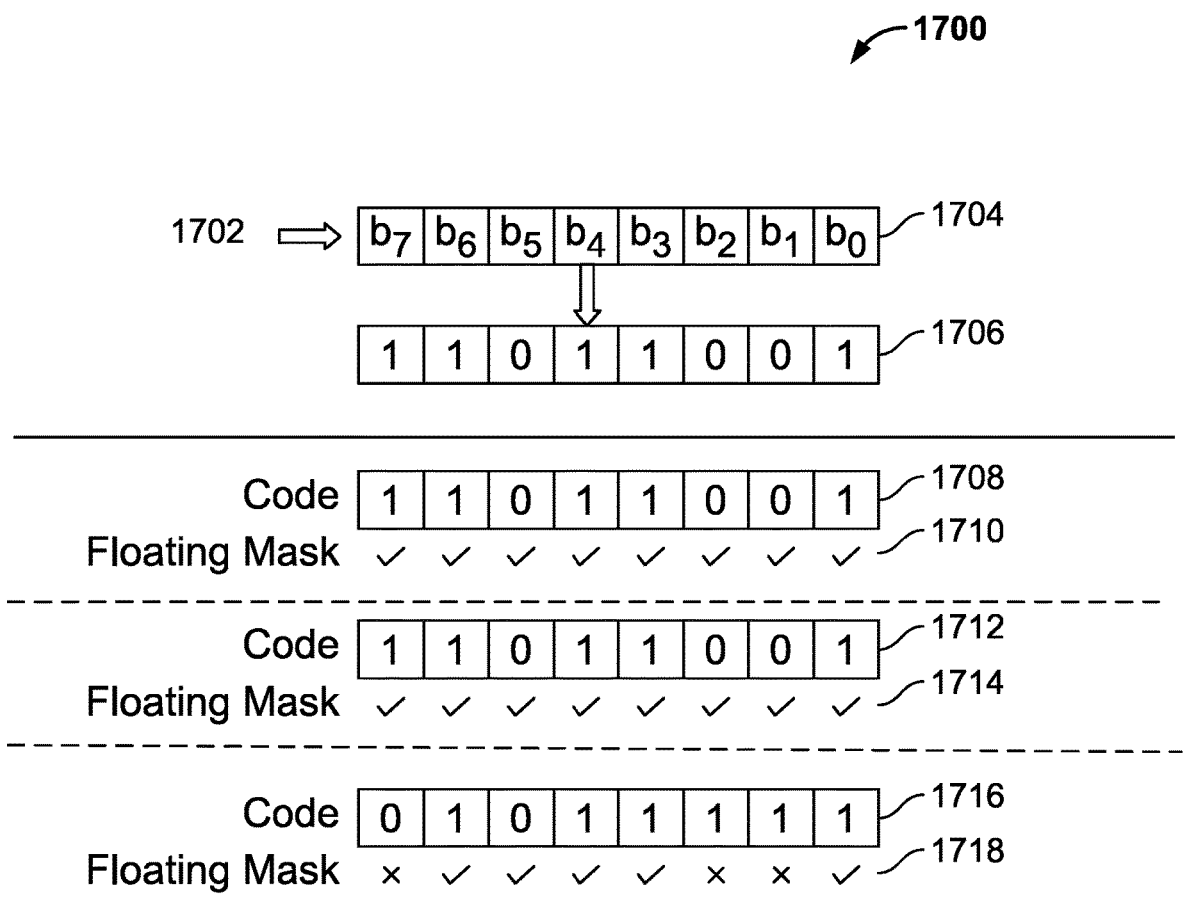
FIG. 17 shows a process for biometric verification using a primary biometric code in accordance with some embodiments of the present disclosure.

FIG. 17 shows a process 1700 for biometric verification using a primary biometric code in accordance with some embodiments of the present disclosure. After capturing the biometric data 1702 (e.g., iris, facial, fingerprint, etc.), the system can determine a binary code 1704 that represents the captured biometric data 1702. With a primary code 1706 not having an associated validity mask, an exact match with the entire primary code from registration is required for a bitwise match. The system may verify genuine identity match only when all bits of the biometric codes (e.g., biometric codes 1708 and 1712) under trial match the enrolled biometric code (e.g., as indicated by confirmation bits 1710 and 1714), where the enrolled biometric code is also the primary biometric code. Otherwise, if at least one bit of a biometric code under trial (e.g., biometric code 1716) does not match the enrolled biometric code (e.g., as indicated by confirmation bits 1718), the system may determine that the captured biometric image belongs to an imposter. Similar results would occur if the primary code is used to generate other data that is used for bit-wise verification, such as by generating a hash of the enrolled and comparison codes using the same hashing algorithms and salt data and comparing the hash results.

Figure 18:
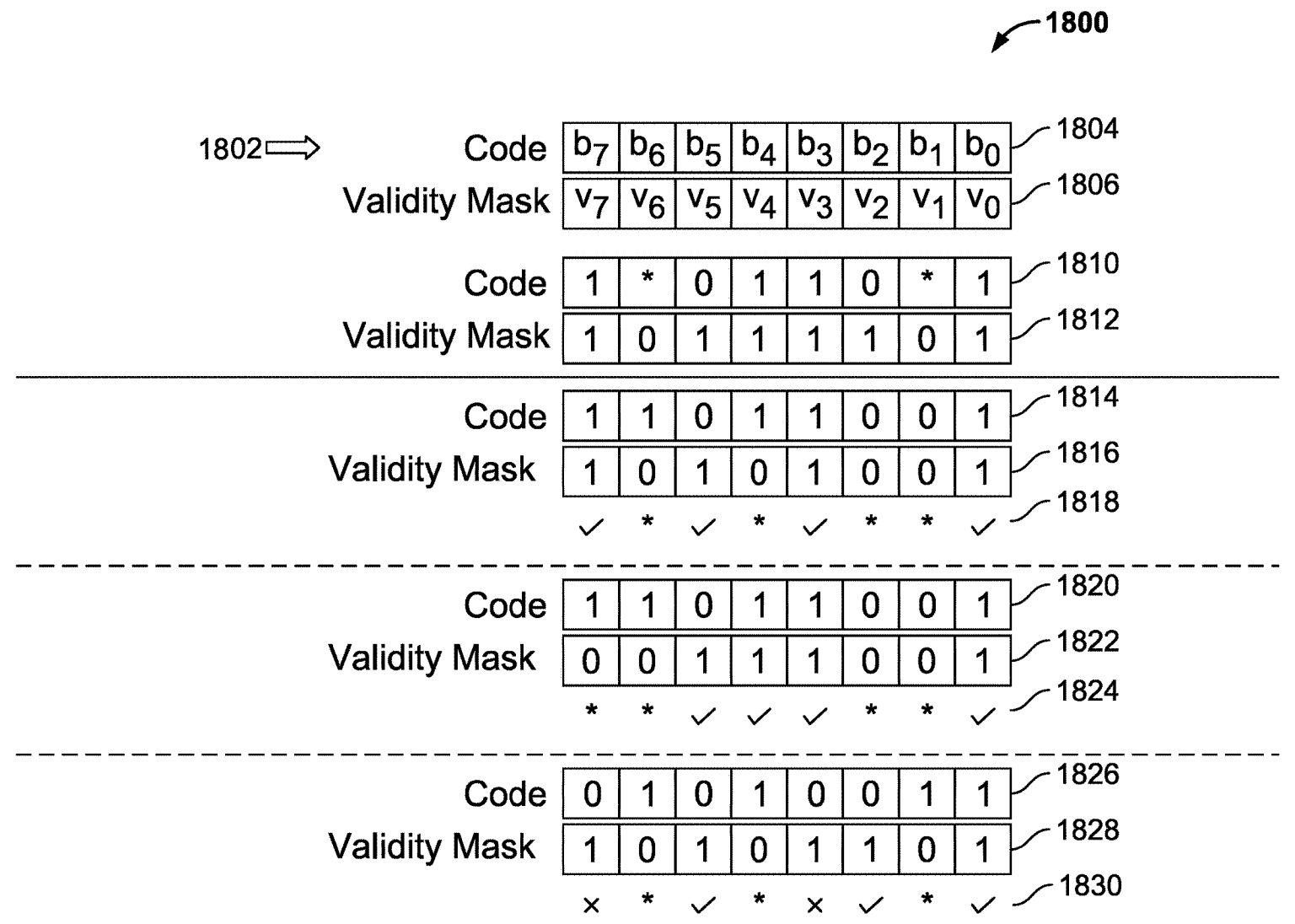

FIG. 18 shows a process 1800 for biometric verification using a masked biometric code in accordance with some embodiments of the present disclosure. After capturing the biometric data 1802, the system can determine a binary code 1804 that represents the captured biometric data 1802. The system may then determine a validity mask 1806, wherein the validity mask can be the same length as the biometric code (e.g., biometric code that is 8 bits long is associated with a validity mask that is also 8 bits long, etc.). In a masked biometric code system, the masked biometric code does not have to exactly match the enrolled biometric code for all bits because of a validity mask 1806 that enables or disables certain bits of the biometric code 1804 for verification. For example, the second bit of an 8-bit validity mask 1810 may be set to "0," thereby disabling the second bit of the enrolled biometric code 1808. Further in this example, the third bit of the 8-bit validity mask 1810 may be set to "1," thereby enabling the third bit of the enrolled biometric code 1808 for verification. The value of the bit in the validity mask 1810 may indicate if a corresponding biometric code 1808 bit is known and if the bit can be used or not with enough confidence. A bit of the validity mask 1810 may be set to '1' only when the corresponding bit of the enrolled biometric code is generated above a confidence level. In some embodiments, the validity mask 1810 is the result of signal analysis across multiple biometric capture cycles.

Multiple masks may be generated for a single validity mask 1810 associated with a biometric code. For example, mask 1816 of trial 1, mask 1822 of trial 2, and validity mask 1812 of the enrolled biometric code have been generated to authenticate trial biometric code 1814 in trial 1, trial biometric code 1820 in trial 2, and an imposter biometric code 1826. In an exemplary registration, a generated validity mask 1812 is associated with the first, third, fourth, fifth, sixth, and eighth bits. The resulting data potentially used for comparison thus comprises 6 of 8 possible valid bits corresponding to the enabled validity mask bits.

In an exemplary first match trial for biometric code 1814, the mask 1816 tests for a matching first, fourth, sixth, and eighth bit (e.g., a subset of the validity mask from registration). In one instance, to test for a match, the bit of a biometric code under trial 1814 in a position corresponding to an enabled mask bit 1816 must match the bit of the enrolled biometric code 1808 in the enabled bit position. As referred to herein, an "enabled" bit is one with a value of '1' and a "masked bit" is a bit of the biometric code under trial in a position where a mask bit is not enabled. In some instances such as is depicted in match result 1818, all enabled mask bit positions of the trial biometric code 1814 will match the corresponding bits of the enrolled biometric code 1808.

As shown in FIG. 18, the second match trial of biometric code 1820 also determines that all the masked bits associated with the mask 1822 (i.e., with the first, fourth, fifth, and sixth bits enabled) are matching. In this way, the system verifies the identity of the user through the captured biometric data, as depicted by match result 1824.

In some embodiments, at least one bit of the masked bits by mask 1828 may not match the enrolled biometric code. For example, the masked bits of the biometric code 1826 under trial do not match the respective bits of the enrolled biometric code 1808 (e.g., at the eighth and fourth bit positions in FIG. 18), as depicted by match result 1830. In such a case, the system rejects the biometric code under trial and may consider the biometric data to be from an imposter.

In some embodiments, the biometric code and validity mask are dynamically checked when generated. In an example of a biometric code generated from iris, facial, or fingerprint images, the amplitudes used to determine the frequency may evolve over time as an annulus signal is recollected again and again. When the amplitudes determined over multiple time frames begin to change less and less, the system may determine a higher degree of confidence for those amplitudes. In an example of a biometric code generated from fingerprint data, a code may similarly stabilize over additional capture cycles. A score function array can measure the sensitivity of each element in the feature vector (e.g., the score function array can represent the differential over time of each frequency amplitude corresponding to the elements of the feature vector). The amplitudes are dynamically checked with each time frame, and may be considered valid once a degree of confidence reaches a threshold confidence value.

Figure 19:
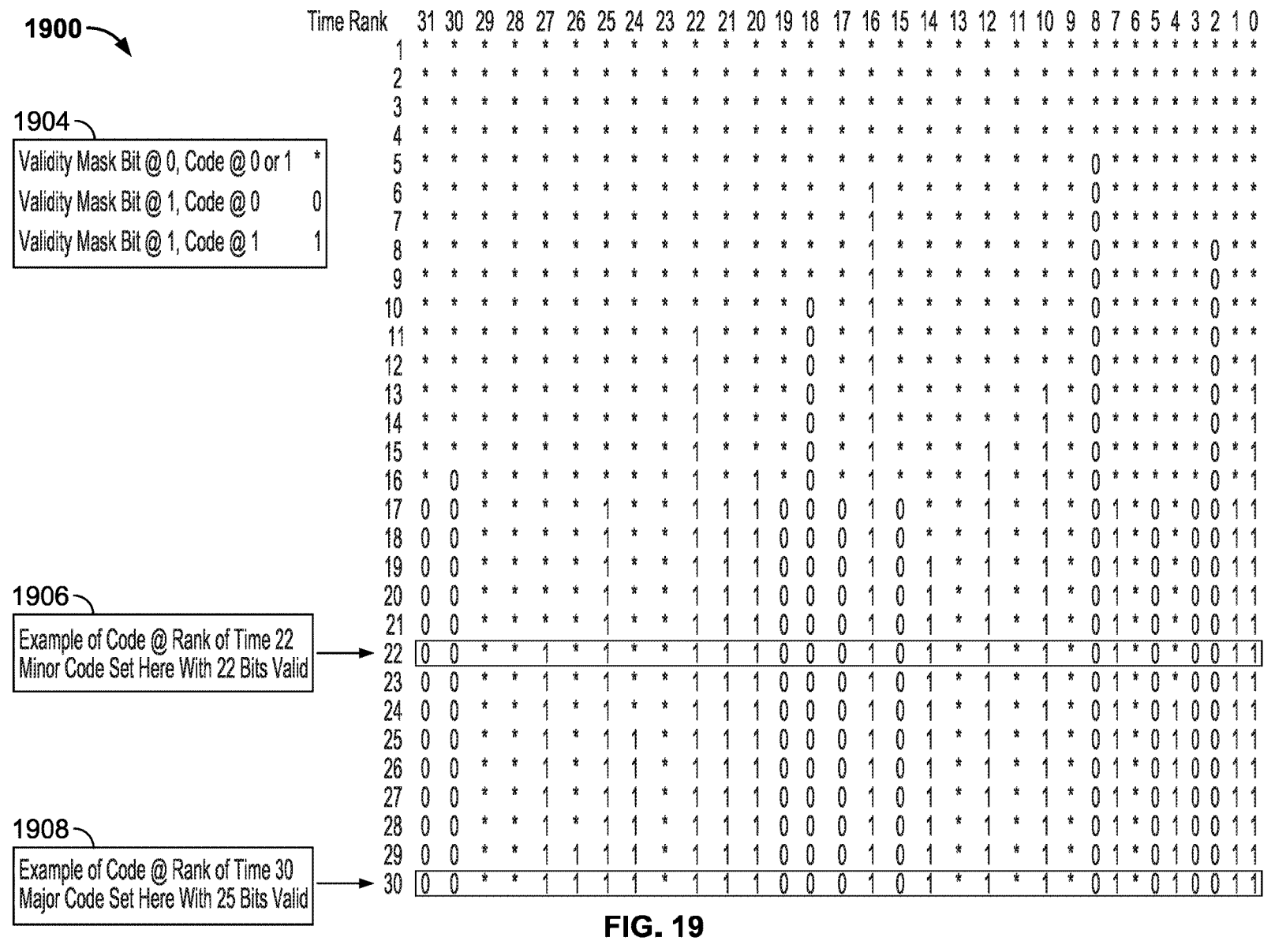

FIG. 19 shows exemplary generation 1900 of a validity mask from received biometric data over time in accordance with some embodiments of the present disclosure. An exemplary biometric code and the corresponding validity mask may each be a 32-bit vector. The value of each of the 32 bits is oriented as one row in the chart of FIG. 19. Increments in time are shown on the left side of the chart and increase in the direction going from the top to the bottom, starting at time rank 1 and ending at time rank 30, with each time rank corresponding to a capture of biometric data. As indicated by legend 1904, a validity mask of "0." associated with data does not satisfy a confidence criterion and is indicated by an asterisk, while a validity mask of "1" and an associated value "0" or "1" for the bit of the biometric code are indicated by a "0" or "1."

At time rank 1 of chart in FIG. 19, there is no data about the consistency of the collected biometric data over multiple samples, as only one sample has been created. Accordingly, all bits are marked with an asterisk, although in some embodiments certain data could be identified for a validity mask immediately, e.g., based on the prominence of the feature (e.g., iris, facial, fingerprint, etc.).

As biometric codes are collected (e.g., from consecutive captured sets of biometric data), the data is analyzed as described herein to identify data that reaches a threshold level of consistency or certainty. At such time, the validity mask is set to a "1" for that bit and the underlying code value ("0" or "1") is recorded. As time passes, more bits will satisfy the consistency requirements, while some bits may not satisfy those requirements. For example, at the time rank 5 of the chart in FIG. 19, the 8th bit of the code is determined to be zero with a high enough confidence value that the validity mask is set to "1" and the biometric code is set to "0." In some embodiments, the 8th bit can remain set at '0' for all future time frames while other bits are determined. For example, in the next time rank, time rank 6, of the chart, the 16th bit is determined to be "1" after the estimation, done through a score function array, determines that the amplitudes calculated at each time frame have not been subject to relatively large change over time.

By time rank 22 (i.e., corresponding to validity mask and values 1906) of exemplary chart 1900, 22 of the 32 total bits of the code have been determined with confidence values that at least meet the threshold of confidence value. In this way, the validity mask is also determined to be enabled for bits that meet the threshold and disabled for those that fail to meet the threshold (e.g., bits 31 and 30 can be "0" corresponding to a validity mask of "1" and a value of "0," bits 29 and 28 can be "*" corresponding to a validity mask of "0," and bits 25 and 27 can be "1" corresponding a to a validity mask of "1" and a value of "1"). As described herein, the validity mask and values 1906 may correspond to a "minor code."

By time rank 30 (i.e., corresponding to validity mask and values 1908) of exemplary chart 1900, 22 of the 32 total bits of the code have been determined with confidence values that at least meet the threshold of confidence value. In this way, the validity mask is also determined to be enabled for bits that meet the threshold and disabled for those that fail to meet the threshold (e.g., bits 31 and 30 can be "0" corresponding to a validity mask of "1" and a value of "0," bits 29 and 28 can be "*" corresponding to a validity mask of "0," and bits 24-27 can be "1" corresponding a to a validity mask of "1" and a value of "1"). As described herein, the validity mask and values 1908 may correspond to a "major code."

A comparison of primary biometric codes to masked biometric codes shows that the masked biometric codes may provide multiple advantages over the primary biometric codes. For example, the biometric source can be positioned at a greater variation of locations relative to a capture device because the implementation of the validity mask does not require an exact match between the biometric code under trial and the enrolled biometric code. Primary biometric codes can require a tight tolerance on biometric source positioning due to the requirement that an exact match must be determined. In a further example, masked biometric codes may take a reduced amount of time (e.g., 2.5-5× less than a primary code) to determine if captured biometric data is genuinely matched to a user or is an imposter's biometric data.

Masked biometric codes may also improve the FRR and FAR of biometric identification. For example, primary codes requiring the biometric source under trial to exactly match the enrolled biometric data may have up to 50% FRR. Masked biometric codes may have lower FRR and can produce no false rejections at all (e.g., 0% FRR) considering all biometric scans at a correct score quality level. While primary codes may have a 0.01% FAR, masked biometric codes can have a much smaller percentage of false acceptances at 0.0001% FAR. Furthermore, masked biometric codes may be revoked (e.g., by modifying the validity mask and/or underlying data) while primary biometric codes do not have revocability.

In an exemplary embodiment of revocation, a hard reset can be performed by updating a stable code. Because not all feature vectors are required to generate a stable code, different portions or sub-groups of feature vectors may be utilized to create new and different stable codes and public codes for a single user. In such a case where the registration is updated to the new biometric hash and public code, even the previous public code and biometric hash (or underlying stable code) are inadequate to predict the new stable code/biometric hash and public code. The level of independence of feature vectors issued from projection on an orthogonal base breaks historical dependency and makes the revocation total. In some embodiments, the independence is further improved by using a different region of the biometric feature (e.g., ROI for fingerprint, annulus for iris, etc.) than was used for the original registration.

In another exemplary embodiment of revocation, the public code can be changed such that the correct stable code and biometric hash cannot be created during authentication, even with a proper fingerprint. For example, this revocation can use the previous public code and switch some of the bits to be off by changing some of the bits of the validity mask from 1 to 0. Masking and optionally sorting the bits of the code differently will produce a different code. This form of revocation may not be as strong as making a revocation by a hard reset. Only one bit change is enough to get a new hash code having no correlation with a previous hash code.

In an exemplary embodiment of iris, facial, or fingerprint recognition, the masked biometric code can be used in verification applications involving EDOF lenses, wherein the EDOF provides a stable MTF to further reduce the possibility of error. In some embodiments, the additional use of an EDOF lens allows for a stable MTF in the spatial frequency bandwidth used to collect the biometric patterns across an extended range of distance. Because the operational working distance range afforded by the EDOF may significantly increase that of a standard lens, the EDOF solution offers a better user experience (e.g., the user does not need to be held in position by a machine to maintain strict distance between the lens and the iris).

An exemplary biometric capture system may be implemented with a camera or other sensors having an increased speed (e.g., for a camera, based on a suitable shutter speed such as 25 fps) for capture and thus code generation. shortening the time required to perform biometric identification significantly (e.g., less than two seconds, or on a scale of a few hundred milliseconds. The system may use an algorithm written in standard C (ANSI) that allows the SDK to be rebuilt for different operating systems (e.g., Android). The camera driver may work with a LINUX kernel. There may be a direct MIPI connection between the image capture camera and the allocated processor rather than a USB, which can prevent any security breach over USB data collection.

The representation of the biometric code and validity mask may not be limited to binary and may use any other suitable numerical notation.

Figure 20:
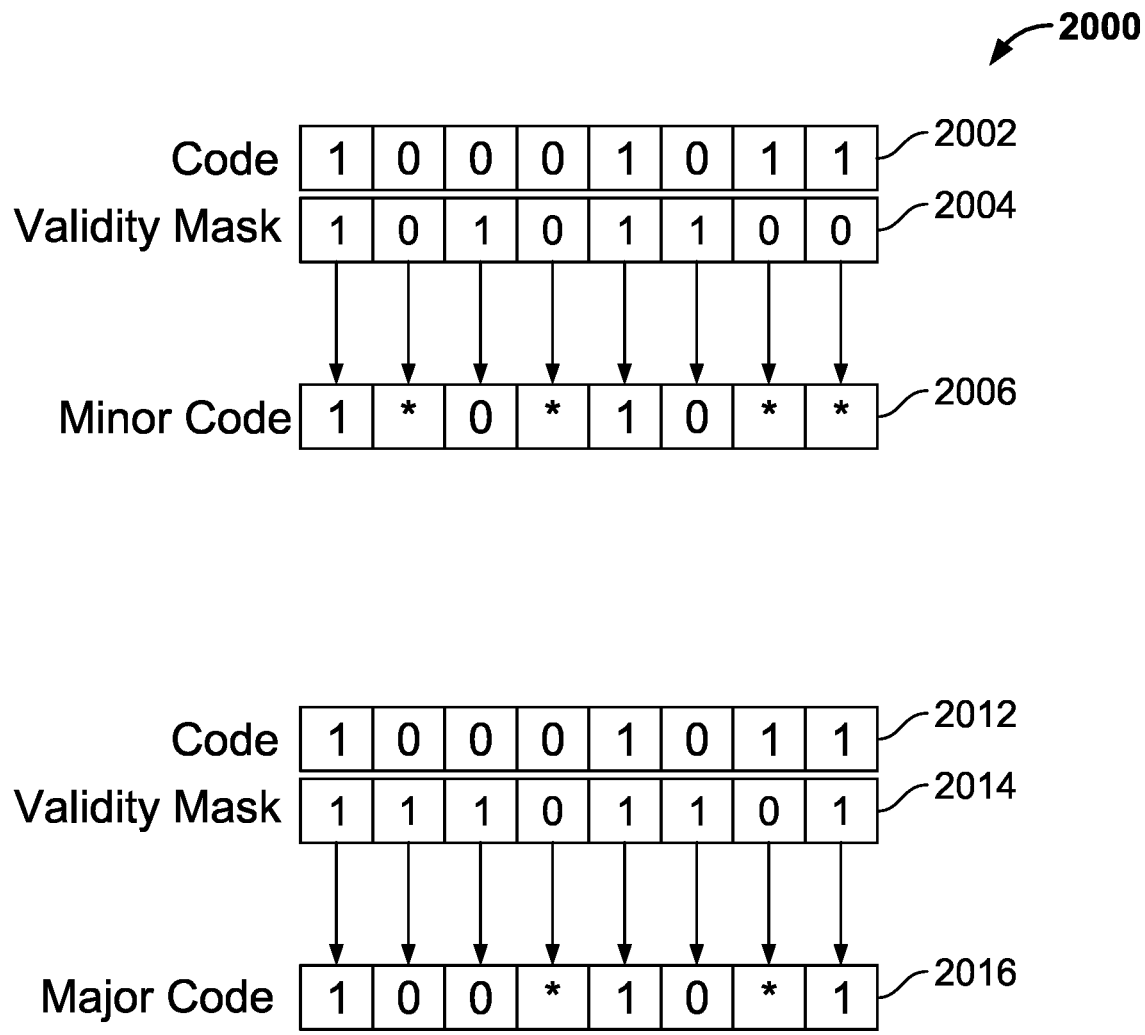
FIG. 20 shows masked biometric codes determined by a minor code and a major code, respectively, in accordance with some embodiments of the present disclosure.

FIG. 20 shows masked biometric codes 2000 for an 8-bit minor code 2006 and an 8-bit major code 2016, respectively, in accordance with some embodiments of the present disclosure. The quality of the masked code can be measured bit by bit. In some embodiments, a minor code 2006 uses a validity mask 2004 configured with the minimum of valid bits that will be valid at all attempts for identification. A minor code 2006 can be a code that is quickly generated once the criterion of a minimum number of bits is achieved. In the exemplary minor code of FIG. 20, a minor code 2006 comprises 4 valid bits as depicted by validity mask 2004 over 8 total code bits 2002. In some embodiments, a major code 2016 has the maximum number of valid bits that can be identified. This may require a longer process with a large number of images. In the exemplary major code 2016 of FIG. 20, a major code 2016 comprises 6 valid bits as depicted by validity mask 2014 over 8 total code bits 2012.

A minor code may be a collection of a number $N_{Mi}$ bits set to be valid, meaning the code may have a score function providing enough confidence on the validity and stability of the bit. These score functions can be separate for each bit or subgroup of bits, depending on the binarization method of the amplitude of the feature vectors. An exemplary binarization method uses the sign of the feature vector elements to determine the value of the code bits. The bits may be sorted in an arbitrary but constant order. Each sequence of biometric acquisition grouping a sub-sequence of raw biometric capture can produce valid bits and invalid bits. The value of bits set to invalid status may not matter as it may be either a "0" or a "1." These bits can be automatically masked by the validity mask.

The position of valid bits is not necessarily static and strictly repeatable. Some changes can occur from one sequence to another. The bits can be classified into three categories: very reliable bits, reliable bits close to the threshold limit of reliability, and unreliable bits. The very reliable bits can be rapidly set at valid status in a capture sequence. In some embodiments, all these bits will be present and valid in a minor code.

The reliable bits close to the threshold limit of reliability may sometimes be set as valid or not at each sequence of biometric acquisition. In this way, there can be changes in the outcome of the validity mask. In some embodiments, the bits may be set as valid if the capture conditions are favorable and if there is more time given in the acquisition to improve the quality of the accumulated signal (e.g., more acquisitions accumulated may reduce the signal-to-noise ratio). The code generated under these conditions can be called a major code.

In some embodiments, the unreliable bits are generated from feature vectors with insufficiently high amplitudes relative to the natural fluctuations (e.g., noise). This can lead to a reliability score below the threshold of acceptance. These bits may remain set at invalid status in most of the acquisition sequences.

Figure 21:
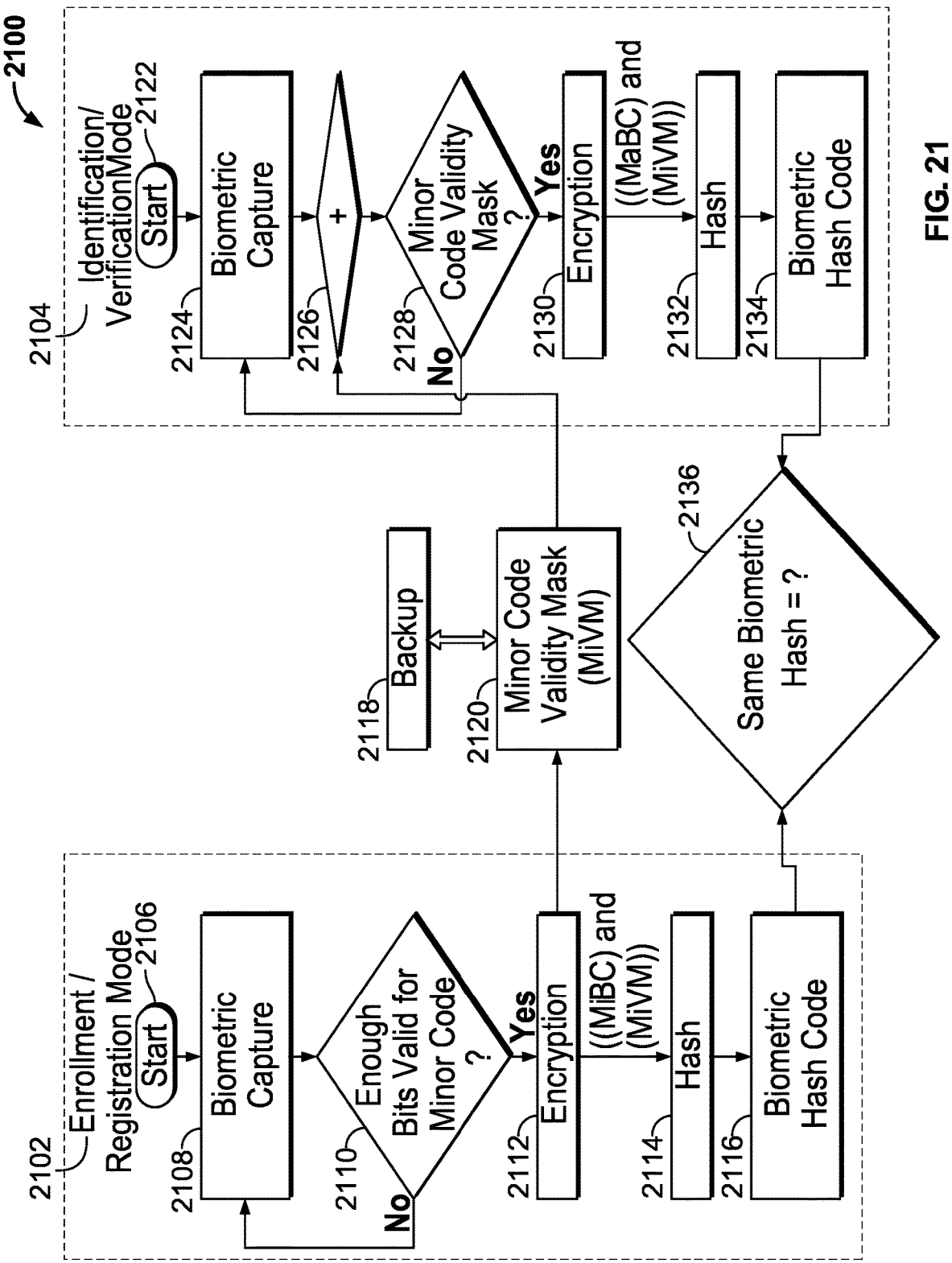
FIG. 21 shows an exemplary flow diagram of a biometric identification system in accordance with some embodiments of the present disclosure.

FIG. 21 shows an exemplary flow diagram 2100 of a biometric identification system in accordance with some embodiments of the present disclosure. The registration 2102 of a new user starts at step 2106 may include three main steps: Loop acquisition of the biometric data (e.g., including biometric capture 2108 and confirmation of enough data 2110), issuing a minor code 2112, and hashing 2114 to create a biometric code 2116. Loop acquisition may involve multiple rounds of acquisition (e.g., until the conditions of decision box 2110 are satisfied) to determine whether adequate data has been obtained, as described herein.

In an embodiment of the present disclosure, at each round of the loop, if the biometric data meets the criteria of quality of capture on the sensor, the feature vector amplitude may be added to the previous qualifying captures. In this way, there is an iterative integration of amplitudes of feature vectors. In some embodiments, the integration has to have limited support such that the integration will converge to a constant integrated amplitude when the subject is constantly exposed to the biometric sensor.

For example, the integration can be limited to a number of acquisitions. The point spread function (Dirac peak) may be a discrete gate function. Another example of integration may use a recurrent summation:

$$C_{i,j} = \alpha \cdot C_{i-1,j} + (1-\alpha) \cdot A_{i,j}$$

where $C_{i,j}$ is the integrated amplitude of rank of time i of the feature vector of rank j, $A_{i,j}$ is the direct measured amplitude of rank of time i of the feature vector of rank j, and $\alpha$ is the coefficient of integration. In some embodiments, $\alpha$ is of a value $0 < \alpha < 1$, and when $\alpha$ is closer to 1, the integration width is longer.

In some embodiments, the recurrent integration function has the properties of a linear low-pass filter of the first order. A person having ordinary skill in the art can extend that to recurrent summation by an additional order to get a second-order low-pass filter, which may be more efficient when rejecting wrong peaks.

At each loop of integration on feature vector amplitudes 2108 and 2110, a validity test can be done on each feature vector amplitude. In some embodiments, the most important criterion of validity is the stability. The quality of the amplitude can be measured by the ratio between the integrated amplitude over the temporal standard deviation of the amplitude $A_i$:

$$Q_{i,j} = \frac{C_{i,j}}{\sqrt{V_{i,j}}}$$

In some embodiments, if the quality of the amplitude exceeds a threshold quality value (e.g., $Q_{i,j} > 4$, where this is indicative that the amplitude is at least four times the standard deviation of its temporal variation), the associated bit may be considered stable and reliable.

The standard deviation of the amplitude of each feature vector can evolve at each new biometric capture. On a similar approach as that of the amplitude approach, a recurrent summation of the variance can be used for a limited number of accumulated biometric captures. Additionally, a recurrent summation having the properties of a first-order low-pass filter can be used for a limited number of accumulated biometric captures.

$$V_{i,j} = \alpha \cdot V_{i-1,j} + (1-\alpha) \cdot (A_{i,j} - C_{i,j})^2$$

where $V_{i,j}$ is the integrated variance of the evolution at rank of time i of the amplitude of the feature vector of rank j, $C_{i,j}$ is the integrated amplitude of rank of time i of the feature vector of rank j, $A_{i,j}$ is the direct measured amplitude of rank of time i of the feature vector of rank j, and $\alpha$ is the coefficient of integration. In some embodiments, a is of a value $0 < \alpha < 1$, and when $\alpha$ is closer to 1, the integration width is longer.

In some embodiments, after enough biometric data has been gathered, the next step of registration of a new user is issuing a minor code 2112. In some embodiments, a general condition for issuing a minor code may be to have enough valid amplitudes to produce directly valid bits. One reason for this is that the number of valid bits increases with the number of biometric acquisitions. In some embodiments, an increased number of bits causes higher entropy but a longer processing time.

A minor code may be a binary code. The binary code and the validity mask may both be N bits long. In an embodiment of the present disclosure, each bit of the code can be paired with a corresponding bit of the validity mask, and the validity bits may be sorted the same way the code bits are. This sorting can be done differently according to a secret code to confuse malicious attacks. Moreover, this code and validity mask may be encrypted by a symmetric encryption using a secret private key or an asymmetric encryption where the biometric device keeps the secret private key.

In an embodiment, the minor code may have two distinct uses. In some embodiments, the minor code is an input code for generating the biometric hash. In some embodiments, the minor code provides the minor validity mask of the code that can be used as a public code that will allow for the production of the same biometric hash during both identification and authentication.

The minor code can be composed of N bits of code noted MiBC and N bits of validity mask noted MiVC. In an embodiment, the compact code may be produced as a result of the Boolean bitwise operation "AND" between MiBC and MiVC:

CC=((MiBC)AND(MiVC))

This compact code may be an example of a final stable biometric code that can be used for the biometric hash. Although stability may be determined in a variety of manners as described herein, in some embodiments, the stability is assumed as long as the same validity mask is used by the same person who also uses the biometric device that produces the same code bit value enabled by the same validity mask.

As described herein, any portions of the bit code that are not enabled by a corresponding validity mask may not matter. In some embodiments, the Boolean operation generating the compact biometric code produces a "0" on each bit set as not valid on the minor validity mask. The validity mask of a minor code can change by a few bits with each new independent registration on the same user. This property makes a registration intrinsically revocable. A new independent registration generating a new minor validity mask has a significant percentage of ranks of validity that changes. The probability of producing the same validity mask may be very low and this probability may decrease quickly with an increasing number of bits of the code. If the revocation is necessary because of the loss of the device or having sensitive biometric data stolen, the new minor validity mask can differ intentionally or be naturally changed. This property of revocability may solve the limitation of biometric systems using some biometric distance measurement giving some tolerance on variability of measured data. For instance, if iris registration data has leaked to a third party, a Hamming distance-based identification will accept a new independent registration. The revocability of the present disclosure can add higher protection on the biometric data and the minor validity mask, and it offers along the way further security by providing a personal revocable key to enable a biometric authentication of the same person. The minor code and validity mask (e.g., as part of a public code 2120) do not contain biometric information as described herein, and can be safely transmitted to other systems and stored (e.g., in encrypted form), for example, at backup 2118.

Once the minor codes have been set, processing may continue to step 2114, wherein a biometric hash 2116 of the generated stable code is generated. The hash may be a digital process that allows any input code to be transformed to a unique code with a constant size that does not allow transformation to reverse the hash back to the original biometric data. There are many standardized hash solutions in the public domain such as SHA-1, SHA-2, SHA-256, and SHA-512. The strength of the hash may depend mainly on the number of bits output. For example, the greater number of bits output, the less risk of two users with the same hash (e.g., a collision). The security of the biometric system can be improved by the addition of cryptography. For example, salt may be added to the code to increase the number of input bits before hashing, as described herein. In a further example, the compact biometric code may be encrypted with symmetric or asymmetric encryption, where the private key is secretly hosted in the device.

After the registration phase 2102, the biometric system may proceed to an identification and verification phase 2104. The identification and verification phase starts at step 2122, after which the biometric information of the user is captured in a similar loop process to registration, except that in the mode of identification and verification 2104 the loop confirms that biometric capture data 2124 encompasses the portions of biometric data included in minor code and validity mask (steps 2126 and 2128). If all of those bits cannot be obtained, then the user is likely an imposter. If all of the relevant biometric bits are obtained, processing continues to step 2130 in which encryption is performed, step 2132 in which the captured data is hashed to create biometric hash 2134, and step 2136 in which the registration biometric hash 2116 and identification/verification biometric hash are compared.

Figure 22:
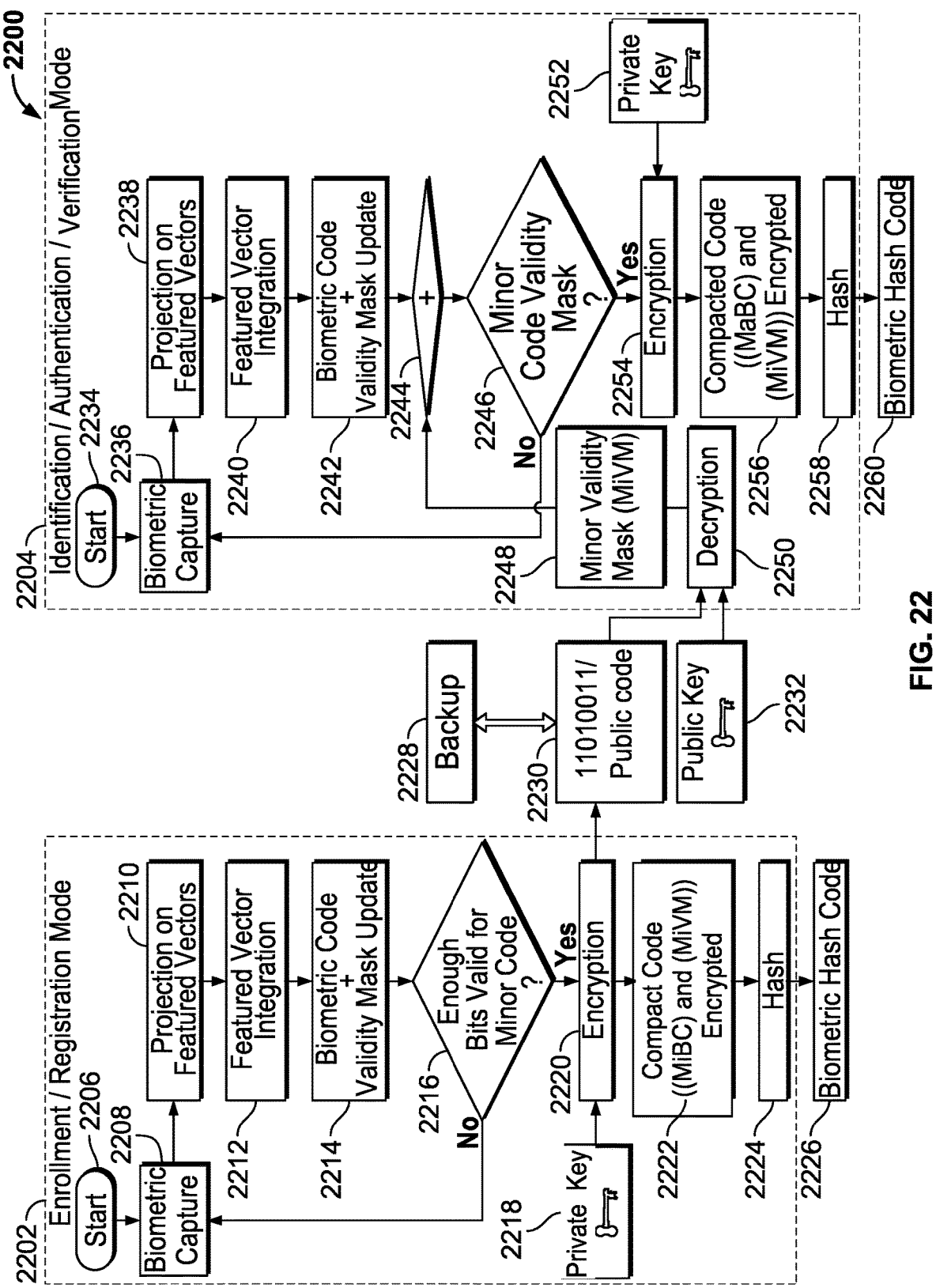
FIG. 22 shows an exemplary flow diagram of a biometric identification and authentication system in accordance with some embodiments of the present disclosure.

FIG. 22 shows an exemplary flow diagram 2200 of a biometric identification and authentication system in accordance with some embodiments of the present disclosure. A registration system 2202 starts at step 2206. Biometric capture 2208 is performed in a loop, in which the captured data is repeatedly projected on feature vectors 2210, integrated with previous feature vectors 2212, and the biometric code and validity mask are updated at step 2214 until adequate bits for a minor code are obtained at step 2216, as described herein.

In an embodiment, each of the registration system 2202 and the identification/authentication/verification system 2204 may include a private key 2218/2252. During registration, the private key 2218 may be used to encrypt 2220 the generated compact code and minor validity mask 2222, which may be provided as part of a public code 2230, and in some embodiments, stored in a networked backup device 2228. The compact code (e.g., stable biometric code) may be hashed 2224 as described herein to generate the biometric hash 2226.

An exemplary identification/authentication/verification system 2204 starts at step 2234. Biometric capture 2236 is performed in a loop, in which the captured data is repeatedly projected on feature vectors 2238, integrated with previous feature vectors 2240, and the biometric code and validity mask are updated until adequate bits for a minor code are obtained at step 2242, as described herein. In addition, the minor validity mask 2248 is obtained from the public code 2230 by decryption 2250 based on a public key 2232 (e.g., an asymmetric public key associated with private key 2218). The iteratively updated biometric code and validity mask 2242 are processed 2244 based on the minor validity mask 2248 as described herein, and the loop continues until all necessary bits for an eventual biometric hash comparison are obtained at step 2246. If all of the bits are not obtained within a threshold number of loops (not depicted), the user may be identified as an imposter or an error may be determined. Processing also occurs at step 2250, at which encryption 2254 is performed based on the private key 2252 (which matches the private key 2218) to obtain the encrypted compact code and minor validity mask 2256. These values may be hashed at step 2258 to generate the biometric hash 2260. By comparing the biometric hash 2260 to the biometric hash 2226, the user may be identified, authenticated, and/or verified.

Figure 23:
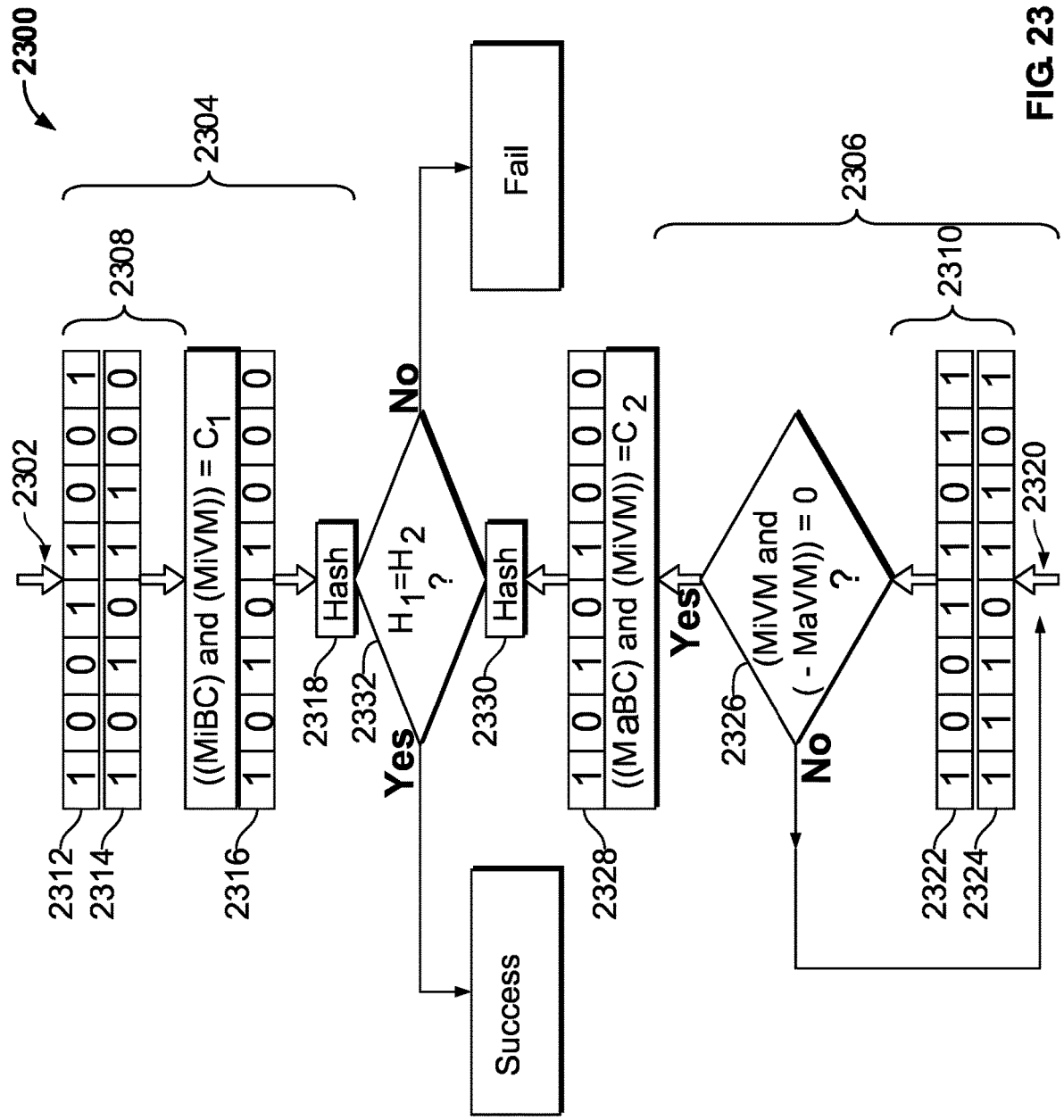
FIG. 23 shows a process for biometric authentication comprising a biometric hash in accordance with some embodiments of the present disclosure.

FIG. 23 shows a process 2300 for biometric authentication comprising a biometric hash in accordance with some embodiments of the present disclosure. A registration phase 2304 may receive input code 2302, from which a minor code 2308 including a minor biometric code (MiBC) 2312 and a minor validity mask 2314 (MiVM) may be generated. Through an AND operation of the minor biometric code (MiBC) 2312 and the minor validity mask 2314 (MiVM) may generate a first compact verification code 2316 $C_1$ for hashing and later comparison during an identification/authentication/verification phase 2306.

The biometric hash may require a stable input before hashing. In some embodiments, the stable biometric code has to be strictly the same as the code produced at the registration phase. In this way, the identification/authentication/verification phase may be required to produce strictly the same compact code 2328 $C_2$ as the compact verification code 2316 $C_1$ generated during the registration phase 2304. This requirement may be met by two conditions. One condition may be to have access to the minor validity mask 2314 (MiVM) from registration. A second condition may be to test at 2326 if all valid bits on the current major validity mask 2324 (MaVM) are also valid on the registered minor validity mask 2314 (MiVM). In some embodiments, when the second condition is met, a major code 2322 is obtained (e.g., MaBC). Once both conditions are met, the stable compact biometric code 2328 $C_2$ can be issued by the bitwise Boolean operation:

C2=((MaBC)AND(MiVM))

The stable compact biometric code 2328 $C_2$ may be the same as the verification code 2316 $C_1$ generated during the registration phase 2304 if the same person is presented to the device. The respective compact codes may be hashed at steps 2318 and 2330 and compared at 2332 to confirm the identity/authenticity of the biometric input 2320.

Figure 24:
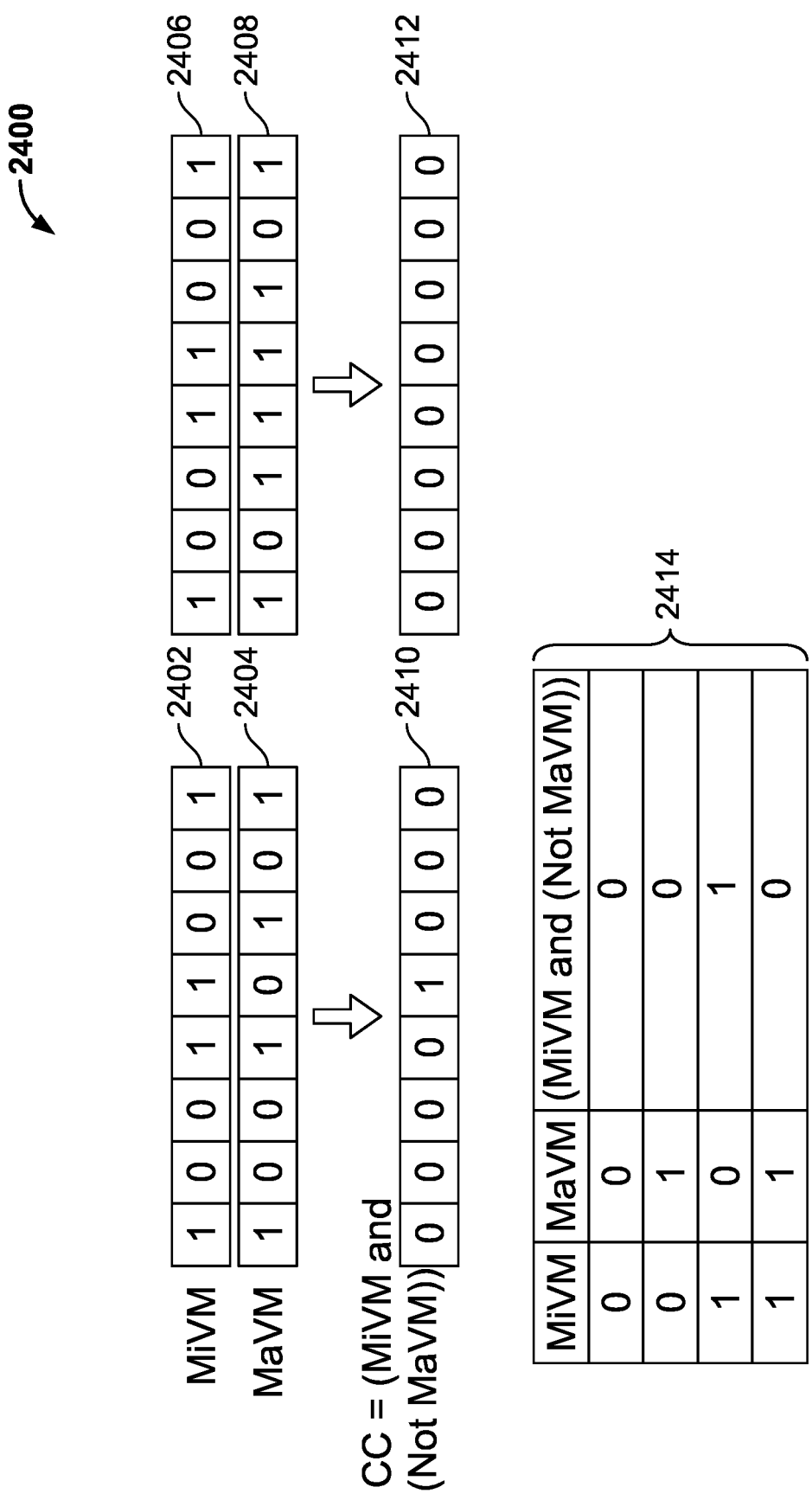
FIG. 24 shows a test to determine if a code is ready to be hashed in accordance with some embodiments of the present disclosure.

FIG. 24 shows a test 2400 to determine if a code is ready to be hashed in accordance with some embodiments of the present disclosure. In some embodiments, a test using a bitwise Boolean operation 2414 may be used to determine whether all bits of a valid minor code are valid as well on a major validity mask.

(MiVM AND (Not MaVM))=0?

If at least one valid output of the test is "1," the system may determine that the code is not ready for hashing.

For example, a first minor validity mask 2402 may have binary values of 10011001 while a complement of a first major validity mask 2404 may have binary values 01101010. An AND operation of these respective binary values may result in a compact code 2410 having binary values of 00001000, with the "1" corresponding to the fourth bit value "1" of the first minor validity mask 2402 ANDed with the complement of the fourth bit value "0" (i.e., ANDed with "1") of the first major validity mask 2404. As a result, the first codes associated with first minor validity mask 2402 and first major validity mask 2404 may not be ready for hashing.

As another example, a second minor validity mask 2406 may have binary values of 10011001 while second major validity mask 2408 may have binary values 10111101. An AND operation of these respective binary values may result in a compact code 2412 having binary values of 00000000, i.e., equal to zero. As a result, the second codes associated with second minor validity mask 2406 and second major validity mask 2408 may not be ready for hashing.

Similar to the registration phase, various encryption operations may be added in the identification, authentication, and verification phase to increase security or comply with various system architectures. A person having ordinary skill in the art may add or customize the general flow as disclosed.

The minor mask can possess specific properties that enable the generation of a compact and stable biometric code. In some embodiments, the primary function is to list the bits of the code that are measured on a reliable and repeatable basis. These enabled valid bits may be part of the stable code. The "AND" Boolean operation with the collected code bits may constitute the stable and compact biometric code. A secondary function may be to generate a personal public code enabling the generation of the same compact code from the collection of a new independent collection of valid bits. This may be necessary for authentication of the same person.

In some embodiments, the biometric code is the most sensible data to keep secret instead of the validity mask. The minor validity mask can be exposed without any threat for security. In order to cause greater difficulty for incoming attacks, the information carried by the public minor validity mask can be encrypted as well so that the attacker does not know where the bits are valid and where they are not valid. This may implicitly add salt in the global coded information.

The public minor validity mask may not need to be exported if the same device or processing unit is used for both registration and authentication. In some embodiments, the public minor validity mask may be kept a secret. The public minor validity mask generated on the registration device can be required to be transferred to the authentication device to enable the generation of the same compact biometric code by collecting new biometric code from the same person. In another embodiment, if a different person (e.g., an imposter) is presented to the authentication device, the result will be both a different biometric code and different final compact code.

In accordance with the present disclosure, an imposter biometric scan will not be capable of providing a genuine stable code from which a matching biometric hash can be generated. For example, an imposter biometric scan will not be able to be properly relocated based on the information in the public code. The relocation algorithm itself may identify the biometric data as an imposter, for example, based on a failure to find a correlation that exceeds a threshold value. To the extent that imposter biometric data can possibly pass a relocation algorithm, the rejection will occur during generation of the stable code.

Because the phase of selected feature vectors may be distributed on a random distribution with uniform density of probability in range (e.g., of $[-\pi, \pi]$ mod $2\pi$), each bit of code resulting from an imposter scan will result in an unpredictable bit value (e.g., in $\{0, 1\}$). The probability of making a false match is theoretically $2^{-n}$, where n is the number of considered valid bits in the code. This theoretical estimation supposes all bits are totally independent from a static point of view. The reality of biometrics is that there is some partial dependency between biometric features (e.g., iris features, facial features, fingerprint textures) that is partially reflected in a biometric code. The selection of feature vectors is done in a range where the common characteristics are less represented to reduce this dependence. Some exemplary measurements made over bit databases of fingerprints revealed a FAR (False Accept Rate) of 1/115,000 using 30 bits. This result is close of $2^{-17}$, which is the equivalent of 17 full independent bits, not 30. The partial dependency may be the equivalent of losing some bits, as a result of a lower natural biometric entropy than the numerical entropy supposing total independence of collected features.

The probability of issuing a false accept by comparing two compact codes or two hash codes is $$\frac{1}{E_N},$$

where $E_N$ is the entropy. By assuming all bits are totally independent inside the code and independent across different people, which can be especially the case for a biometric code by selecting orthogonal feature vectors with no overlap of the auto-correlation lobes of resampled biometric collection data, the entropy is at the maximum theoretical limit at $E_N=2^n$, where n is the number of valid bits set by the minor validity mask. Thus, the FAR will be $$FAR = \frac{1}{E_N} = 2^{-n}$$

The FRR rate can be the accumulated probability of error on each valid bit. Each bit has its own probability of error, independent of others.

$$FRR = 1 - \prod_{n\ valid\ bits} (1 - P_j(err))$$

$P_j(err)$ is the probability of error on the valid bit or rank j. If the internal threshold for bit validation is set at quality level 4 (e.g., at four times the standard deviation), the probability of error is approximately 3.88E-5 by the normal function of repartition, supposing the statistical distribution of amplitude of the feature vectors follow a normal Gaussian distribution. Using the majorant error rate per bit at 3.88E-5, the final FRR on 22 valid bits will be 0.85%.

Figure 25:
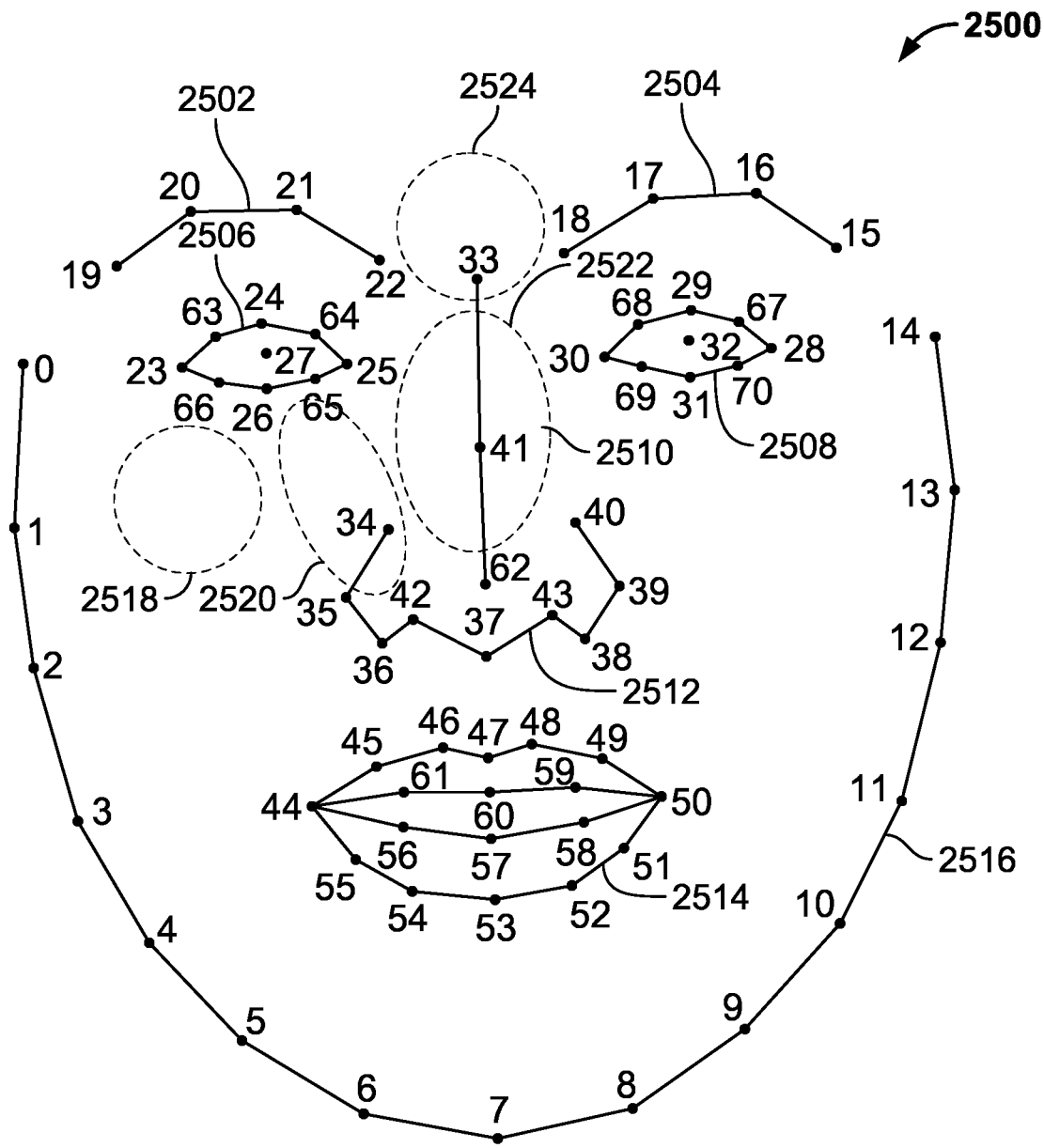
FIG. 25 shows feature vectors determined from facial features in accordance with some embodiments of the present disclosure.

FIG. 25 shows feature vectors determined from facial features 2500 in accordance with some embodiments of the present disclosure. The method of accumulated amplitudes on feature vectors, the generation of the minor validity mask, and other methods described herein can also apply to generating a compact code and a hash code of facial features and other biometric or physical data subject to fuzzy measurements. Independent and orthogonal feature vectors can be extracted from a face image in specific, localized regions by finding landmarks. In some embodiments, the landmarks are stable points that define a new stable coordinate system. FIG. 25 shows an example of 70 landmarks corresponding to portions of the brows 2502 and 2504, eyes 2506 and 2508, nose 2510 and 2512, mouth 2514, and jaw 2516. FIG. 25 also shows four examples of regions, each denoted as a Region of Interest (ROI) located relative to the landmarks, including ROI 2518 (corresponding to a cheek region), ROI 2520 (corresponding to region between the nose and eye), ROI 2522 (corresponding to a bridge of the nose), and ROI 2524 (corresponding to a region between the brows). A simple region may be shaped as a circle, but regions are not limited to being circular. By introducing geometric distortion on the ROIs, the closed perimeters of regions of interest may have free form. On each perimeter of the ROI, the gray level on pixels can be re-sampled on N samples. This collection of data in a discrete array can be periodic by having a closed freeform.

Orthogonal feature vectors can be extracted from select frequencies of the Fast Fourier Transform of the collected data at the perimeter of the freeform. Each complex amplitude at a frequency can be used as two independent vectors with real amplitude (e.g., separating the complex amplitude into its real part and imaginary part that correspond to a cosine and sine, respectively). The independence of generated bits issued from the binarization of the amplitudes of the select frequencies and free forms may not be effective at all frequencies. In this way, the selection of frequency is not arbitrary. Low frequencies can have very strong correlation across different faces. Medium-high frequencies may provide more differentiation between faces (e.g., lower correlation across faces at frequencies 4-12). At high frequencies, the variations produced by facial tilts, expressions, illumination, etc., produce subtle differences that become difficult to distinguish from higher frequency facial patterns. Many other and various bases of feature vectors can be used. The grey pixel levels collected in a normalized coordinate system refer to stable landmarks and opens a very large number of possible vectoral bases. The process can be extended to a very high number of dimensions. Common facial recognition solutions project facial data on Eigen vectors. For example, principal component analysis describes the intensity patterns in face images in terms of a set of basis functions frequently called "eigenfaces." This can be combined with 3D modeling. The high number of dimensions may require using deep learning techniques to sort and identify vectors or combinations of orthogonal vectors that stable binarization of their coefficients. However they are identified, the identification list for these vectors will be recorded in the public code. The binarization of the coefficients supplies the stable code.

Figure 26:
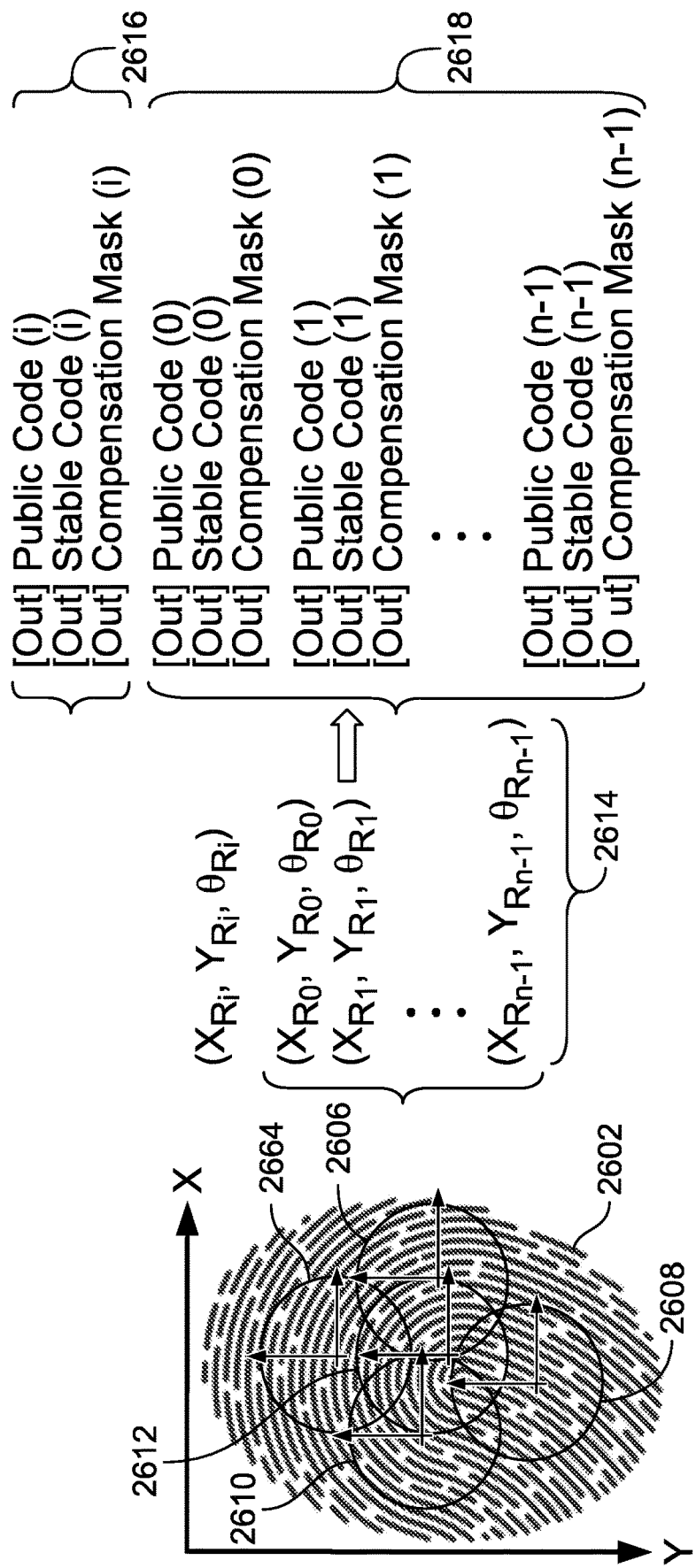
FIG. 26 shows an exemplary embodiment of registration of multiple ROIs in accordance with some embodiments of the present disclosure.

FIG. 26 shows an exemplary embodiment of registration of multiple ROIs in accordance with some embodiments of the present disclosure. In some embodiments, it may be desirable to register multiple ROIs for a single user. Multiple ROIs provide more variability as to how a user scans their biometric information during authentication. Although FIG. 26 and the following figures relating to multiple ROIs (e.g., FIGS. 27-30) may be described in the context of fingerprint capture, it will be understood that other biometric techniques may similarly utilize multiple ROIs (e.g., multiple annular regions for iris capture or multiple facial features for facial recognition).

In the exemplary embodiment of FIG. 26, five ROIs are associated with fingerprint 2602, including ROI 2612 located near the middle of the fingerprint 2602, ROI 2604 located offset in the −y direction from the center of the fingerprint 2602, ROI 2606 located offset in the +x direction from the center of the fingerprint 2602, ROI 2608 located offset in the +y direction from the center of the fingerprint 2602, and ROI 2610 located offset in the −x direction from the center of the fingerprint 2602. ROI centers and locations 2614 for n ROIs (e.g., n=5) are established for each of the ROIs. These in turn are processed to generate respective outputs of n cryptographic outputs 2618, each cryptographic output including components 2616 of a public code, a stable code, and a compensation mask. The public codes and stable codes are generated as described herein. The compensation codes, described in more detail below, provide a translation between the ROIs such that all of the stable codes can be modified to have a common global stable code 2620 value for hashing and comparison.

Figure 27:
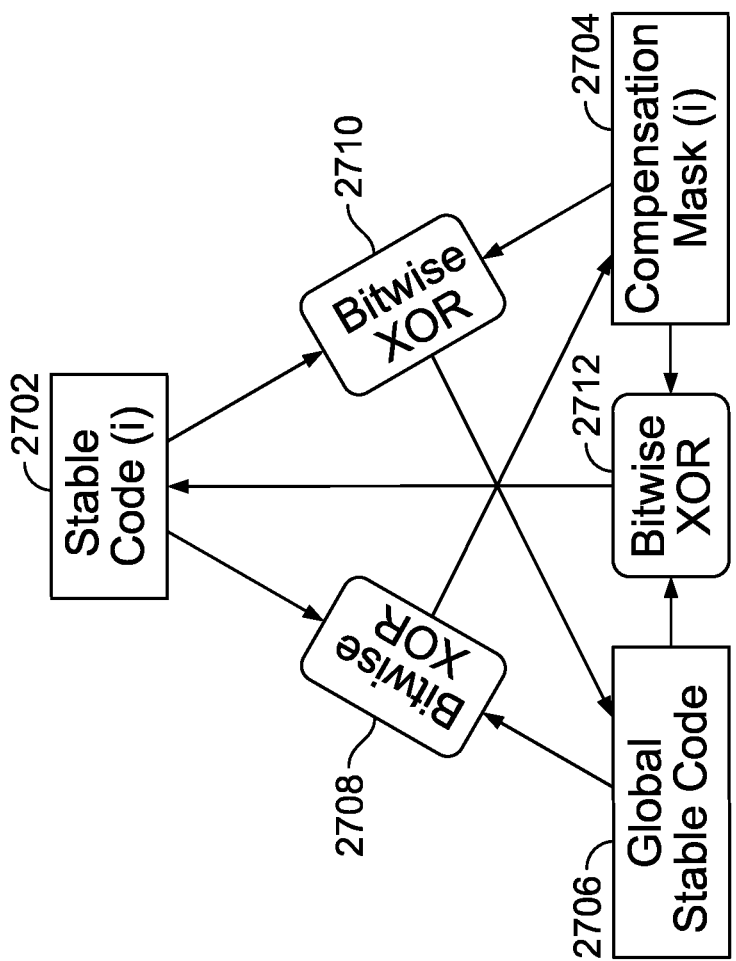
FIG. 27 shows an exemplary embodiment of generating and using compensation codes with multiple ROIs in accordance with some embodiments of the present disclosure.

FIG. 27 shows an exemplary embodiment of generating and using compensation codes with multiple ROIs in accordance with some embodiments of the present disclosure. The properties of the global stable code 2706 are such that when each of the stable codes 2702 (e.g., each stable code (i)) is modified by its respective associated compensation mask 2704 (e.g., each compensation mask (i)) by a suitable operation (e.g., a bitwise exclusive-or operation 2710), the same global stable code 2706 is obtained, assuming that each of the underlying stable codes was properly obtained from the same user's fingerprint. As depicted at 2714, the properties of the compensation masks 2704 and global stable code 2706 may be such that performing the same operations used to generate the global stable code 2706 on the global stable code 2706 in reverse results in the recovery of the original respective stable code 2702 (e.g., based on a bitwise exclusive-or 2712 with the respective compensation mask 2704) or compensation mask (e.g., based on a bitwise exclusive-or 2708 with the respective stable code 2702).

Figure 28:
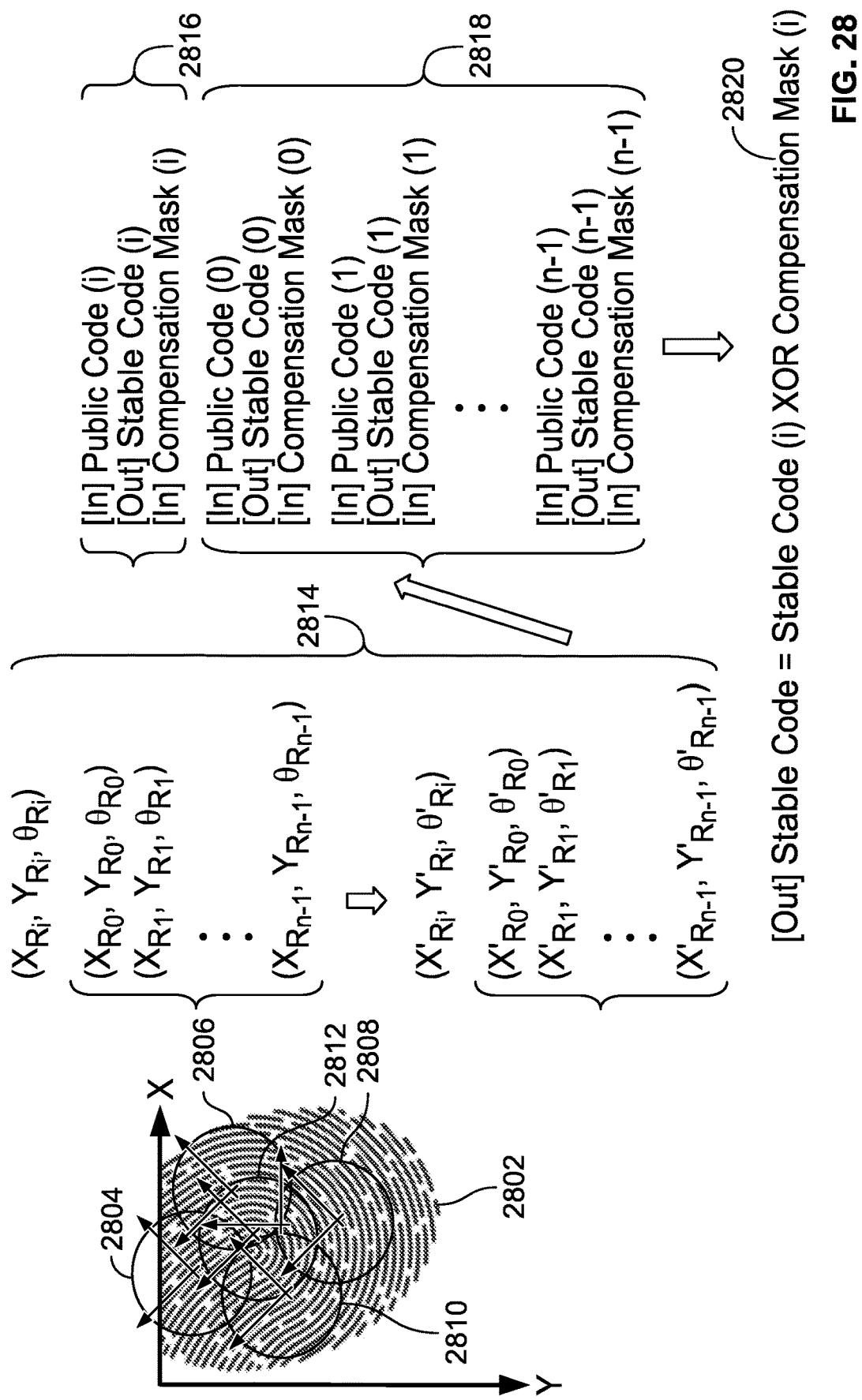
FIG. 28 shows an exemplary embodiment of verification of multiple ROIS in accordance with some embodiments of the present disclosure.

FIG. 28 shows an exemplary embodiment of verification of multiple ROIS in accordance with some embodiments of the present disclosure. In the exemplary embodiment of FIG. 28, the system attempts to capture five ROIs, consistent with the five ROIs obtained during registration, offset based on each one's different location (e.g., further up in the −y direction) and angle (turned approximately negative 35°-40°). Accordingly, five ROIs are associated with fingerprint 2802, including ROI 2812 located near the middle of the fingerprint 2802, ROI 2804 located offset in the −x direction and −y direction from the center of the fingerprint 2802, ROI 2806 located offset in the +x direction and −y direction from the center of the fingerprint 2802, ROI 2808 located offset in the +x direction and +y direction from the center of the fingerprint 2802, and ROI 2810 located offset in the −x direction and +y direction from the center of the fingerprint 2802. ROI centers and locations 2814 for n ROIs (e.g., n=5) are established by relocation as described herein for each of the ROIs. These in turn are processed to generate respective outputs of n cryptographic outputs 2818, each cryptographic output including components 2816 of a public code, a stable code, and a compensation mask. The public codes and stable codes are generated as described herein. The compensation codes applied by bitwise XOR (exclusive-or) operations on stable codes, described herein, provide a translation between the ROIs such that all of the stable codes can be modified to have a common global stable code 2820 value for hashing and comparison to the extent that the biometric capture for each of the stable codes is successful. In the exemplary embodiment of FIG. 28, ROI 2804 may be cropped and thus may not include all bits necessary to successfully generate the correct stable code.

Figure 29:
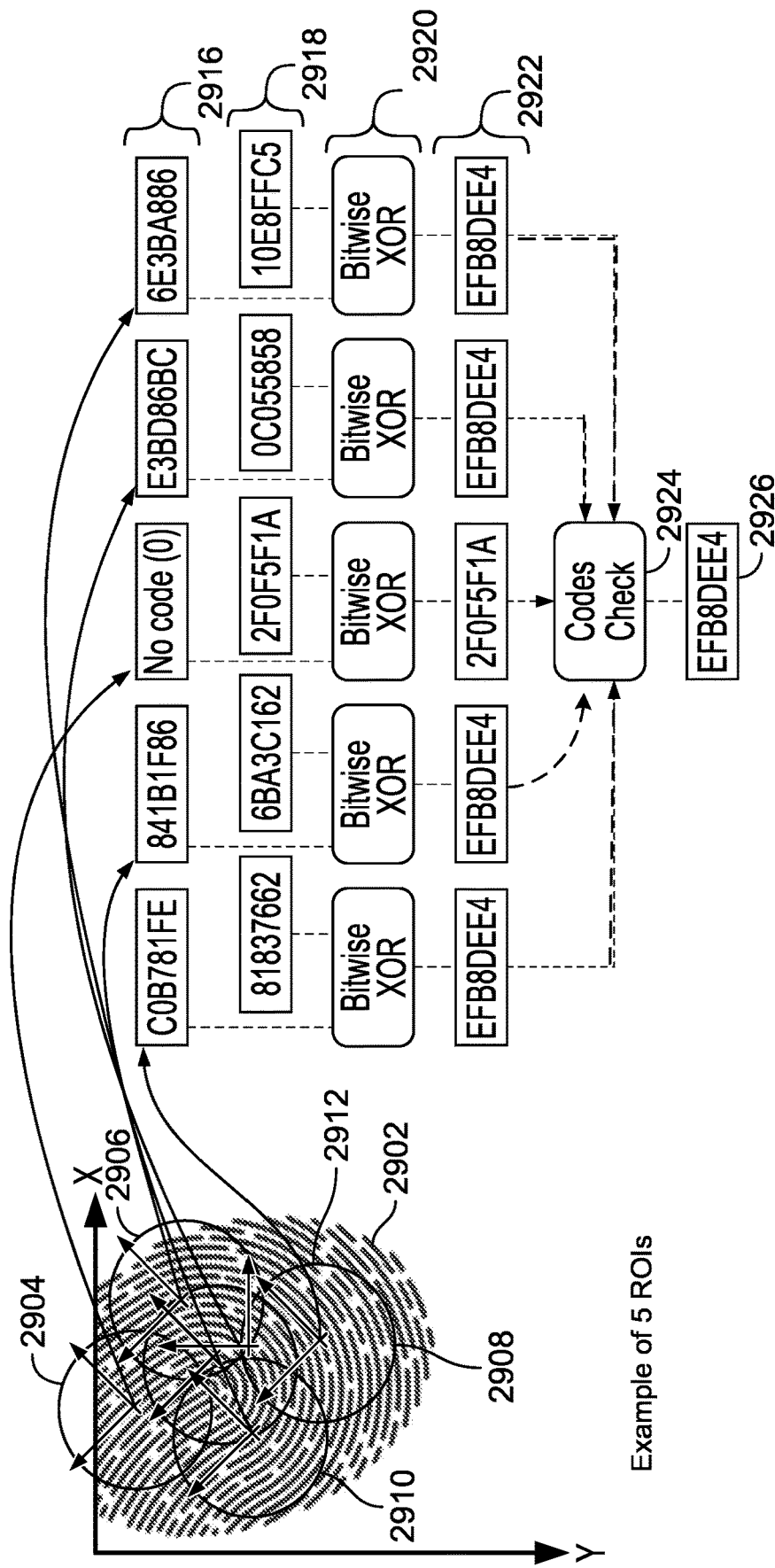
FIG. 29 shows an exemplary embodiment of code extraction and generation for multiple ROIs in accordance with some embodiments of the present disclosure.

FIG. 29 shows an exemplary embodiment of code extraction and generation for multiple ROIs in accordance with some embodiments of the present disclosure. Continuing with the example of FIG. 28, fingerprint 2902 corresponds to fingerprint 2802, ROI 2904 corresponds to ROI 2804, ROI 2906 corresponds to ROI 2806, ROI 2908 corresponds to ROI 2808, ROI 2910 corresponds to ROI 2810, and ROI 2912 corresponds to ROI 2812. As described with respect to FIG. 28, each of the ROIs 2906, 2908, 2910, and 2912 may be successfully obtained and relocated, such that the required bits for the respective stable codes may be obtained. In this exemplary embodiment, ROI 2904 may be partially cropped, such that a matching stable code cannot be determined from the captured biometric data of ROI 2904.

Exemplary stable codes 2916 are depicted as associated with each of the respective ROIs. Each of the stable codes 2916 is dependent on the underlying biometric data and feature vectors of the respective ROIs, thus each of the stable codes is different. For ROI 2904, no stable code satisfying the requirements herein can be determined, so all bits are set to a default value (e.g., "0"). Each of the stable codes 2916 associated with each ROI is modified (e.g., by bitwise exclusive-or operations 2920) with a respective compensation mask 2918. As described herein, the bitwise exclusive-or operations 2914 of the stable codes 2916 and compensation masks 2918 (e.g., obtained via a public code from registration) outputs a common compensated code 2922 of "EFB8DEE4" for ROIs 2906, 2908, 2910, and 2912. ROI 2904, on the other hand, has a different compensated code 2922 value as a result of the failed attempt to obtain the stable code 2916 for ROI 2904. The compensated codes are checked 2924 and the common compensated code EFB8DEE4 is established as the global stable code 2926 for comparison with the codes established at registration (e.g., after hashing of each of the global stable code values, as described herein).

In some embodiments, more than one of the ROIs may not match the other ROIs. Further, bad data or imposter data may be passed through the algorithm as a possible stable code 2916. Where there are multiple conflicting compensated codes 2922, a number of approaches may be used to select the value to be used as the global stable code 2926. For example, all of the possible compensated code values may be hashed and compared to the original biometric hash from registration. So long as one of the hashed compensated codes matches, this may be adequate for some applications. In some embodiments, higher security requirements may be established, such as requiring at least two ROIs having matching compensated codes, or utilizing only compensated codes associated with ROIs having little interference or missing data.

Figure 30:
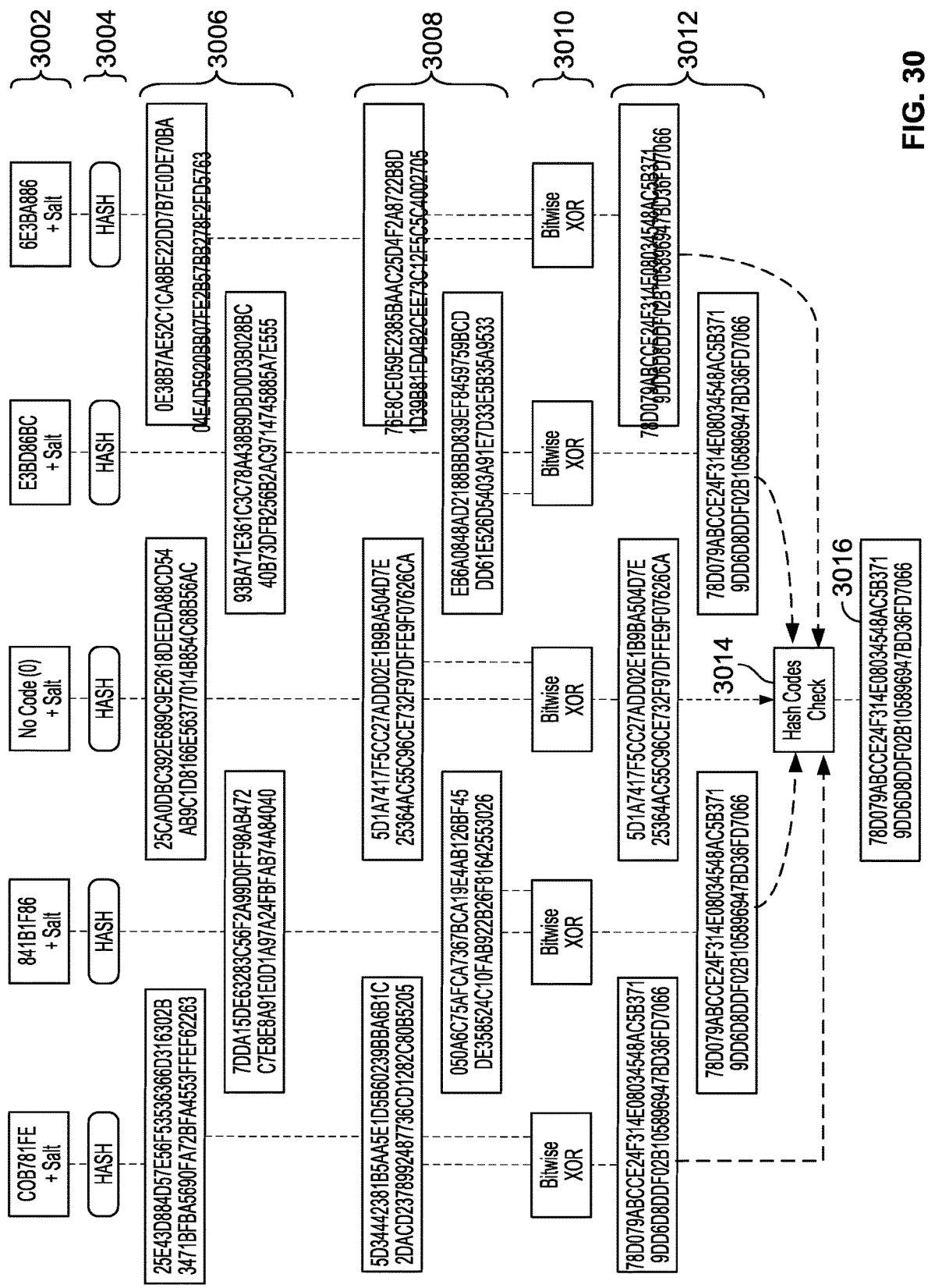
FIG. 30 shows exemplary biometric hash generation and checking for multiple ROIs in accordance with some embodiments of the present disclosure.

FIG. 30 shows exemplary biometric hash generation and checking for multiple ROIs in accordance with some embodiments of the present disclosure. Continuing with the examples of FIGS. 28-29, the respective salted stable codes 3002 correspond (from left to right), with ROI 2808/2908, ROI 2810/2910, ROI 2804/2904, ROI 2806/2906, and ROI 2812/2912. In the exemplary embodiment of FIG. 30, the respective stable codes are salted as described herein to generate salted stable codes 3002, except that a robust stable code was not able to be generated from ROI 2804/2904. The salted stable codes 3002 are hashed 3004 to generate private hash codes 3006, which are modified (e.g., by exclusive-or operations 3010) by hash compensation masks 3008 to generate compensated hash codes 3012. The compensated hash codes 3012 associated with all but ROI 2804/2904 match at hash code check 3014, and the matching compensated hash codes 3012 are established as the global stable hash code 3016.

Figure 31:
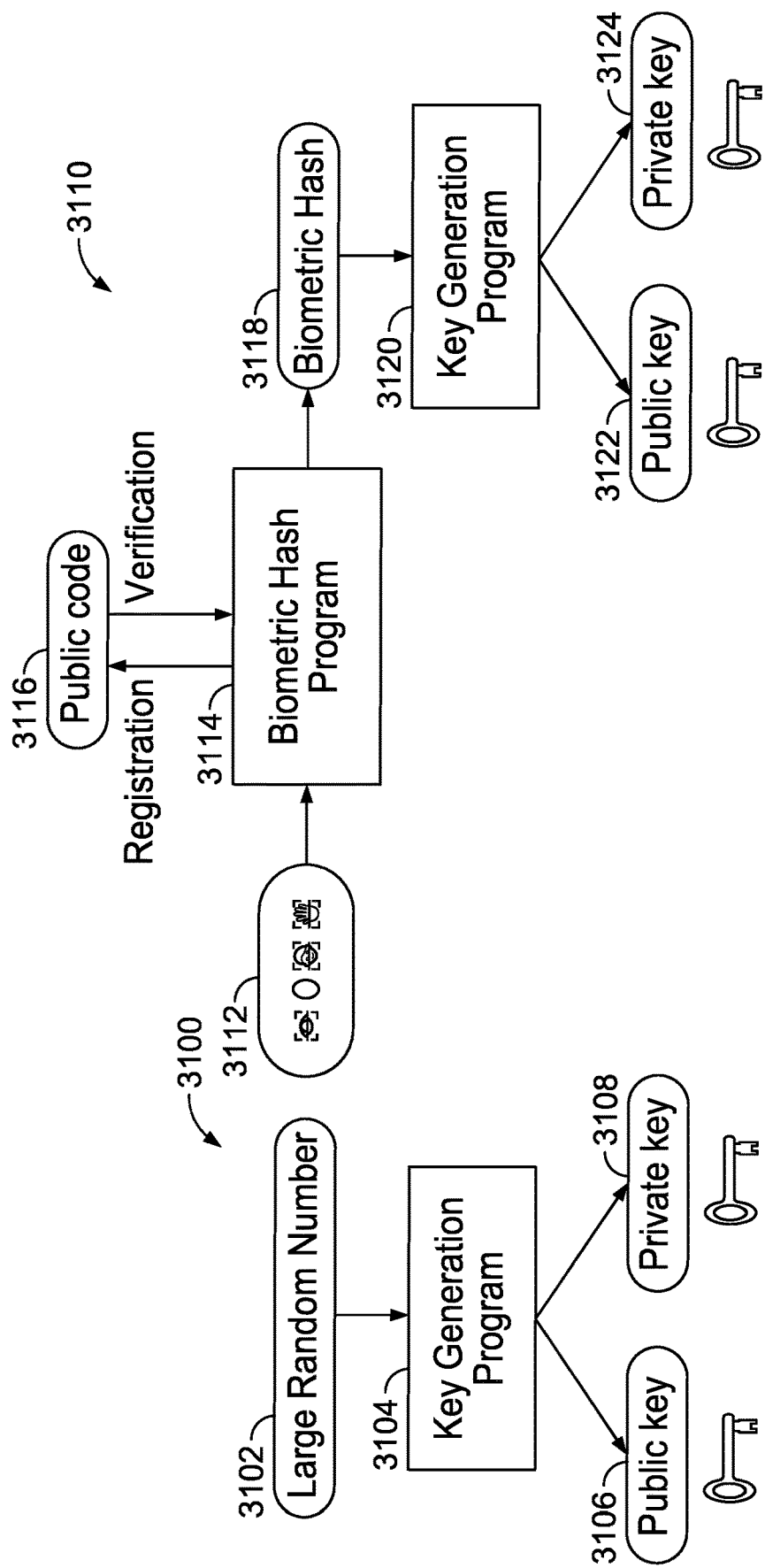
FIG. 31 depicts exemplary asymmetric encryption utilizing biometric codes in accordance with some embodiments of the present disclosure.

FIG. 31 depicts exemplary asymmetric encryption utilizing biometric codes in accordance with some embodiments of the present disclosure. In an exemplary asymmetric encryption system 3100, a large random number 3102 is input into a key generation program 3104 to generate respective private key 3108 and public key 3106. In an embodiment of biometric asymmetric key generation 3110, biometric capture 3112 is used to acquire biometric data that is then used to generate the private and public keys. The biometric data is processed by a biometric hash algorithm 3114 to generate the public code 3116 (or, in the instance of an asymmetric encryption to generate a private and/or public key, the biometric hash algorithm 3114 accesses the public data 3116) and the biometric hash 3118. The biometric hash 3118 is then used as the input to the key generation program 3120 to create the private key 3124 and public key 3122. In this manner, the biometric hashes generated in accordance with the present disclosure can be used to generate and distribute both private and public asymmetric keys based on a user's biometric data.

Figure 32:
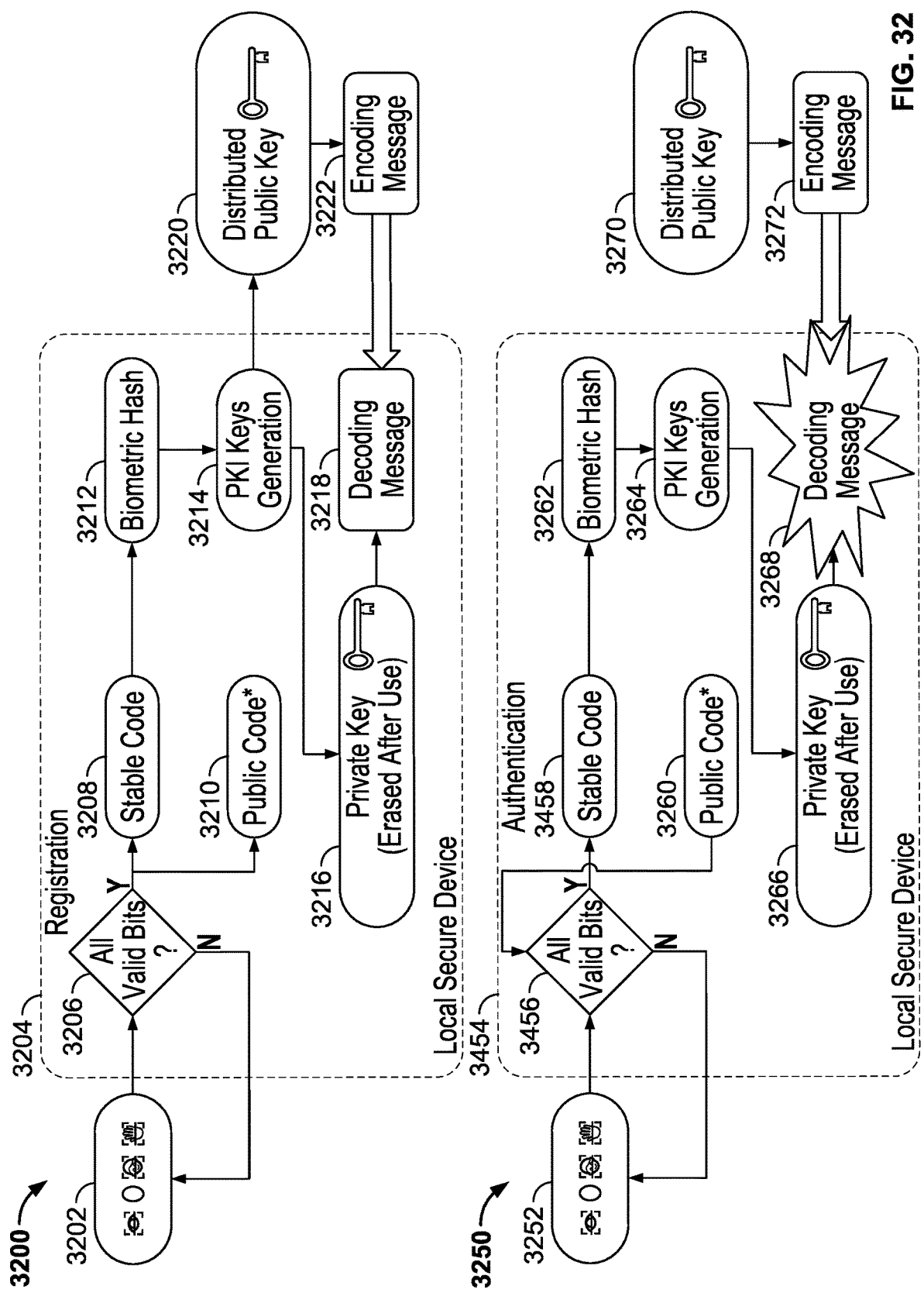
FIG. 32 depicts exemplary PKI encryption utilizing biometric codes in accordance with some embodiments of the present disclosure.

FIG. 32 depicts exemplary PKI encryption utilizing biometric codes 3200 in accordance with some embodiments of the present disclosure. In accordance with the present disclosure, a user's biometric information may be used to generate a distributed public key (e.g., public key 3220/3270) and to generate a repeatable temporary private key (e.g., private key 3216/3266). In this manner, the user's biometric information essentially functions as the private key. During an exemplary registration stage, a user's biometric information 3202 may be obtained as described herein in a loop until a local secure device 3204 identifies enough valid bits 3206 to determine a stable code 3208 and public code 3210. The public code 3210 may be made available (e.g., as an encrypted public code) to other devices for later processing (e.g., such as local secure device 3254). A biometric hash 3212 may be generated from the stable code 3208, and the biometric hash 3212 may in turn be processed by a key generation process (e.g., PKI keys generation 3214) to generate a distributed public key 3220 and a temporary private key 3216. The private key can be used to process any encoded messages 3222 that are encoded by the public key 3220 to access decoded messages 3218. If there are no current encoded messages to process, or if processing of encoded messages is complete, the private key can be permanently deleted. In order to access additional messages encoded by the public key 3220, the user will have to reestablish the private key with the user's biometric information.

Once a public code 3210/3260 and public key 3220/3270 are established, the user's biometric information can be used to generate the private key 3216/3266 at other local secure devices (e.g., local secure device 3254). The user's biometric information 3252 may be obtained as described herein in a loop until the local secure device 3254 identifies enough valid bits 3256 to determine a stable code 3258. The public code 3260 may correspond to the public code 3210 and may be acquired by the local secure device 3254 as described herein. A biometric hash 3262 may be generated from the stable code 3258, and the biometric hash 3262 may in turn be processed by a key generation process (e.g., PKI keys generation 3264) to generate a temporary private key 3266. Assuming that the user is in fact the same user who registered the original private key 3216 and public key 3220, the private key 3266 should match the private key 3216 and should function to decode encoded messages 3272 that are encoded by public key 3270/3220. In this manner, the user can access decoding messages 3268 at the local secure device 3254, without ever permanently storing the user's private key at any device.

Figure 33:
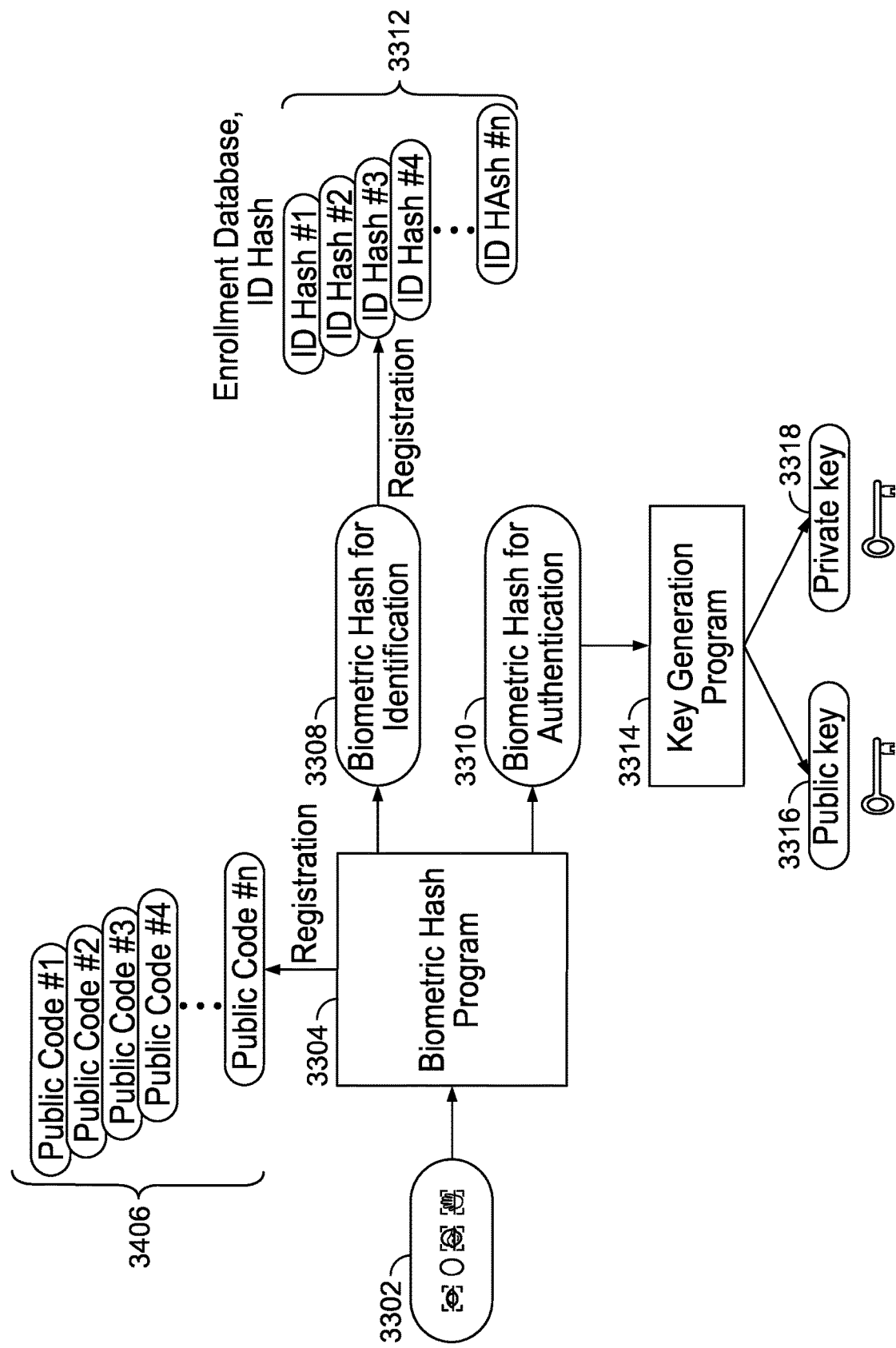
FIG. 33 depicts exemplary identification hash registration in accordance with some embodiments of the present disclosure.

FIG. 33 depicts exemplary identification hash registration in accordance with some embodiments of the present disclosure. As described herein, a public code may not include information from which a user's biometric data may be determined, while the biometric hash allows total bitwise comparison of data that is permanently obscured by the underlying one-way hash function used to create the biometric hash. Biometric hashes may also be used to generate private/public key pairs as described herein. None of this output data allows the underlying biometric information to be determined, but rather, only the same biometric features may be used to identify and/or authenticate the user.

In the exemplary embodiment of registration depicted in FIG. 33, the captured biometric data 3302 (e.g., acquired by a processing loop as described herein) may be processed by a biometric hash program 3304 to create a public code 3306, biometric hash 3308 for storage 3312 and later comparison, and a biometric hash 3310 for generation 3314 of private keys 3318 and public keys 3316. This information, with the exception of the private keys 3318, which may be deleted after use as described herein, may be stored and distributed as necessary to provide the user the ability to quickly and easily perform identification and/or authentication at virtually any location or capture device worldwide, and without compromise or even storage of the user's underlying biometric information.

Figure 34:
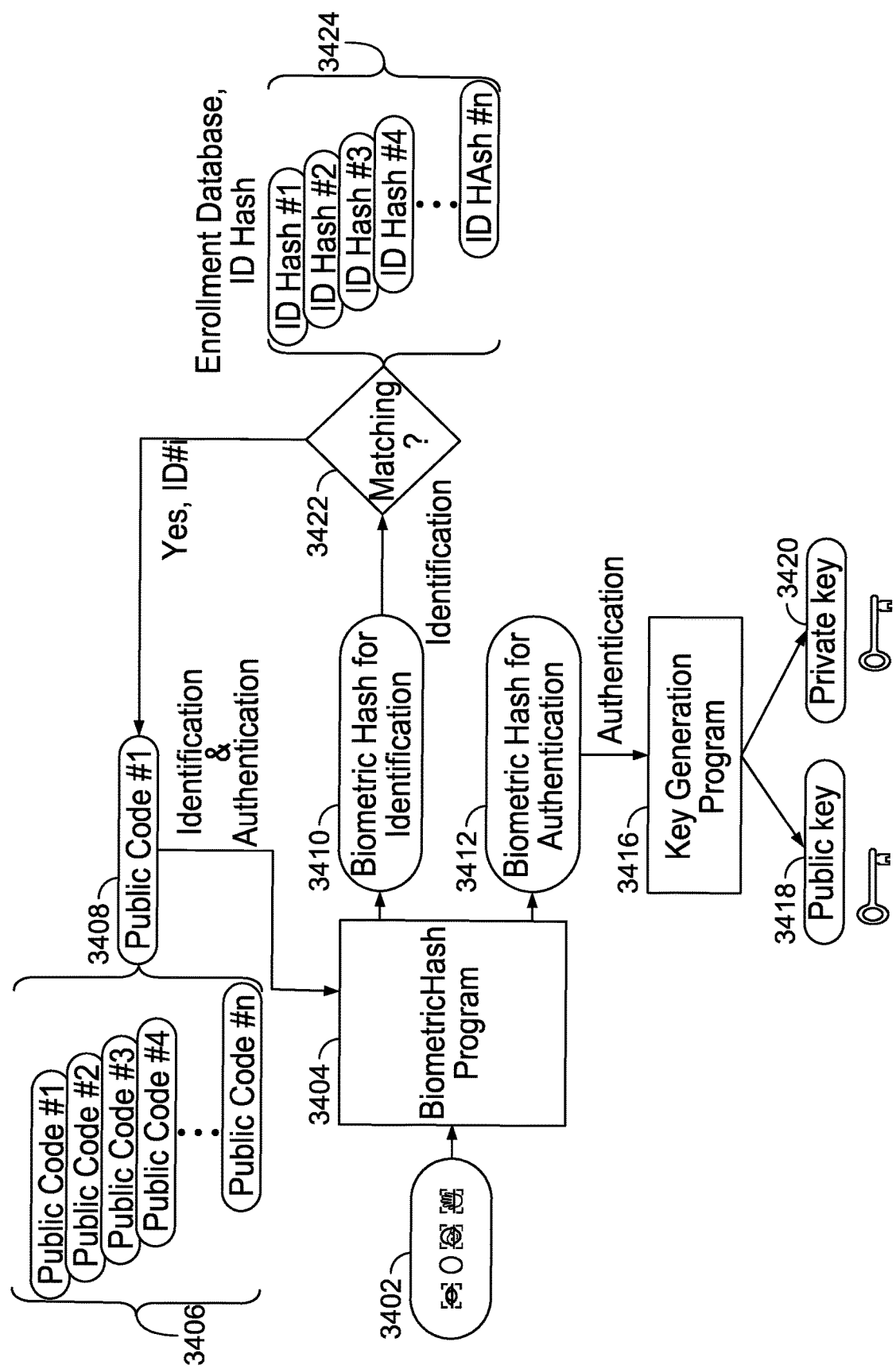
FIG. 34 depicts exemplary hash identification and authentication in accordance with some embodiments of the present disclosure.

FIG. 34 depicts exemplary hash identification and authentication in accordance with some embodiments of the present disclosure. In the exemplary embodiment of identification and/or authentication depicted in FIG. 34, and public codes 3406, biometric hashes 3424, and public key 3418 may already be established at registration databases or other public repositories. A secure device captures the biometric data 3402, which is processed by a biometric hash program 3404 based on an associated public code 3408. If the proper user provides the biometric information, the resulting biometric hash 3410 may be used for identifying matches 3422 with biometric hashes 3424, while private key 3420 can be generated from biometric has 3412 by a key generation program 3416 to match the original private key (e.g., private key 3318) and to encode or decode information for communication with a third party in possession of the public key 3418.

Figure 35:
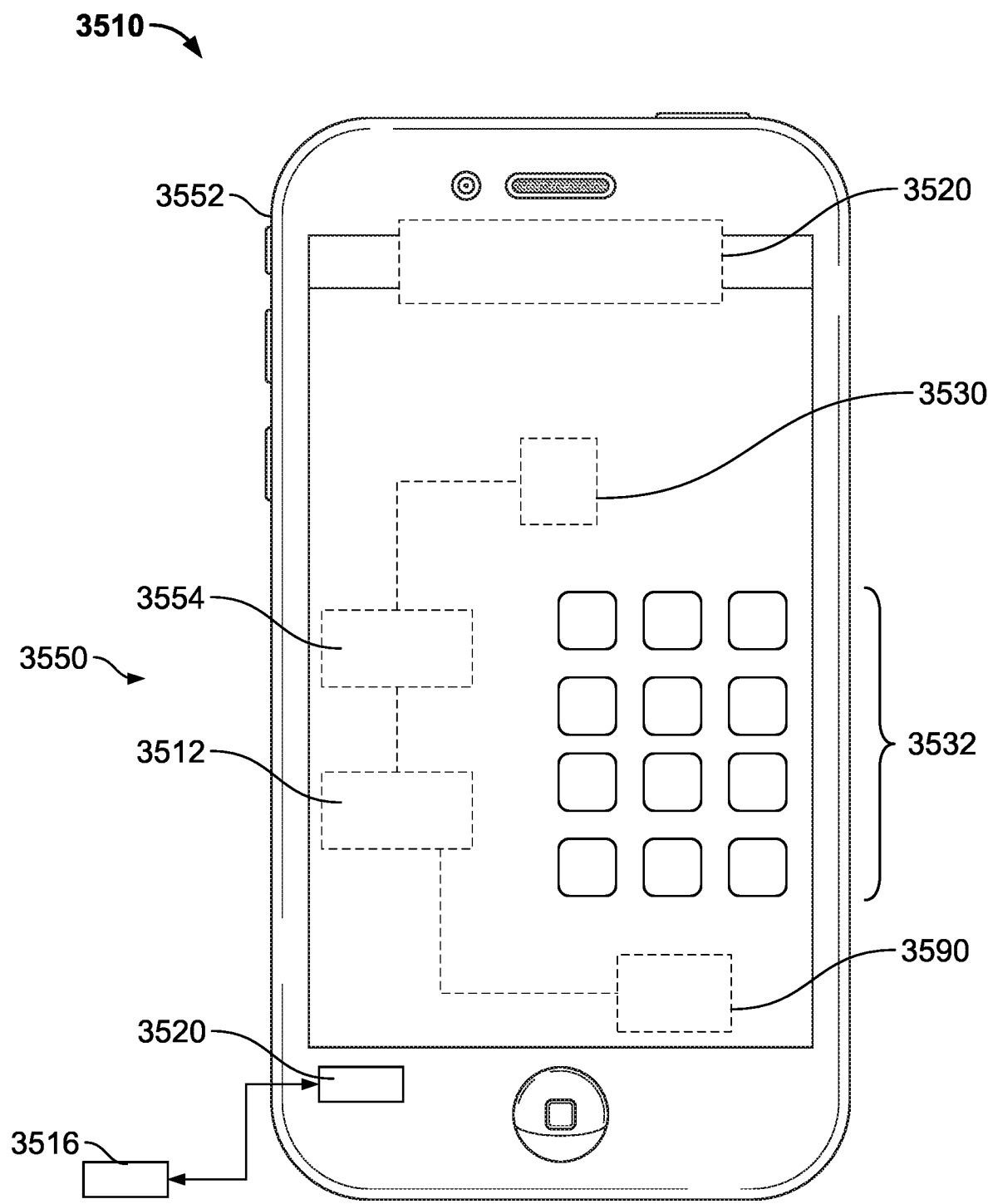
FIG. 35 depicts an exemplary biometric processing system in accordance with some embodiments of the present disclosure.

FIG. 35 depicts an exemplary biometric processing system in accordance with some embodiments of the present disclosure. In the exemplary embodiment depicted in FIG. 35, a mobile device such as a biometric device 3510 such as a smartphone, is depicted as an biometric data capture and processing device, which is then in communication with other capture devices, processing devices, storage, servers, remote processing, and other suitable components for performing the operations described herein over suitable wired and wireless networks as is known in the art. Although certain operations will be described as being performed by biometric device 3510, and biometric device 3510 may be described as including certain components, hardware, and software, it will be understood that any suitable portion of the operations and components of biometric device 3510 may be split between multiple local and/or networked devices in accordance with the present disclosure, such as locally networked capture devices, IoT devices, smart systems of appliances/vehicles/equipment, desktop or laptop computers, and other suitable devices having the necessary processing, communication, and/or data capture capabilities.

An exemplary biometric capture system (e.g., optical, IR, time-of-flight, capacitive, ultrasonic, etc.) 3520 for one or more biometric features (e.g., iris, facial, fingerprint, etc.) includes a controller 3550 that includes one or more processors 3554 (e.g., microprocessor, core or application processor, graphic processor, and/or processor, etc.) and includes an operating system such as iOS, Microsoft WINDOWS, LINUX, Android, or the like. The processor may be or include any suitable processor having processing capability necessary to perform the processing functions described herein, including but not limited to hardware logic, computer-readable instructions running on a processor, or any combination thereof. In some embodiments, the processor 3554 may include a general- or special-purpose microprocessor, finite state machine, controller, computer, central-processing unit (CPU), field-programmable gate array (FPGA), or digital signal processor. Processor 3554 may run software to perform the operations described herein, including software accessed in machine-readable form on a tangible non-transitory computer-readable storage medium (e.g., flash, RAM, ROM, SRAM, EEPROM, hard drives, etc.), as well as software that describes the configuration of hardware such as hardware description language (HDL) software used for designing chips.

Controller 3550 may also include a memory unit ("memory") 3512 operably coupled to processor 3554, on which may be stored a series of instructions executable by processor 3554. As used herein, the term "memory" refers to any tangible (or non-transitory) storage medium including disks, thumb drives, and memory, etc., but does not include propagated signals. Tangible computer-readable storage mediums may include volatile and non-volatile, removable and non-removable media, such as computer readable instructions, data structures, program modules or other data. Examples of such media include RAM, ROM, EPROM, EEPROM, flash memory, CD-ROM, DVD, disks or optical storage, magnetic storage, or any other non-transitory medium that stores information that is accessed by a processor or computing device. In an exemplary embodiment, controller 3550 may include a port or drive (not depicted) adapted to accommodate a removable processor-readable medium 3516, such as CD-ROM, DVD, memory stick or like storage medium.

The biometric methods of the present disclosure may be implemented in various embodiments in a machine-readable medium (e.g., memory 3512) comprising machine-readable instructions (e.g., computer programs and/or software modules) for causing controller 3550 to perform the methods and the controlling operations for the operating system. In an exemplary embodiment, the computer programs run on processor 3554 out of memory 3512, and may be transferred to main memory from permanent storage via disk drive or port 3522 when stored on removable media 3516, or via a wired or wireless network connection when stored outside of controller 3550, or via other types of computer or machine-readable media from which it can be read and utilized. For example, in some embodiments, some or all of the processing described herein may be performed by a remote system that receives biometric data, public and stable codes, or other data (e.g., scores associated with biometric data) to perform aspects of the processing (e.g., processing of biometric data, generation of biometric codes, comparison to code reference databases, etc.) remotely from the hand-held device.

The computer programs and/or software modules may comprise multiple modules or objects to perform the various methods of the present disclosure, and control the operation and function of the various components in the biometric device 3510. The type of computer programming languages used for the code may vary between procedural code type languages to object-oriented languages. The files or objects need not have a one-to-one correspondence to the modules or method steps described, depending on the desires of the programmer. Further, the method and apparatus may comprise combinations of software, hardware and firmware. Firmware can be downloaded into processor 3554 for implementing the various exemplary embodiments of the disclosure. Controller 3550 may also include a display 3530 (e.g., a touchscreen display providing various applications and interfaces), which may be any suitable display for displaying information in any suitable manner, for example, using a wide variety of alphanumeric and graphical representations. In an embodiment, the instructions in the memory 3512 and/or memory associated with the processor may include instructions for various applications that may make use of the biometric capture and processing capabilities of biometric device 3510, such as to provide access to the hand-held device, to provide access to particular applications running on the hand-held device, to assist in setup of a biometric identification system (e.g., to enroll users), or perform other suitable functionality. For example, in some embodiments, display 3530 may display biometric images (e.g., images captured and/or enhanced by the biometric device 3510), information relating to biometric codes, instructions for enrolling users, or possible user matches. Controller 3550 may also include a data-entry device 3532, which, in the embodiment of the hand-held device of FIG. 35, may be embodied as images of a user interface depicted on the touchscreen display 3530. In some embodiments, data entry device 3532 may include any suitable device that allows a user of system 3510 to interact with controller 3550. For example, a keyboard or touchscreen may allow a user to input information for controller 3550 (e.g., the name of the object being captured, etc.) and to manually control the operation of system 3510. In an exemplary embodiment, controller 3550 is made sufficiently compact to fit within a small form-factor housing of a handheld or portable device, such as device 3552 shown in FIG. 35.

The Biometric device 3510 may also include a database unit operably connected to controller 3550. In an embodiment, the database unit may include a memory unit that serves as a computer-readable medium adapted to receive public codes, stable codes, and other biometric information from processor 3554 and store the associated processed digital data. A memory unit of the database unit may include any suitable memory as described herein, and may be operably connected to controller 3550 in any suitable manner (e.g., locally within the biometric device 3510 or remotely). In an exemplary embodiment, the database unit 3590 is included within controller 3550, although any suitable portion thereof may be included at other local devices or a remote system.

Figure 36:
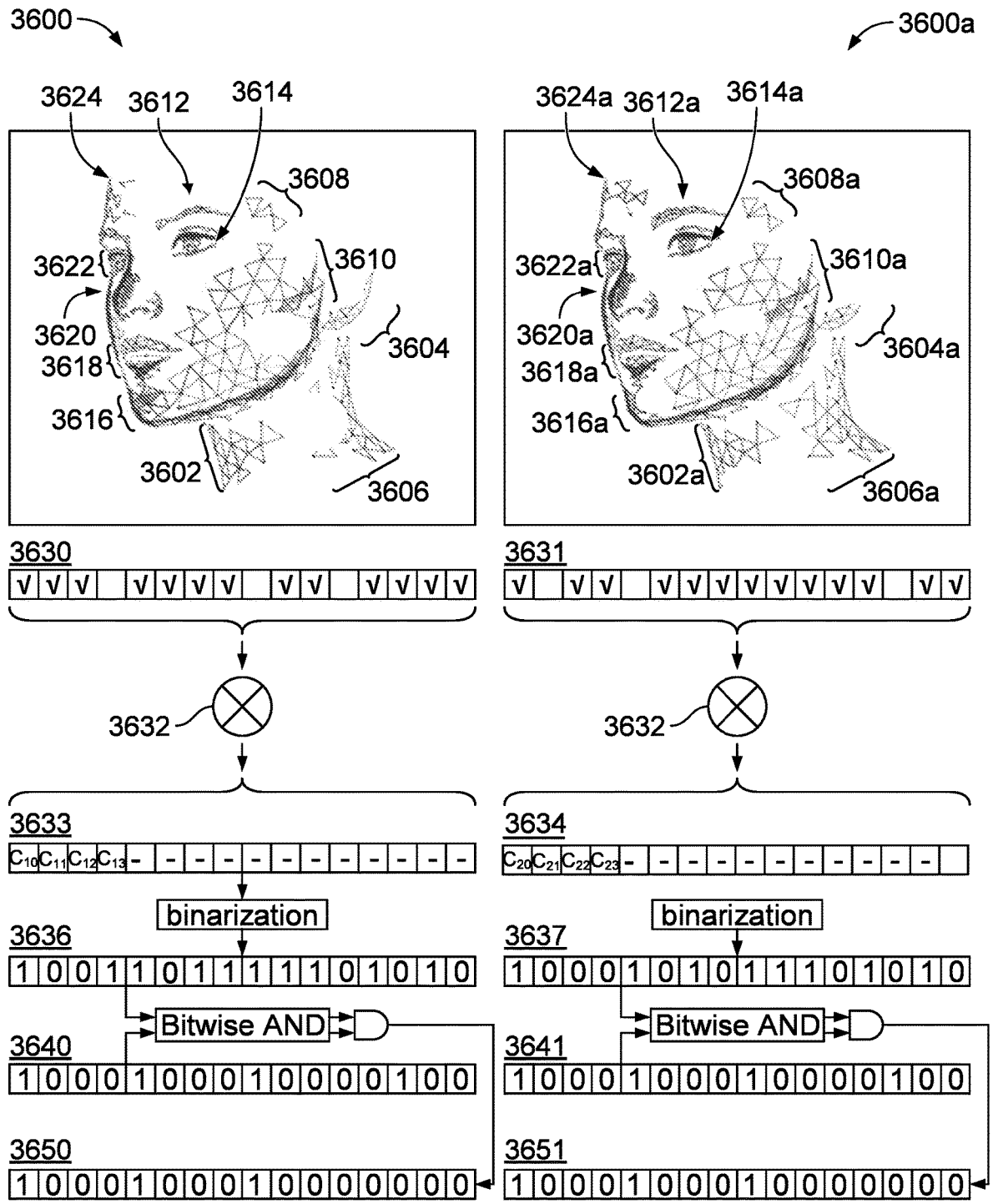
FIG. 36 depicts partial facial features determined from a face capture, in accordance with some embodiments of the present disclosure.

FIG. 36 shows partial facial feature capture 3600 determined from a face capture, in accordance with some embodiments of the present disclosure. Although FIG. 36 is described in the context of facial image capture, it will be understood that similar captures may occur with other types of biometric information. In an embodiment of a non-ideal face capture the capture process may occur, for instance, in real-time scenarios where less controlled facial capture conditions are present and a timely verification is preferred (e.g., quickly unlocking a phone, at an entrance to a building, unlocking a digital wallet, etc.). The exemplary partial facial feature capture 3600 includes samples from a plurality of regions of a face of the user, including front neck region 3602, earlobe region 3604, left-and-back neck region 3606, left-side temple region 3608, left cheek and jaw region 3610, left brow 3612, left eye 3614, partial chin 3616, mouth 3618, partial right cheek and nose 3620, partial right eye 3622, and partial forehead 3624. It will be understood that the samples include a plurality of portions, and each portion of the plurality of portions may correspond to a different region of the plurality of regions of the face, where there are numerous other regions (e.g., right neck region, right cheek region, right temple region, right cheek region, right jaw region, right nose region, right eye region) that are only partially captured or not captured at all.

Thus, the non-ideal face capture may have parts of the face occluded from the capture, such that one or more samples corresponding to the occluded region may be missing. As shown, for example, some of the facial features corresponding to the right side of the face, such as right cheek 3620, right eye 3622, and a portion of mouth 3618 and chin 3616 may be occluded in the non-ideal face capture, and the determined facial feature vectors in these local regions may be limited or missing. To the extent that a facial recognition program is relying upon such features in whole or in part, information necessary for comparison such as for authentication or verification may be unavailable, such that it is not possible to test for a match with the image at all under typical conditions or biometric comparison techniques. In other instances, approximation or partial matching techniques, such as Hamming or Euclidean distances, or use of error-correction codes may be used to test for a match. However, these approaches may result in additional false acceptances, generally reduce security, and are not suited for use in bit-wise matching techniques.

As described herein, composite feature sets (e.g. composite facial feature vectors) suitable for bitwise comparison to the original comparison information (e.g., a biometric hash) may be calculated to facilitate a "complete" capture of facial information even in the instance of non-ideal image capture that: (a) does not contain all of the underlying facial features; or (b) contains incomplete or corrupted facial feature data. The source data for the composite features are unlocalized, drawn from all regions of the face, and thus obfuscate the origin of the underlying vector set (e.g., the raw captured data). An inherent characteristic of composite features and their utilization of unlocalized source data is to mitigate the impact of necessary differences between different face capture events (e.g., changes in lighting, occlusions, and face angles).

A second facial feature capture 3600a depicts a second example of a non-ideal face capture events that has a portion of different or corrupted underlying facial features due to any number of reasons (e.g., different lighting conditions, tilt of the face, corruption or cropping). The second exemplary partial facial feature capture 3600a includes samples from a plurality of regions of a face of the user, including front neck region 3602a, earlobe region 3604a, left-and-back neck region 3606a, left-side temple region 3608a, left cheek and jaw region 3610a, left brow 3612a, left eye 3614a, partial chin 3616a, mouth 3618a, partial right cheek and nose 3620a, partial right eye 3622a, and partial forehead 3624a. A number of this regions, such as earlobe region 3604a, left-and-back neck region 3606a, left cheek and jaw region 3610a, In mouth 3618a, and partial forehead 3264a, have captured different portions of facial data as that captured in corresponding regions of first facial feature capture 3600.

Despite these significant differences, the use of generated composite feature permits the production of a stable code that can be successfully compared via a bitwise operation. Extracted face vectors 3630 are established and include data from underlying features that meets a criteria of certainty and/or repeatability, for example, as described herein. The extracted face vectors 3630 and 3631 are transformed in 3632 to calculate the respective but still dissimilar composite features 3633 and 3634. The differences between these two composite feature sets are not equally distributed, and for each determined composite feature there is a varying probability of error. Additionally, the ratio difference over the gap to the threshold of binarization that determines the probability of error is not equally distributed. These factors permit sorting and selection of each individual composite feature to disable those that have a high probability of error through the use of a composite-feature specific validity mask. In total, with this ratio of standard deviation of the observed dispersion over the gap to the binarization threshold the Gaussian distribution-determined probability of error decreases quickly and ensures that the probability of relying upon erroneous composite features converges to zero.

Each component of the composite features 3633 and 3634 where each of the components are represented by the symbols complex value symbols "$C_{10}$", "$C_{11}$", "$C_{13}$", etc. on composite features 3633 and "$C_{20}$", "$C_{21}$", "$C_{23}$", etc. on composite features 3634. Post-binarization, each composite feature set has been transformed into the binary arrays 3636 and 3637, respectively. Finally, a previously-calculated composite feature validity mask is applied to these binary arrays (a bitwise AND operation) to create stable codes 3650 and 3651. Thus, despite the different face captures events and their unique occlusions in facial feature captures 3600 and 3600a, stable code 3650 and 3651 have the same binary value.

Figure 37:
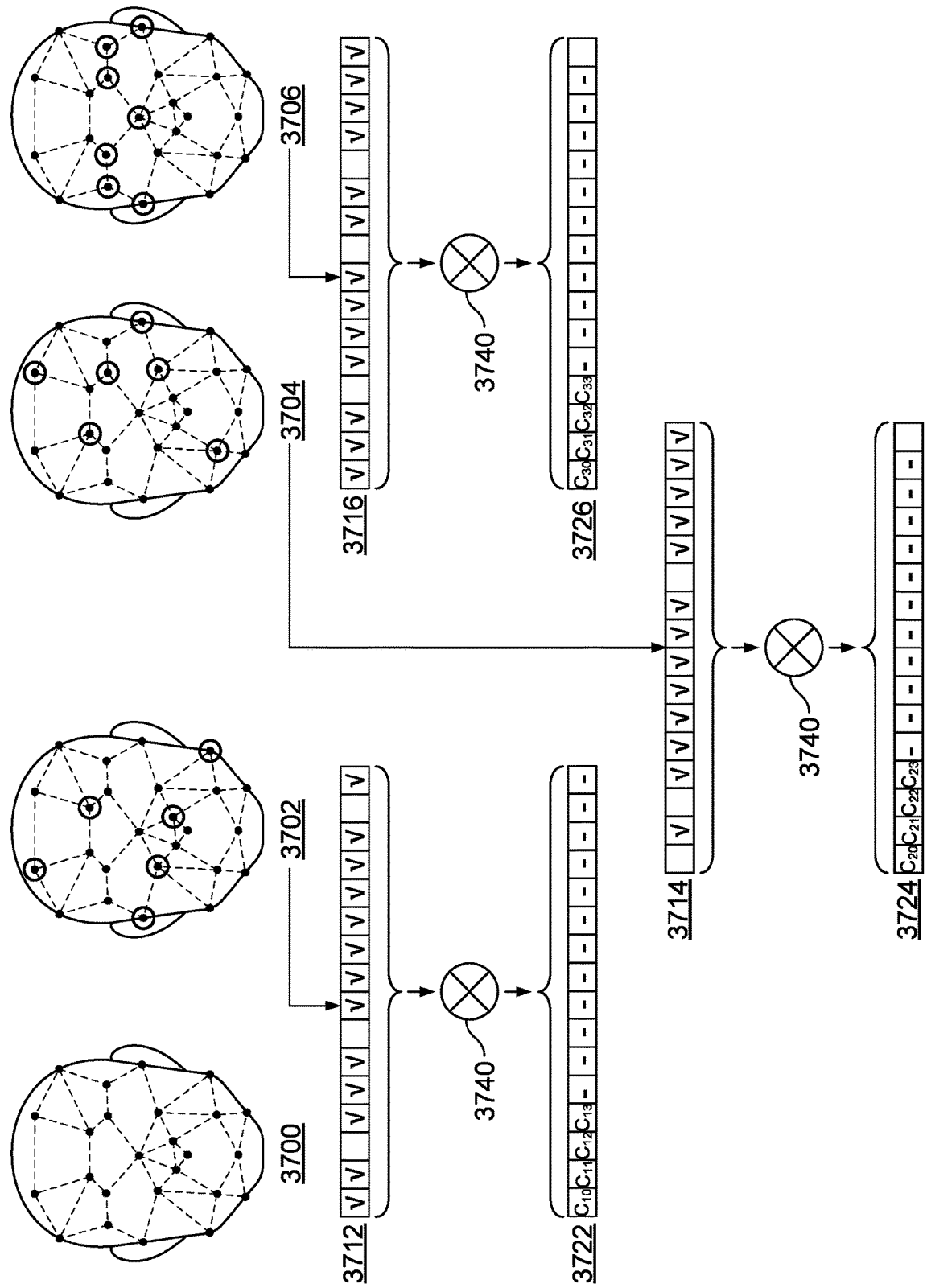
FIG. 37 depicts illustrative examples of composite feature vector sets that are generated by a composite feature generating process, in accordance with some embodiments of the present disclosure.

FIG. 37 depicts illustrative examples of composite feature vector sets that are generated by a composite feature generating process, in accordance with some embodiments of the present disclosure. In an initial face capture, which in some instances may include more captures, better lighting, better angles, etc. than a later capture, facial features vectors are captured from numerous locations on the face, for example, in a manner depicted in FIG. 36 with dozens or hundreds of individual captured points and corresponding vectors associated with those points. FIG. 37 represents the creation of a subset of feature vectors (depicted in feature vector set 3700) that in turn are based on underlying captured data points and feature vectors.

The original captured features may be combined and interpolated, using an isomorphic vectorial transformation or a projection in a new orthogonal vectorial base, to generate a complex representation of the combined samples (e.g., as depicted for feature sets 3702, 3704, and 3706) such as the composite features and composite feature vector sets 3712, 3714 or 3716. The composite feature vectors are unlocalized, obfuscating the origin of the underlying vector set (e.g., the raw captured data), and may be used to generate a stable, private code. The composite feature components are linked to (i.e., based on) all regions of the face, connecting the composite feature vector set 3712, 3714 or 3716. For example, a single composite feature is based on complex combinations of a derivation of multiple adjacent features by the process 3740, such that different subsets of underlying raw data will generate the same composite data in most instances, with such composite data and composite feature vectors being suitable for bitwise comparison to a private code originally calculated for the same user, e.g., based on the same composite feature vectors generated from at least partially different raw data.

The inputs to the process of composite feature generation are not restricted to simple localized features and works equally on facial vectors generated by advanced facial algorithms (e.g., based on deep learning classification technique). In this manner, composite data points and composite feature vectors function as an "artificial" set of biometric data, that is nonetheless unique to an individual with some relatively limited amplitudes of variation from a same face in different captures and can only create the same biometric hash (based on information identified in a public code) with at least portions of the same underlying biometric information.

The vector output of is thus a face template composed of an array of numerical values (e.g. floats) generally sized where each of these individual values or vector components are already linked to all or most regions of the face. A composite feature processing module operates on any injected vectorized facial representation, whether localized on facial region or unlocalized, by using other bases of representations. The composite features generation is an isomorphic vectorial transformation or a projection in a new orthogonal vectorial base. This transformed base of representation has a number of properties. For example, the output numerical values or face vector representation in the composite feature representation base contains components that are function of all input facial features. The outcoming composite feature are thus unlocalized, obfuscating the origin of data and making any reverse transformation very difficult even if the original composite information is available, which it is not except during creation of the original composite data points and composite feature vectors.

Any unbalanced noise or errors on injected facial features related to face variations, illumination, yaw, pitch and various capture artefacts are diluted among the "composite feature" output set. While such underlying raw data features may contribute to composite data, their contribution will not actually change the output of the raw data in most instances of a later capture. This feature provides for stable code generation by offering the capability to generate stable bits despite of corrupted input features or having some region of the face cropped or corrupted, reducing the False Rejection rate (FRR) or False Negative Rate (FNR).

Subsets of composite features, such as composite feature subsets 3722, 3724, and 3726, may be used to generate public codes, private codes, cryptographic hashes, and the like, as described herein. In this manner, a single composite feature vector set 3712, 3714 or 3716 may be used to generate multiple sets of authentication and verification data for a single user, such as for different purposes. Cryptographic keys derived from the hash of the stable code generated from composite feature subset 3722 might be used for one purpose (e.g., building access, temporary access, etc.) while other composite feature subset 3724 might be used for banking applications. If access is revoked or changed for any reason, additional composite feature subsets (e.g. feature subset 3726) and derived values as described previously (e.g., authentication and verification data and cryptographic keys) may be generated without needing to perform a new or supplemental biometric scan.

Figure 38:
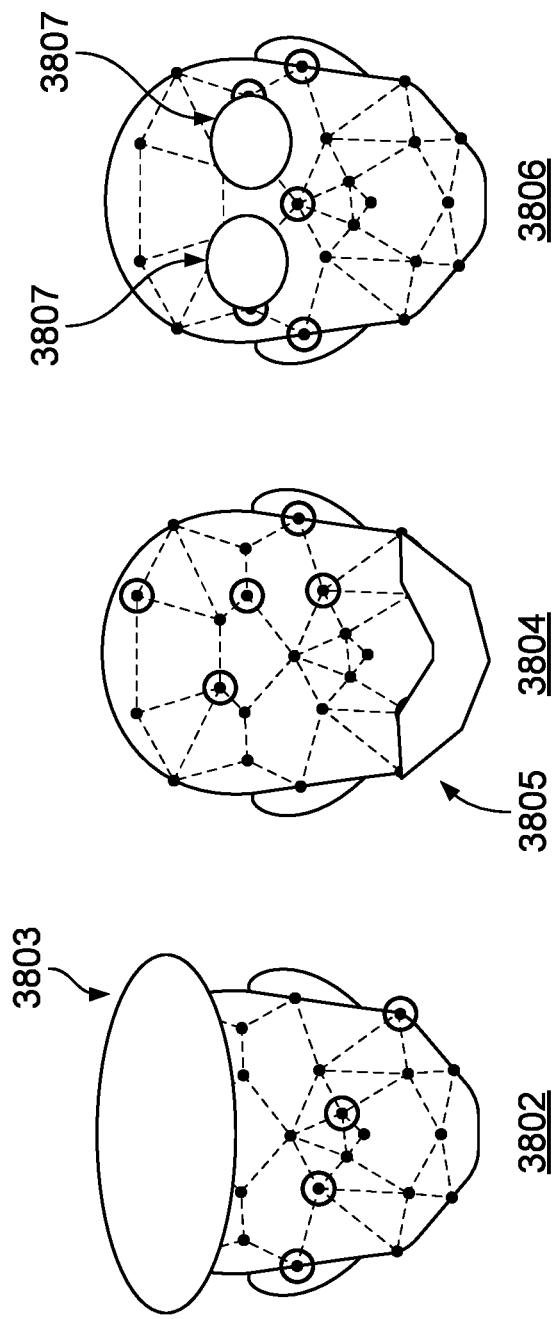
FIG. 38 depicts illustrative examples of a composite feature extraction process for non-ideal face captures with occluded regions, in accordance with some embodiments of the present disclosure.

FIG. 38 depicts illustrative examples of a composite extraction process for non-ideal face captures with occluded regions, in accordance with some embodiments of the present disclosure. The exemplary FIG. 38 includes a first subset of features 3802 with a first occluded region 3803, a second subset of features 3804 with a second occluded region 3805, and a third subset of features 3806 with a third occluded region 3807, although other subsets of composite features and/or corresponding occluded regions may be included or substituted in other embodiments.

The first subset of features 3802 (i.e., similar to the first subset of six features 3702) includes the first occluded region 3803 which contains no facial features. It will be understood that the occluded region may be anywhere on the face, as shown in the second subset of features 3804 (i.e., similar to the second subset of six features 3704) that includes the second occluded region 3805 (i.e., in a different region of the face compared to that of the first occluded region 3803). It will be further understood that the occluded region may include one or more regions of the face, as shown in the third subset of features 3806 (i.e., similar to the third subset of seven features 3706) that includes the third occluded region 3807 which occludes two regions of the captured face.

Because each component of the composite feature vector set is unlocalized, even if one or more points of a subset of composite features used to generate the feature vectors are missing, a generated composite feature vector set derived from other samples may still be stable enough to function as a suitable complex representation used to generate the private code. For example, in each of the instances depicted in FIG. 38, an occluded region is covering up a location associated with a composite data point of the feature subset (e.g., first occluded region 3803 is covering up two composite data points associated with the eyes or forehead of 3802/3702, second occluded region 3805 is covering up a composite data points associated with the jaw of 3804/3704, and occluded region 3807 is covering up two composite data points and partially covering up another two data points associated with the eye regions of 3806/3706). However, because the composite data points are "artificial" and are created from relationships between numerous data points, despite such theoretical occlusions the underlying data point can still be derived from actual available raw facial data.

Figure 39:
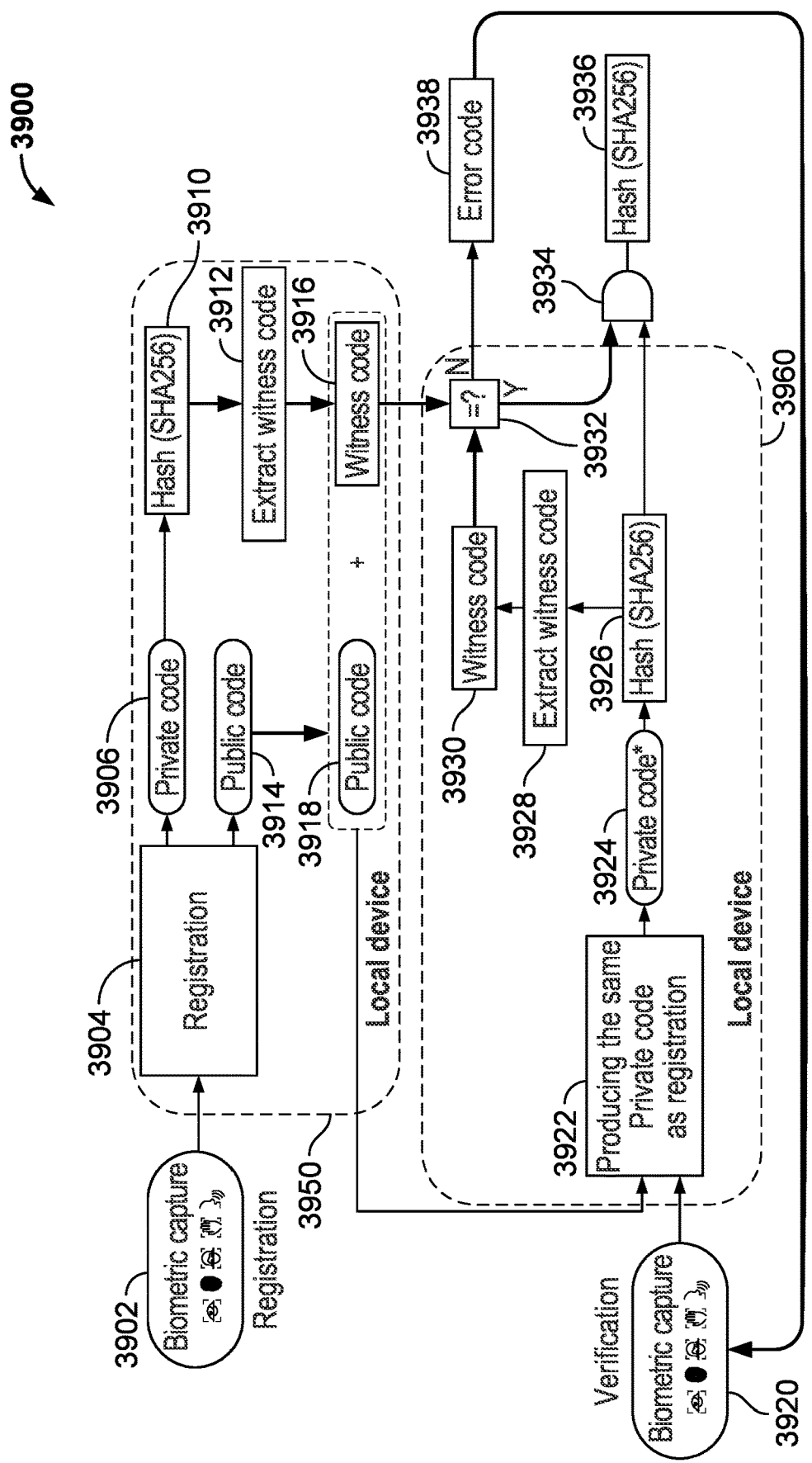
FIG. 39 depicts an exemplary embodiment of a biometric registration and authentication process that includes a witness code, in accordance with some embodiments of the present disclosure.

FIG. 39 depicts an exemplary embodiment of a biometric registration and authentication process 3900 that includes a witness code, in accordance with some embodiments of the present disclosure. For the exemplary embodiment of FIG. 39, the process will be described in the context of a facial type biometric data, although it will be understood that the disclosure of FIG. 39 may suitably be applied jointly or severally to other biometric modalities (e.g., iris, fingerprint, etc.) as well as confirmation of other measurement of physical and chemical properties. In the exemplary embodiment of FIG. 39, a registration device 3950 and an authentication device 3960 (with each of the devices 3950 and 3960 including a local biometric capture device and supporting hardware and software, whether as an integrated device or multiple devices in communication with each other) are used at different times to initially acquire the biometric data of a user and then authenticate the user at a later time based on a later acquisition of the user's biometric data.

A biometric capture device 3902 such as a facial capture system may capture biometric data of a user. In some embodiments, multiple samples of the biometric feature may be examined from a single use, or the user may additionally be asked to provide multiple readings to acquire additional samples for analysis and comparison.

A registration portion 3904 of the registration device 3950 (e.g., portions of one or more computing devices executing computer-readable instructions to perform the operations described herein) may perform operations as described herein in order to generate biometric codes, keys, and related data (e.g., relocation information) for performing biometric registration and authentication as described herein. In an exemplary embodiment of facial registration, a subset of all available captured facial features may be used to generate an artificial complex representation that includes a composite feature vector set as described herein. A subsequent validity mask and/or calibration data may be encoded and selected, where the validity mask and the calibration data describe the features and/or the process used to generate the composite feature vector set.

Although the registration portion 3904 of the registration device 3950 may generate a variety of biometric codes, keys, and related data, in an exemplary embodiment of the present disclosure the registration portion 3904 may generate a private code 3906 and public code 3914. As described herein, a public code such as public code 3914 does not contain any biometric information, such that the information carried by the public code 3914 does not provide information from which the biometric information of the user or biometric-dependent information (e.g., private keys, private codes, stable codes, etc.) may be fully or partially determined. In some embodiments of the present disclosure, the public code 3914 is generated at the registration stage only (e.g., at registration device 3950), while in some embodiments, a public code may be a modification of earlier public code. If a modification of a prior public code is used to generate a public code 3914, any such modification will require generation of a new private code 3906. In some implementations, the private code and derived cryptographic code are secrets that are not stored in the public code or anywhere else. Any modification of the private code requires the calculation of a new private code and a witness code.

The public code 3914 may function to facilitate the private code 3906 generation algorithm to get the proper feature vectors listed and sorted that will enable private bit extraction when the biometric scan comes from a genuine person. The public code 3914 may include information used to select the feature vectors that are in turn used to build data that can be matched to the private code 3906 (or other bitwise values derived therefrom). The particular manner of operation of the public code 3914 may vary based on the particular biometric modality. The public code 3914 contains guiding information telling a device during another biometric capture where the private or repeatable binary features are located that are to be used for binarization and how all this information is sorted. In the context of the use of composite features, the public code may contain information that facilitates the orientation and/or location of underlying biometric data used to composite features and the manner of combining such features. In some embodiments, the public code 3914 may include data describing which features and/or composite features are included in the subset of facial features and/or composite features and/or the algorithmic process used to generate the composite feature vector set, without identifying any biometric data or values of the captured facial feature data.

Private code 3906 may undergo an operation that generates a biometric hash (e.g., as an example of generating a repeatable binary code) by an appropriate one-way hashing algorithm as described herein (e.g., SHA256) to generate a stable code 3910 that is suitable for later bitwise comparison to a private code later derived from the same individual's biometric information. The hashed private code can then be processed to extract a non-reversable witness code (e.g., at step 3912) to ensure both high entropy and low probability of output collision. In some embodiments, the witness code can simply be a hash (e.g., SHA256) of the private code. In other embodiments, the witness code can be calculated using a key derivation function (KDF) (e.g., PBKDF2). Yet other approaches include combining portions of the hashed private code in a suitable manner, or even a portion of the private code encrypted with a secret key. A witness code 3916 generated in this manner cannot be utilized to determine even a portion of the original private code 3906 (which is discarded by the registration device 3950 after being used to determine the hashed witness code 3916) because it is in turn based of a portion of the hashed data or a number calculated therefrom. On the other hand, the underlying biometric data source (e.g., user's face) is the same as the source used at registration and is properly captured, a later-generated witness code can match the originally generated witness code.

Once all the necessary information (e.g., stable code, public code, and witness code) is extracted, the generated public code 3910 and witness code 3916 may then be used by the authentication device 3960 to generate a second stable code for comparison to the stable code generated from the original hash of the private code. Although the public code 3914 and witness code 3916 are shown as being accessed from a registration device or other (e.g., cloud) system, because neither contains information from which underlying biometric information can be determined, such information can be accessed from centralized servers or other accessible locations.

The authentication portion 3922 utilizes the public code 3914 to identify appropriate information within the biometric sample captured by biometric capture device 3920. The public code includes information that describes where biometric information is located (e.g., phase calibration data, validity mask, etc.) and in some embodiments, how that underlying data is combined (e.g., into composite features having complex representations). The extracted biometric data is identified, processed, and combined as appropriate and is binarized to generate the private code 3924. As described herein, if the underlying biometric information (e.g., captured facial data) is from the same individual, the public code will guide the orientation, sampling, and combination to generate a private code 3924 that will match the stable code generated from the original hashing of the private code during registration.

The private code 3924 may then be hashed to generate a stable code (e.g., hash 3926), which utilizes the same hashing algorithm as hashing operation 3908. Accordingly, if the underlying data capture was performed properly on the same individual, the stable code 3926 should match the stable code 3910 that was generated originally and used for later comparison as described herein. However, prior to outputting the calculated stable code 3926 for comparison for a variety of purposes as described herein, at operation 3928 a witness code 3930 may be extracted from stable code 3926 in the same manner as done at registration, for example, by selecting a portion of the stable code for comparison or generating calculated values (e.g., checksums, etc.) for comparison. In some embodiments, not depicted in FIG. 39, information for extracting 3928 the witness code 3930 from the stable code 3926 may be stored within the public code 3918.

The witness code 3930 generated during verification is compared to the witness code 3916 via bitwise comparison 3932. By comparing the witness codes at the local device 3960, a determination of the robustness of the underlying biometric capture 3920 can be determined. If the witness code 3930 does not match the witness code 3916, an error code 3938 is returned, and the verification process on local device 3960 returns to the biometric capture 3920 (i.e., the local device recaptures the samples of biometric data and restarts the authentication process using the new biometric capture samples, or by combination of multiple captures). In some embodiments, a timeout occurs if the witness code 3930 is not matched with the witness code 3916 within a period of time or if some other criteria is met (e.g., number of image captures, measure of image capture conditions, etc.), where the verification process on local device 3960 returns to the biometric capture 3920 (e.g., the samples are recaptured) until the timeout or other criteria is met. If the witness code 3930 matches witness code 3916, processing continues to step 3934 stable code 3926 is provided as an output stable code 3936 with total confidence that it matches the value of the originally captured stable code 3910, despite never directly comparing these two data. In this manner, in some embodiments, the originally captured stable code need not even be retained for direct bitwise comparison to the newly generated stable code 3936.

Figure 40:
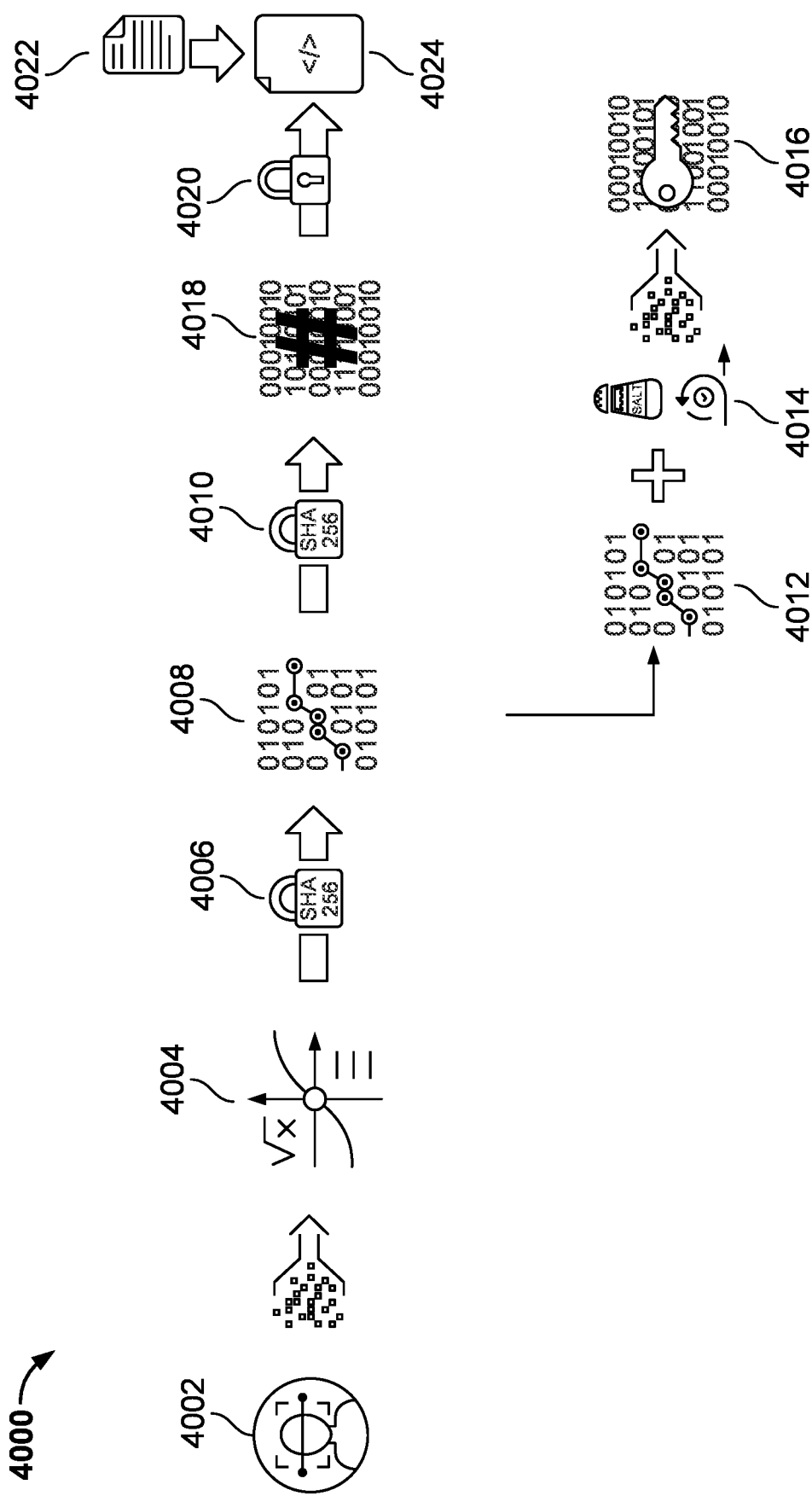
FIG. 40 depicts illustrative steps of a process that utilizes a composite feature generating process to generate a public code, a biometric hash, and a witness code from a biometric input, in accordance with some embodiments of the present disclosure.

FIG. 40 depicts illustrative steps of a process 4000 that utilizes a composite feature generating process to generate a public code and a witness code from a biometric input 4002, in accordance with some embodiments of the present disclosure. FIG. 40 may depict the processes that occur, for example, at a registration or verification device. Although FIG. 40 is described in the context of the particular structures, components, and processing of the present disclosure, and although a particular order and flow of steps are depicted in FIG. 40, it will be understood that in some embodiments, one or more of the steps may be modified, moved, removed, or added, and that the order of steps depicted in FIG. 40 may be modified.

Process 4000 begins at step 4002, where a face scan of a user occurs, and where samples of facial features are captured. In some embodiments, the scan may occur via a biometric capture device such as a facial imaging or time-of-flight system. In some embodiments, samples of the biometric feature may be captured from a single capture cycle, or multiple acquisition cycles may be performed. Processing may then continue to step 4004.

At step 4004, the captured facial features are utilized to generate a complex representation that includes a composite feature vector set or a subset thereof, as described herein. The captured features, or a subset thereof, may be interpolated, using an isomorphic vectorial transformation or a projection in a new orthogonal vectorial base, to generate a complex representation that includes composite feature vectors. The composite feature vectors may unlocalized, obfuscating the origin of the vector set, and that the injected facial features related to facial variations (e.g., illumination, yaw, pitch, various capture artefacts, or a combination thereof) are diluted within the composite feature vector set, and therefore the composite feature vector set (or a subset thereof) may be a suitable complex representation used to generate a private code with a suitably low FRR or FNR value. Processing may then continue to step 4006.

At step 4006, a hashing operation occurs to transform the composite feature vector set into the private code 4008, as described herein. Although private code 4008 is based off the captured biometric data, it only exists temporarily locally and is not saved or distributed. Once the private code 4008 is generated, processing may then continue to step 4010.

At step 4010, the private code 4008 is processed via a hashing operation 4010 to produce a unique witness code 4018, although a witness code may also be generated by other methods as described herein. At step 4020, the witness code is encrypted with other components of the public code such as the validity mask and concatenated with arbitrary information 4022 to constitute one possible embodiment of a public code 4024. In some embodiments, some or all of the arbitrary information 4022 may be additionally secured similar to the witness code. The combined witness code and arbitrary information 4022 are then made available as a persistence-ready public code 4024. The stable code may then further be processed at steps 4012 and 4014 to perform additional obfuscation and salting as described herein, to generate a key 4016 for use in a variety of operations as described herein. The obfuscation process includes a variety of hashing or KDF techniques, with a list of available cryptographic operations being unlimited. Permissible uses of key 4016 include but are not limited to symmetric cryptographic operations (e.g., AES) or asymmetric cryptographic operations (e.g., RSA) and Elliptic Curve Cryptography.

Figure 41:
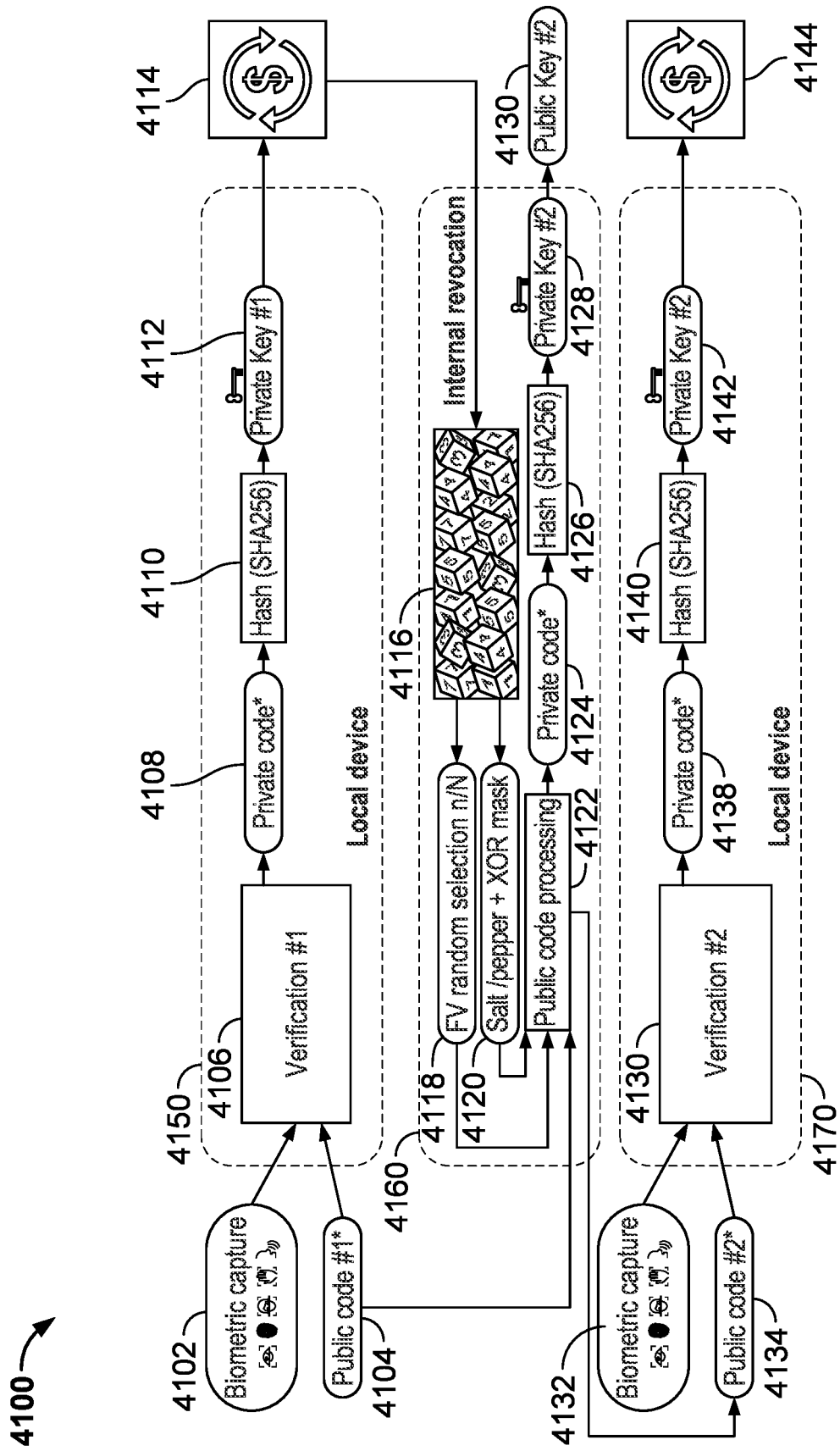
FIG. 41 depicts a secure automatic revocation process of verification codes, in accordance with some embodiments of the present disclosure.

FIG. 41 depicts a secure automatic revocation process 4100 of verification codes, in accordance with some embodiments of the present disclosure. An automatic revocation process 4100 may be utilized, for example, in some embodiments that require changing verification codes between uses. It will be understood that other revocation process embodiments may include maintaining a centralized or distributed list (public or non-public) of valid and revoked verification codes, along with other arbitrary or relevant data that may contextualize the revocation itself. For the exemplary embodiment of FIG. 41, the process will be described in the context of a facial type of biometric data, although it will be understood that the disclosure of FIG. 41 may suitably be applied to other biometric modalities (e.g., iris, fingerprint, etc.) and confirmation of other measurement of physical and chemical properties.

A first local authentication device 4150 takes in a biometric capture 4102 and a first public code. The samples are verified in a first verification process 4106 (i.e., using similar processes and operations as described herein), which first utilizes the information contained within public code 4104 in order to process the data from biometric capture 4102 in a manner that is suitable for bitwise comparison, perform reverse salting and obfuscation operations as appropriate, and obtain private code 4108. The private code 4108 may then be processed to generate a biometric hash 4110 (e.g., a repeatable binary code) as described herein, to generate a private key 4112. The key generation process can directly use the biometric hash 4110 or, in some embodiments, utilize derived key algorithms (e.g., PBKDF2) to never expose the secret biometric hash itself. For example, the biometric hash 4110 may be utilized in a key generation process (e.g., a PKI encryption and keys generation process, as described herein), such that a temporary first private key 4112 is generated. The first private key 4112 may then function to perform a function such as an access or transactional function 4114.

In the embodiment depicted in FIG. 41, once the access or transactional function is completed (or some other suitable criteria is satisfied) a revocation may be performed, although it will be understood that in other instances revocation may be triggered in other manners, such as in response to a user or other input requesting revocation. An internal revocation process 4116 includes a feature vector random selection process 4118. In some embodiments, captured facial features may be used to generate a composite feature vector set, and a subset of the composite features vector set may be utilized to generate the first public key and the first public code 4104 in the registration process. In such an embodiment, the vector random selection process 4118 may, for example, select a different subset of the composite feature vector set. Embodiments that do not utilize the random selection process 4118 continue to use the same set of selected composite features, relying instead on cryptographic techniques to power the revocation process. The internal revocation process 4116 also includes a randomization process 4120, where an additional number of "salt" and "pepper" bits may be generated, and/or a XOR mask (e.g., a validity mask) may be added. Using the newly selected and salted feature vectors, a second public code 4134 is generated via a public code processing operation 4122 using the selected feature vectors 4118, the salt/pepper and XOR mask 4120, and the original public code 4104.

In addition to generating the second public code 4134, the public code processing operation 4122 may also output a new private code 4124 associated with the second public code 4134. The private code 4124 may be hashed via a hashing operation to generate biometric hash 4126. Biometric hash 4126 may then be used in a key generating process to generate a local second private key 4128 and a distributed second public key 4130. Access or transactional function 4144 may be encoded (or reencoded) using the second public key 4130.

At a second local authentication device 4170, biometric capture 4132 and the second public code 4134 are used in a second verification process 4130 (i.e., having similar functions and operations as that of first verification process 4106). A local private code 4138 is generated and hashed via a hashing operation to obtain biometric hash 4140, and biometric hash 4140 is used in the key generating process previously used in order to generate a local second private key 4142, which should be identical to second private key 4128 if the same individual is accessing the local authentication device 4170. If the second private key 4141 matches the second private key 4128 that was generated in the internal revocation process 4116, then the local authentication device 4170 will be able to decode and access the access or transactional function 4144 that is encoded with the corresponding public key 4130.

Figure 42:
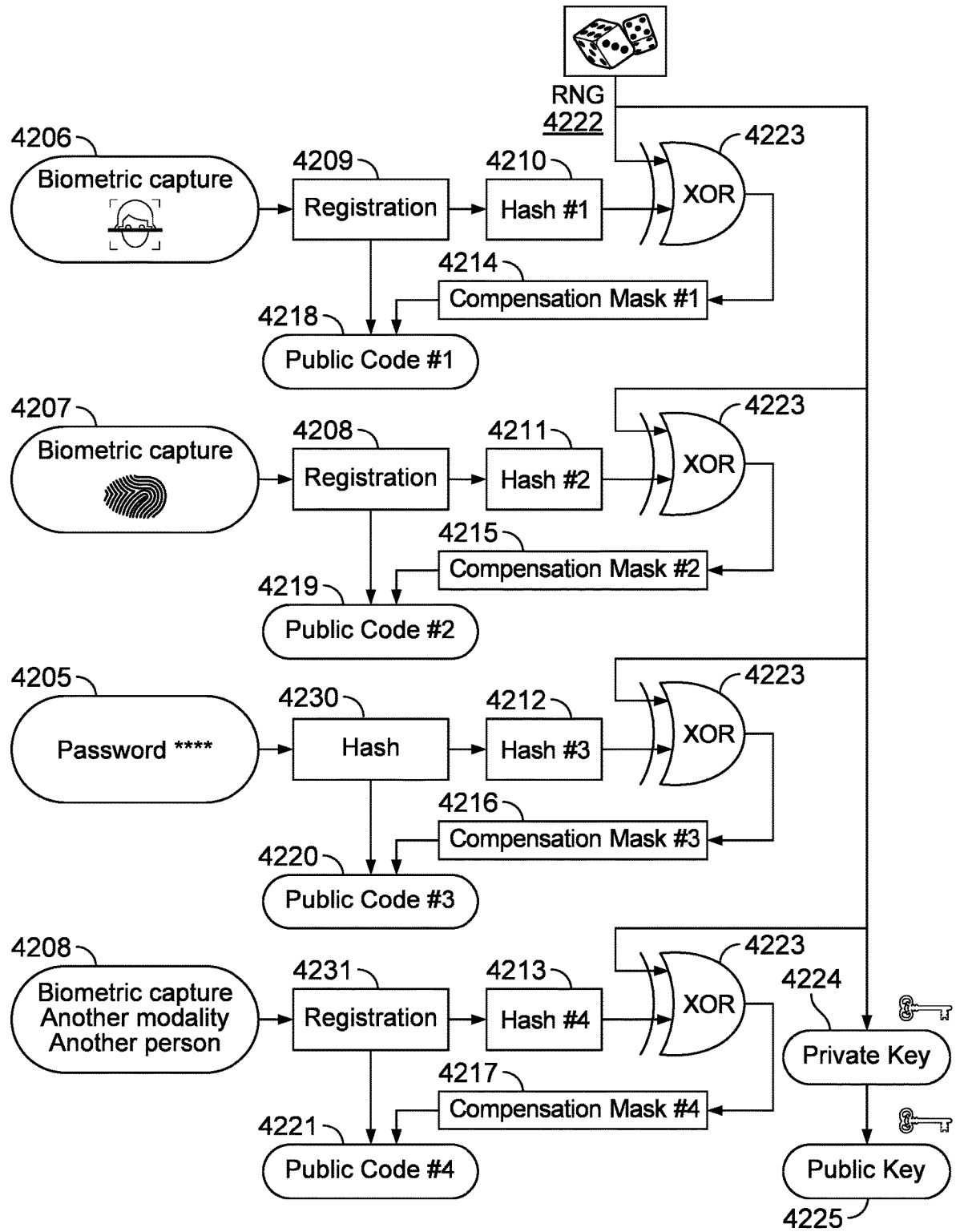
FIG. 42 depicts acquisition of multiple modalities of security information, in accordance with some embodiments of the present disclosure.

FIG. 42 depicts acquisition of multiple modalities of security information, in accordance with some embodiments of the present disclosure. In the exemplary embodiment of FIG. 42, a flow of registration steps assigns a common secret code 4222 to several security modalities of a person or a group of people. In this manner, an individual might have multiple types of security features (e.g., biometric or other features) that can be used as substitutes (e.g., depending on later capture conditions) or may be layered to provide multiple layers of security for different conditions, types of transactions, etc. As another example, multiple individuals in a group may create common codes that can be used by any member of the group, or combined in multiple layers of security as necessary.

In an embodiment, a first person uses facial capture 4206 to perform a first registration 4209. The registration process 4209 includes the steps described herein, for example, to create a biometric hash 4210. A Random Number Generator of an external secret number 4222 is provided. A bitwise XOR operation produces a Compensation Mask code 4214 that is recorded jointly with the Public Code 4218.

The process or registration can be repeated on an other modality such as fingerprint. Any modality that can produce a new independent biometric hash can be associated, including non-biometric security modalities or other criteria that can be repeatably measured or determined. The registration 4208 uses the fingerprint capture 4207 to produce a biometric hash 4211 and a second public code 2 4219. The bitwise XOR operand 4223 produces a second compensation mask code 2 4215 from the same random or secret code 4222 and the second biometric hash 4211. The second compensation mask code 4215 is joined to the second public code #2.

As noted, it is also possible to associate with this random or secret code any non-biometric hash. For example, a password 4205 is hashed 4230 to produce a third hash 4212. The bitwise XOR operand 4223 produces a third compensation mask code 4216 from the same random or secret code 4222 and the third biometric hash 4212. The third compensation mask code 4216 is then joined to the third public code 4220.

The random or secret code can also be associated with a biometric hash from a different person from any biometric modality. For example, the biometric capture 4208 is driven by a registration process 4208 to produce the fourth hash 4213. The bitwise XOR operand 4223 produces a fourth compensation mask code 4217 from the same random or secret code 4222 and the fourth biometric hash 4212. The fourth compensation mask code 4217 is joined to the fourth public code 4221.

The random number or secret code 4222 can be derived into a secret cryptographic key 4224 (e.g., a private key for asymmetric encryption or PKI Public Key Infrastructure). In the case of PKI usage, the private key 4224 is derived into a public key 4225 for distribution.

Figure 43:
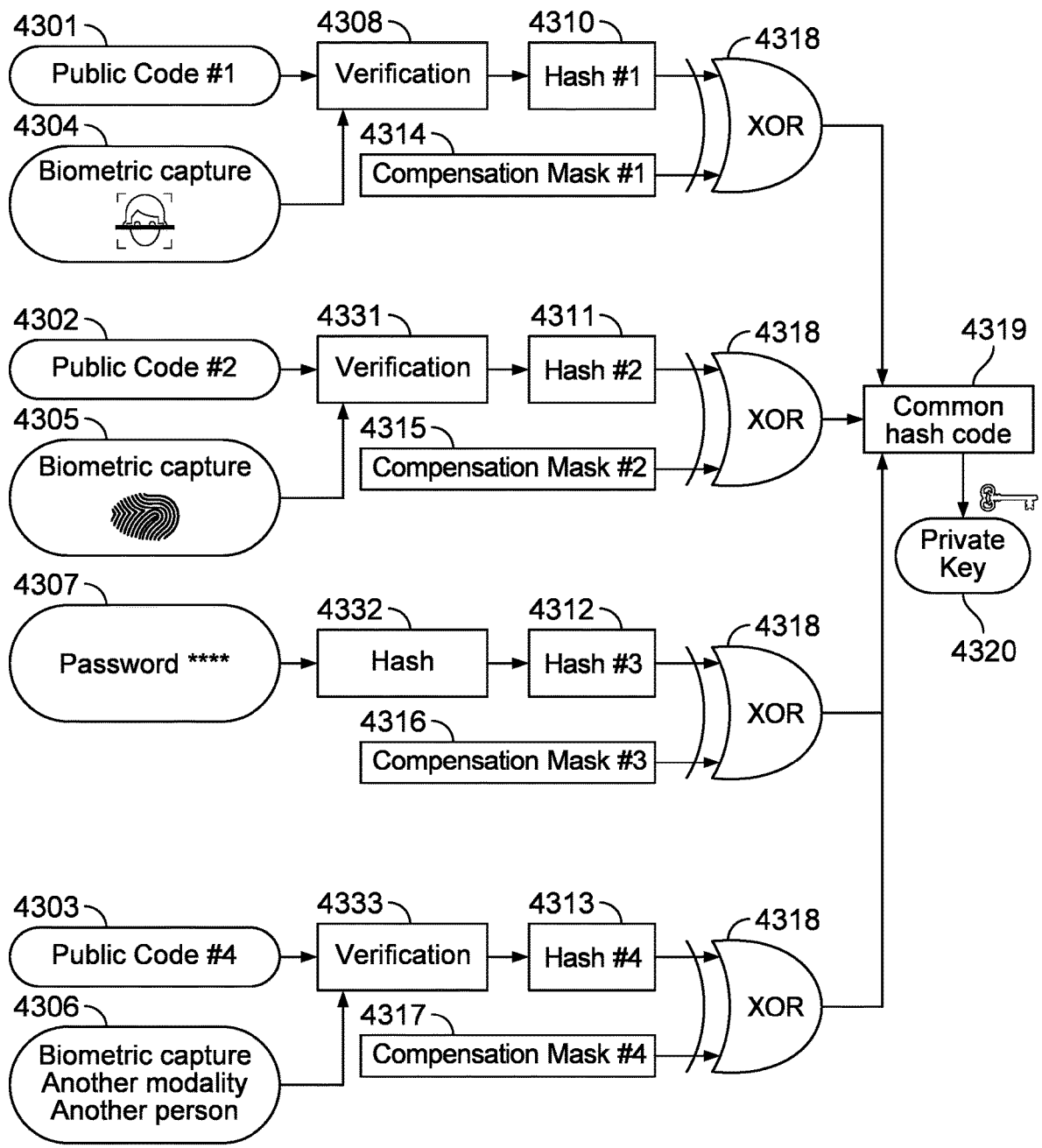
FIG. 43 depicts verification of a user based on multiple modalities of security information, in accordance with some embodiments of the present disclosure.

FIG. 43 depicts verification of a user based on multiple modalities of security information, in accordance with some embodiments of the present disclosure. In the embodiment of FIG. 43, there is provided a common flow of verification assigning a common hash code for multiple modalities, password or multiple people biometric hash or credentials.

A first person uses a face image capture 4304 and a first public code 4301 to perform verification 4308, for example, to produce a first biometric hash 4310 as described herein. A first compensation mask 4314 previously recorded jointly with the first public code 4301 is injected with the first biometric hash 4310 to a bitwise XOR operand 4318 to produce a common hash code 4319. Then the common hash code 4319 is utilized, such as by derivation into a secret cryptographic key (e.g., private key for asymmetric encryption or PKI usage).

Another biometric capture 4305 (e.g., fingerprint) of a same person that was using the same random number or secret code 4222 of FIG. 22 that was used to produce the second compensation mask 4311 and a second public code 4302 are used for a second verification process 4331 to produce the second biometric hash 4311. Then the second biometric hash 4211 and the second compensation mask code 4311 are injected to the bitwise XOR operand 4318 to produce the common hash code 4319. Then the common hash code 4319 is utilized, such as by derivation into a secret cryptographic key (e.g., private key for asymmetric encryption or PKI usage).

Other non-biometric security information (e.g., password 4307) of a person that was using the same random number or secret code 4222 of FIG. 22 that was used to produce the third compensation mask 4316 is used for a hashing process 4332 to produce the third hash 4312. Then the third hash 4212 and the third compensation mask code 4316 are injected to the bitwise XOR operand 4318 to produce the common hash code 4319. Then the common hash code 4319 is utilized, such as by derivation into a secret cryptographic key (e.g., private key for asymmetric encryption or PKI usage).

Another biometric capture 4306 of a different person that was using the same random number or secret code 4222 FIG. 22 to produce the fourth compensation mask 4317 and a fourth public code 4303 are used for fourth verification process 4333 to produce the fourth hash 4313. Then the fourth hash 4313 and the fourth compensation mask code 4317 are injected to the bitwise XOR operand 4318 to produce the common hash code 4319. Then the common hash code 4319 is utilized, such as by derivation into a secret cryptographic key (e.g., private key for asymmetric encryption or PKI usage).

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method for generating a secure biometric code from facial data of a user, comprising:
   capturing current samples from a plurality of regions of a face of the user;
   combining a first portion of the current samples from a first region of the plurality of regions with a second portion of the current samples from a second region of the plurality of regions;
   generating a complex representation of the combined samples, wherein each data point within the complex representation is based on at least the first portion of the current samples and the second portion of the current samples;
   acquiring a public code that is based on previously acquired samples of facial data of the user that were acquired prior to the current samples, wherein the public code does not include any of the previously acquired samples of facial data of the user and wherein none of the previously acquired samples of the facial data of the user can be determined based on the public code;
   modifying, based on calibration data of the public code, the complex representation of the combined samples to correspond to one or more features of the previously acquired samples of facial data;
   binarizing the modified complex representation to generate a binary code; and
   generating a witness code based on the binary code;
   determining if the witness code matches a previous witness code, wherein the previous witness code is determined from the previously acquired samples of facial data of the user;
   recapturing the current samples if the witness code does not match the previous witness code, wherein the combining, generating, modifying, and binarizing steps are repeated for the recaptured current samples; and
   determining, based on a bitwise comparison of the binary code with a private code previously determined from the previously acquired samples of facial data of the user, whether the user is authentic.

2. The method of claim 1, wherein the samples comprise a plurality of portions; and each portion of the plurality of portions corresponds to a different region of the plurality of regions of the face.

3. The method of claim 1, wherein the complex representation is based on all of the first portion of the samples and the second portion of the samples.

4. The method of claim 3, wherein a portion of the complex representation corresponding to missing samples is derived from other samples.

5. The method of claim 1, wherein modifying the complex representation comprises modifying a phase of the complex representation.

6. The method of claim 1, wherein binarizing the modified complex representation comprises assigning binary values based on a complex phase.

7. The method of claim 6, wherein binarizing the modified complex representation further comprises hashing the assigned binary values.

8. The method of claim 1, wherein binarizing the modified complex representation comprises assigning binary values based on an amplitude of each complex value of the complex representation.

9. The method of claim 8, wherein binarizing the modified complex representation further comprises hashing the assigned binary values.

10. The method of claim 1, wherein the private code is based on a previously determined complex representation.

11. The method of claim 1, wherein:
    a timeout occurs if the witness code is not matched with the previous witness code within a period of time; and
    the samples are recaptured until the timeout occurs.

12. The method of claim 1, wherein the private code is a previous private code, the method further comprising:
    receiving a request to revoke the public code;
    determining, based on the complex representation, a revised private code; and
    generating, based on the revised private code, a new public code.

13. The method of claim 12, wherein the new public code identifies portions of the samples that are suitable for bitwise comparison with the revised private code.

14. The method of claim 1, further comprising:
    acquiring data relating to a non-facial security modality;
    generating a binarizing the modified complex representation to generate a binary code; and
    determining, based on a bitwise comparison the binary code with a private code previously determined from the previously acquired samples of facial data of the user, whether the user is authentic.

15. The method of claim 14, wherein the non-facial security modality comprises a biometric modality.

16. The method of claim 15, wherein the non-facial security modality comprises a fingerprint modality.

17. The method of claim 14, wherein the non-facial security modality comprises a non-biometric modality.

18. A biometric processing system, comprising:
    a sensor configured to capture facial data from a user;
    a memory comprising instructions stored thereon; and
    a processor coupled to the sensor and the memory, wherein the processor is configured to execute the instructions to:
    capture current samples from a plurality of regions of a face of the user;
    combine a first portion of the current samples from a first region of the plurality of regions with a second portion of the current samples from a second region of the plurality of regions;
    generate a complex representation of the combined samples, wherein each data point within the complex representation is based on at least the first portion of the current samples and the second portion of the current samples;
    acquire a public code that is based on previously acquired samples of facial data of the user that were acquired prior to the current samples, wherein the public code does not include any of the previously acquired samples of facial data of the user and wherein none of the previously acquired samples of the facial data of the user can be determined based on the public code;
    modify, based on calibration data of the public code, the complex representation of the combined samples to corresponds to one or more features of the previously acquired samples of facial data;

binarize the modified complex representation to generate a binary code;

determine, based on a bitwise comparison of the binary code with a private code previously determined from the previously acquired samples of facial data of the user, whether the user is authentic;

receive a request to revoke the public code;

determine, based on the complex representation, a revised private code; and generate, based on the revised private code, a new public code.

19. A non-transitory computer-readable medium having instructions stored thereon, that when executed by a processor of a biometric processing system cause the processor to perform operations comprising:

capturing current samples from a plurality of regions of a face of the user;

combining a first portion of the current samples from a first region of the plurality of regions with a second portion of the current samples from a second region of the plurality of regions;

generating a complex representation of the combined samples, wherein each data point within the complex representation is based on at least the first portion of the current samples and the second portion of the current samples;

acquiring a public code that is based on previously acquired samples of facial data of the user that were acquired prior to the current samples, wherein the public code does not include any of the previously acquired samples of facial data of the user and wherein none of the previously acquired samples of the facial data of the user can be determined based on the public code;

modifying, based on calibration data of the public code, the complex representation of the combined samples to correspond to one or more features of the previously acquired samples of facial data;

binarizing the modified complex representation to generate a binary code; and generating a witness code based on the binary code;

determining if the witness code matches a previous witness code, wherein the previous witness code is determined from the previously acquired samples of facial data of the user;

recapturing the current samples if the witness code does not match the previous witness code, wherein the combining, generating, modifying, and binarizing steps are repeated for the recaptured current samples; and determining, based on a bitwise comparison of the binary code with a private code previously determined from the previously acquired samples of facial data of the user, whether the user is authentic.

20. A method for generating a secure biometric code from facial data of a user, comprising:

capturing current samples from a plurality of regions of a face of the user;

combining a first portion of the current samples from a first region of the plurality of regions with a second portion of the current samples from a second region of the plurality of regions;

generating a complex representation of the combined samples, wherein each data point within the complex representation is based on at least the first portion of the current samples and the second portion of the current samples;

acquiring a public code that is based on previously acquired samples of facial data of the user that were acquired prior to the current samples, wherein the public code does not include any of the previously acquired samples of facial data of the user and wherein none of the previously acquired samples of the facial data of the user can be determined based on the public code;

modifying, based on calibration data of the public code, the complex representation of the combined samples to correspond to one or more features of the previously acquired samples of facial data;

binarizing the modified complex representation to generate a binary code;

determining, based on a bitwise comparison of the binary code with a private code previously determined from the previously acquired samples of facial data of the user, whether the user is authentic;

receiving a request to revoke the public code;

determining, based on the complex representation, a revised private code; and generating, based on the revised private code, a new public code.

21. The method of claim 20, wherein the new public code identifies portions of the samples that are suitable for bitwise comparison with the revised private code.

* * * * *